(12) United States Patent
Soundararajan et al.

(10) Patent No.: US 11,836,661 B2
(45) Date of Patent: *Dec. 5, 2023

(54) VIRTUALIZATION OF WORKFLOW ASSETS

(71) Applicant: ZOHO CORPORATION PRIVATE LIMITED, Chengalpattu Taluk (IN)

(72) Inventors: Manikanda Vignesh Soundararajan, Salem (IN); Vijaykumar Rajendran, Chennai (IN)

(73) Assignee: ZOHO CORPORATION PRIVATE LIMITED, Chengalpattu Taluk (IN)

( * ) Notice: Subject to any disclaimer, the term of this patent is extended or adjusted under 35 U.S.C. 154(b) by 0 days.

This patent is subject to a terminal disclaimer.

(21) Appl. No.: 17/556,475

(22) Filed: Dec. 20, 2021

(65) Prior Publication Data

US 2022/0114515 A1    Apr. 14, 2022

Related U.S. Application Data

(63) Continuation of application No. 16/750,971, filed on Jan. 23, 2020, now Pat. No. 11,238,388.

(30) Foreign Application Priority Data

Jan. 24, 2019 (IN) .............................. 201941002991
Apr. 8, 2019 (IN) .............................. 201941014155

(51) Int. Cl.
| | | |
|---|---|---|
| *G06Q 10/0633* | (2023.01) | |
| *G06K 7/10* | (2006.01) | |
| *G06F 16/27* | (2019.01) | |
| *G06Q 10/04* | (2023.01) | |
| *G06Q 10/109* | (2023.01) | |
| *G06Q 10/0631* | (2023.01) | |
| *G06Q 10/0639* | (2023.01) | |
| *G06Q 10/0637* | (2023.01) | |
| *G06Q 10/105* | (2023.01) | |

(52) U.S. Cl.
CPC ......... *G06Q 10/0633* (2013.01); *G06F 16/27* (2019.01); *G06K 7/10366* (2013.01); *G06Q 10/04* (2013.01); *G06Q 10/0639* (2013.01); *G06Q 10/06315* (2013.01); *G06Q 10/06375* (2013.01); *G06Q 10/105* (2013.01); *G06Q 10/109* (2013.01)

(58) Field of Classification Search
CPC .......... G06Q 10/00–50/00; G06K 1/00–21/00; G06F 1/00–21/00
USPC ................................................. 705/7.11–7.42
See application file for complete search history.

(56) References Cited

U.S. PATENT DOCUMENTS 5,790,853 A * 8/1998 Nomura .................. G06F 9/451
714/2
5,826,239 A * 10/1998 Du ......................... G06Q 10/06
705/7.26

(Continued)

*Primary Examiner* — Alan S Miller
(74) *Attorney, Agent, or Firm* — AHMANN KLOKE LLP

(57) ABSTRACT

Described are systems and methods to parameterize assets to improve predictions related to allocation of assets in a virtual synthesis, tracking allocated assets, or historical review of asset allocation and/or virtual synthesis. Techniques described in this paper facilitate measurement of effectiveness of a synthesis instance, such as a meeting, that includes assets by considering factors such as utilization cost, in both time and money, for historical review or prediction of workflow.

22 Claims, 42 Drawing Sheets

(56) References Cited

U.S. PATENT DOCUMENTS

| | | | | |
|---|---|---|---|---|
| 6,678,698 B2* | 1/2004 | Fredell | G06Q 10/06 | 707/999.01 |
| 6,850,895 B2* | 2/2005 | Brodersen | G06Q 10/1093 | 705/7.14 |
| 7,599,996 B2* | 10/2009 | Gupta | G06Q 10/10 | 709/217 |
| 8,046,254 B2* | 10/2011 | Kosiba | G06Q 10/105 | 379/265.06 |
| 8,335,705 B2* | 12/2012 | Ehrler | G06Q 10/10 | 379/88.19 |
| 8,417,682 B2* | 4/2013 | Wilcox | G06Q 10/087 | 707/705 |
| 10,235,646 B2* | 3/2019 | Perry | G06Q 10/063112 | |
| 10,832,189 B2* | 11/2020 | Gupta | G06Q 10/063112 | |
| 2002/0029161 A1* | 3/2002 | Brodersen | G06Q 10/1093 | 705/7.14 |
| 2002/0107914 A1* | 8/2002 | Charisius | G06Q 30/06 | 709/203 |
| 2003/0033184 A1* | 2/2003 | Benbassat | G06Q 10/06311 | 705/7.14 |
| 2003/0229529 A1* | 12/2003 | Mui | G06Q 50/2057 | 705/328 |
| 2004/0054850 A1* | 3/2004 | Fisk | H04L 41/147 | 714/E11.193 |
| 2004/0078257 A1* | 4/2004 | Schweitzer | G06Q 10/1097 | 705/7.26 |
| 2004/0133413 A1* | 7/2004 | Beringer | G06F 9/451 | 703/22 |
| 2004/0267589 A1* | 12/2004 | Wallman | G06Q 10/10 | 705/7.14 |
| 2005/0004825 A1* | 1/2005 | Ehrler | G06Q 10/063118 | 705/7.17 |
| 2005/0132048 A1* | 6/2005 | Kogan | G06Q 30/0603 | 709/225 |
| 2005/0137925 A1* | 6/2005 | Lakritz | G06Q 10/06312 | 705/7.22 |
| 2006/0026166 A1* | 2/2006 | Sattler | G06Q 10/10 | |
| 2006/0031110 A1* | 2/2006 | Benbassat | G06Q 10/1097 | 705/7.14 |
| 2006/0136495 A1* | 6/2006 | Schaad | G06Q 10/06 | |
| 2007/0299795 A1* | 12/2007 | Macbeth | G06Q 10/10 | 706/16 |
| 2010/0257470 A1* | 10/2010 | Ari | G06Q 10/06 | 715/764 |
| 2011/0201900 A1* | 8/2011 | Zhang | G16H 10/60 | 600/300 |
| 2011/0307598 A1* | 12/2011 | Orr | G06Q 10/109 | 709/224 |
| 2012/0016712 A1* | 1/2012 | Kosiba | G06Q 10/06315 | 705/320 |
| 2012/0078388 A1* | 3/2012 | Collins | G06Q 10/06 | 700/19 |
| 2012/0203589 A1* | 8/2012 | Eggena | G06Q 10/06 | 705/7.15 |
| 2012/0278408 A1* | 11/2012 | Seferian | G06Q 10/1095 | 709/204 |
| 2013/0339969 A1* | 12/2013 | Koski | G06Q 10/10 | 718/103 |
| 2014/0258882 A1* | 9/2014 | Latzina | G06Q 10/103 | 715/751 |
| 2014/0278640 A1* | 9/2014 | Galloway | G06Q 10/063114 | 705/7.15 |
| 2015/0106119 A1* | 4/2015 | McCafferty | G16H 40/20 | 705/3 |
| 2015/0138002 A1* | 5/2015 | Beggs | B66F 17/003 | 340/944 |
| 2016/0180222 A1* | 6/2016 | Sierhuis | G16H 50/50 | 706/47 |
| 2016/0300178 A1* | 10/2016 | Perry | G06Q 10/063112 | |
| 2017/0185904 A1* | 6/2017 | Padmanabhan | G06N 5/04 | |
| 2017/0323233 A1* | 11/2017 | Bencke | G06Q 10/0633 | |
| 2018/0012143 A1* | 1/2018 | Hansen | G06N 5/022 | |
| 2018/0039949 A1* | 2/2018 | Cohen-Zur | G06Q 10/1095 | |
| 2018/0322442 A1* | 11/2018 | Gupta | G06Q 10/063112 | |
| 2019/0355483 A1* | 11/2019 | Smurro | A61B 34/30 | |
| 2020/0242524 A1 | 7/2020 | Soundararajan et al. | | |
| 2021/0232990 A1* | 7/2021 | Maunz | G01C 11/00 | |

* cited by examiner

VIRTUALIZATION OF WORKFLOW ASSETS

CROSS-REFERENCE TO RELATED APPLICATIONS

The present application claims priority to Indian Provisional Patent Application No. 201941002991 filed Jan. 24, 2019 and Indian Provisional Patent Application No. 201941014155 filed Apr. 8, 2019, which are hereby incorporated by reference herein.

BACKGROUND

Today's modern business enterprises require and make use of sophisticated information systems to acquire vital insights into the performance or prospective future performance of their business relative to goals, market metrics, competitive information, and the like. This class of information products is known in the field today as Management Information Systems (MIS) or Business Intelligence (BI) tools. In addition, businesses seek better ways to identify the right strategies and new ideas that can help them grow, and information solutions supporting these objectives are often referred to as Collaboration Technologies, and Innovation Management Systems. Collectively these information systems fall under the general category of Enterprise and Marketing Intelligence Systems and represent a critical part of today's business software and information systems marketplace.

A lot of assets are underutilized or improperly parameterized, resulting in a waste of resources, including both time and money. As such, organizations have hidden operating expenses in the form of waste. While meeting enablers, meeting managers, and meeting schedulers are known to bring teams of humans together, a flaw with BI systems today is that they fail to properly parameterize assets for maximum utility. Although assets are interlinked in an organization, there are no tools to effectively measure the impact of synthesizing the various assets.

SUMMARY

An effective strategy should parametrize assets to improve the predictive and tracking power of allocating real world assets in a virtual synthesis. Such an approach can include measuring the effectiveness of a synthesis instance, such as a meeting, that includes human and artificial assets by considering utilization cost, in both time and money, for the purpose of historical review and predictive power. Techniques described in this paper address a number of pain points related to meetings, such as lacking a proper agenda, no outcome documents, lack of planning in scheduling, proper stakeholder participation, no metrics to determine success, no clarity on asset utilization costs, no clarity on reflecting historical consensus, remote participation or participation via a personal device. Other assets and instances have other associated challenges to be overcome, and are addressed in this paper.

A system utilizing the techniques described in this paper understands and solves asset synthesis by integrating asset synthesis instances into a historical, virtual, or predicted workflow within an organization. The integration facilitates improving a parameter of the synthesis, such as cost or time. The result is a system that improves productivity in an organization and improves the accuracy of workflow completion prediction within the organization.

BRIEF DESCRIPTION OF THE DRAWINGS

FIGS. 10-42 are screenshots intended to illustrate an implementation.

DETAILED DESCRIPTION

Figure 1:
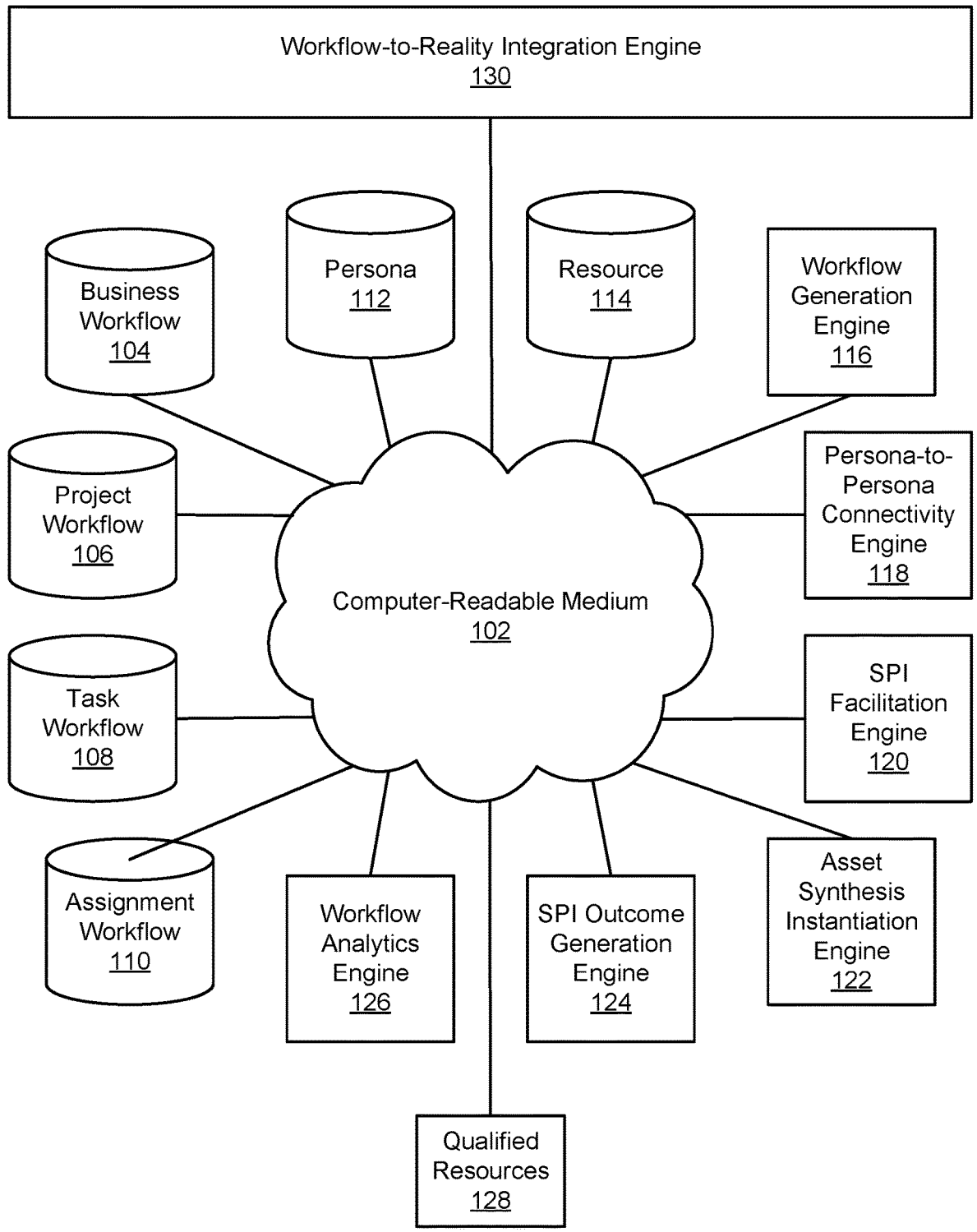
FIG. 1 depicts a diagram of an example of a system for performing asset-to-workflow synthesis.

FIG. 1 depicts a diagram 100 of an example of a system for performing asset-to-workflow synthesis. The diagram 100 includes a computer-readable medium (CRM) 102, a business workflow datastore 104 coupled to the CRM 102, a project workflow datastore 106 coupled to the CRM 102, a task workflow datastore 108 coupled to the CRM 102, an assignment workflow datastore 110 coupled to the CRM 102, a persona datastore 112 coupled to the CRM 102, a resource datastore 114 coupled to the CRM 102, a workflow generation engine 116 coupled to the CRM 102, a persona-to-persona connectivity engine 118 coupled to the CRM 102, a synchronized persona interaction (SPI) facilitation engine 120 coupled to the CRM 102, an asset synthesis instantiation engine 122 coupled to the CRM 102, an SPI outcome generation engine 124 coupled to the CRM 102, a workflow analytics engine 126 coupled to the CRM 102, and qualified resources 128 coupled to the CRM 102.

The CRM 102 and other computer readable mediums discussed in this paper are intended to include all mediums that are statutory (e.g., in the United States, under 35 U.S.C. 101), and to specifically exclude all mediums that are non-statutory in nature to the extent that the exclusion is necessary for a claim that includes the computer-readable medium to be valid. Known statutory computer-readable mediums include hardware (e.g., registers, random access memory (RAM), non-volatile (NV) storage, to name a few), but may or may not be limited to hardware.

The CRM 102 and other computer readable mediums discussed in this paper are intended to represent a variety of potentially applicable technologies. For example, the CRM 102 can be used to form a network or part of a network. Where two components are co-located on a device, the CRM 102 can include a bus or other data conduit or plane. Where a first component is co-located on one device and a second component is located on a different device, the CRM 102 can include a wireless or wired back-end network or LAN. The CRM 102 can also encompass a relevant portion of a WAN or other network, if applicable.

The devices, systems, and computer-readable mediums described in this paper can be implemented as a computer system or parts of a computer system or a plurality of computer systems. In general, a computer system will include a processor, memory, non-volatile storage, and an interface. A typical computer system will usually include at least a processor, memory, and a device (e.g., a bus) coupling the memory to the processor. The processor can be, for example, a general-purpose central processing unit (CPU), such as a microprocessor, or a special-purpose processor, such as a microcontroller.

The memory can include, by way of example but not limitation, random access memory (RAM), such as dynamic RAM (DRAM) and static RAM (SRAM). The memory can be local, remote, or distributed. The bus can also couple the processor to non-volatile storage. The non-volatile storage is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software on the computer system. The non-volatile storage can be local, remote, or distributed. The non-volatile storage is optional because systems can be created with all applicable data available in memory.

Software is typically stored in the non-volatile storage. Indeed, for large programs, it may not even be possible to store the entire program in the memory. Nevertheless, it should be understood that for software to run, if necessary, it is moved to a computer-readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at an applicable known or convenient location (from non-volatile storage to hardware registers) when the software program is referred to as "implemented in a computer-readable storage medium." A processor is considered to be "configured to execute a program" when at least one value associated with the program is stored in a register readable by the processor.

In one example of operation, a computer system can be controlled by operating system software, which is a software program that includes a file management system, such as a disk operating system. One example of operating system software with associated file management system software is the family of operating systems known as Windows® from Microsoft Corporation of Redmond, Washington, and their associated file management systems. Another example of operating system software with its associated file management system software is the Linux operating system and its associated file management system. The file management system is typically stored in the non-volatile storage and causes the processor to execute the various acts required by the operating system to input and output data and to store data in the memory, including storing files on the non-volatile storage.

The bus can also couple the processor to the interface. The interface can include one or more input and/or output (I/O) devices. Depending upon implementation-specific or other considerations, the I/O devices can include, by way of example but not limitation, a keyboard, a mouse or other pointing device, disk drives, printers, a scanner, and other I/O devices, including a display device. The display device can include, by way of example but not limitation, a cathode ray tube (CRT), liquid crystal display (LCD), or some other applicable known or convenient display device. The interface can include one or more of a modem or network interface. It will be appreciated that a modem or network interface can be considered to be part of the computer system. The interface can include an analog modem, ISDN modem, cable modem, token ring interface, satellite transmission interface (e.g. "direct PC"), or other interfaces for coupling a computer system to other computer systems. Interfaces enable computer systems and other devices to be coupled together in a network.

The computer systems can be compatible with or implemented as part of or through a cloud-based computing system. As used in this paper, a cloud-based computing system is a system that provides virtualized computing resources, software and/or information to end user devices. The computing resources, software and/or information can be virtualized by maintaining centralized services and resources that the edge devices can access over a communication interface, such as a network. "Cloud" may be a marketing term and for the purposes of this paper can include any of the networks described herein. The cloud-based computing system can involve a subscription for services or use a utility pricing model. Users can access the protocols of the cloud-based computing system through a web browser or other container application located on their end user device.

A computer system can be implemented as an engine, as part of an engine or through multiple engines. As used in this paper, an engine includes one or more processors or a portion thereof. A portion of one or more processors can include some portion of hardware less than all of the hardware comprising any given one or more processors, such as a subset of registers, the portion of the processor dedicated to one or more threads of a multi-threaded processor, a time slice during which the processor is wholly or partially dedicated to carrying out part of the engine's functionality, or the like. As such, a first engine and a second engine can have one or more dedicated processors or a first engine and a second engine can share one or more processors with one another or other engines. Depending upon implementation-specific or other considerations, an engine can be centralized or its functionality distributed. An engine can include hardware, firmware, or software embodied in a computer-readable medium for execution by the processor. The processor transforms data into new data using implemented data structures and methods, such as is described with reference to the figures in this paper.

The engines described in this paper, or the engines through which the systems and devices described in this paper can be implemented, can be cloud-based engines. As used in this paper, a cloud-based engine is an engine that can run applications and/or functionalities using a cloud-based computing system. All or portions of the applications and/or functionalities can be distributed across multiple computing devices, and need not be restricted to only one computing device. In some embodiments, the cloud-based engines can execute functionalities and/or modules that end users access through a web browser or container application without having the functionalities and/or modules installed locally on the end-users' computing devices.

As used in this paper, datastores are intended to include repositories having any applicable organization of data, including tables, comma-separated values (CSV) files, traditional databases (e.g., SQL), or other applicable known or convenient organizational formats. Datastores can be implemented, for example, as software embodied in a physical computer-readable medium on a specific-purpose machine, in firmware, in hardware, in a combination thereof, or in an applicable known or convenient device or system. Datastore-associated components, such as database interfaces, can be considered "part of" a datastore, part of some other system component, or a combination thereof, though the physical location and other characteristics of datastore-associated components is not critical for an understanding of the techniques described in this paper.

A database management system (DBMS) can be used to manage a datastore. In such a case, the DBMS may be thought of as part of the datastore, as part of a server, and/or as a separate system. A DBMS is typically implemented as an engine that controls organization, storage, management, and retrieval of data in a database. DBMSs frequently provide the ability to query, backup and replicate, enforce rules, provide security, do computation, perform change and access logging, and automate optimization. Examples of DBMSs include Alpha Five, DataEase, Oracle database, IBM DB2, Adaptive Server Enterprise, FileMaker, Firebird, Ingres, Informix, Mark Logic, Microsoft Access, InterSystems Cache, Microsoft SQL Server, Microsoft Visual FoxPro, MonetDB, MySQL, PostgreSQL, Progress, SQLite, Teradata, CSQL, OpenLink Virtuoso, Daffodil DB, and OpenOffice.org Base, to name several.

Database servers can store databases, as well as the DBMS and related engines. Any of the repositories described in this paper could presumably be implemented as database servers. It should be noted that there are two logical views of data in a database, the logical (external) view and the physical (internal) view. In this paper, the logical view is generally assumed to be data found in a report, while the physical view is the data stored in a physical storage medium and available to a specifically programmed processor. With most DBMS implementations, there is one physical view and an almost unlimited number of logical views for the same data.

A DBMS typically includes a modeling language, data structure, database query language, and transaction mechanism. The modeling language is used to define the schema of each database in the DBMS, according to the database model, which may include a hierarchical model, network model, relational model, object model, or some other applicable known or convenient organization. An optimal structure may vary depending upon application requirements (e.g., speed, reliability, maintainability, scalability, and cost). One of the more common models in use today is the ad hoc model embedded in SQL. Data structures can include fields, records, files, objects, and any other applicable known or convenient structures for storing data. A database query language can enable users to query databases, and can include report writers and security mechanisms to prevent unauthorized access. A database transaction mechanism ideally ensures data integrity, even during concurrent user accesses, with fault tolerance. DBMSs can also include a metadata repository; metadata is data that describes other data.

As used in this paper, a data structure is associated with a particular way of storing and organizing data in a computer so that it can be used efficiently within a given context. Data structures are generally based on the ability of a computer to fetch and store data at any place in its memory, specified by an address, a bit string that can be itself stored in memory and manipulated by the program. Thus, some data structures are based on computing the addresses of data items with arithmetic operations; while other data structures are based on storing addresses of data items within the structure itself. Many data structures use both principles, sometimes combined in non-trivial ways. The implementation of a data structure usually entails writing a set of procedures that create and manipulate instances of that structure. The datastores, described in this paper, can be cloud-based datastores. A cloudbased datastore is a datastore that is compatible with cloud-based computing systems and engines.

Business process management (BPM), as used in this paper, is a technique intended to align organizations with the needs of clients by continuously improving processes. BPM is an advantageous implementation because it tends to promote business efficacy while striving for innovation and integration with technology. It should be noted that business process modeling and business process management are not the same, and, confusingly, share the same acronym. In this paper, business process management is given the acronym BPM, but business process modeling is not given an acronym. Business process modeling is often, though not necessarily, used in BPM. Business process modeling is a way of representing processes in systems or software. The models are typically used as tools to improve process efficiency and quality, and can use Business Process Modeling Notation (BPMN) or some other notation to model business processes.

A business process, as used in this paper, is a collection of related tasks that produce a service or product for a particular client. Business processes can be categorized as management processes, operational processes, and supporting processes. Management processes govern the operation of a system, and include by way of example but not limitation corporate governance, strategic management, etc. Operational processes comprise the core business processes for a company, and include by way of example but not limitation, purchasing, manufacturing, marketing, and sales. Supporting processes support the core processes and include, by way of example but not limitation, accounting, recruiting, technical support, event organization, etc.

A business process can include multiple sub-processes, which have their own attributes, but also contribute to achieving the goal of the super-process. For example, an operational process could include an event organization task. (Event organization is sometimes referred to as "event management," but "organization" is used here to avoid confusion with a "management" sub-process.) The analysis of business processes typically includes the mapping of processes and sub-processes down to assignment level. A business process is sometimes intended to mean integrating application software tasks, but this is narrower than the broader meaning that is frequently ascribed to the term in the relevant art, and as intended in this paper. Although the initial focus of BPM may have been on the automation of mechanistic business processes, it has since been extended to integrate human-driven processes in which human interaction takes place in series or parallel with the mechanistic processes.

Returning to the example of FIG. 1, the business workflow datastore 104 is intended to represent data structure of an endeavor. In a specific implementation, the endeavor includes assets associated with ownership or board-level direction for a business, which in the aggregate define the business workflow. While the titles associated with human agents operating at this level vary from company to company and country to country, they are referred to in this document as "directors," with the understanding they could be referred to in some other manner (e.g., chairman of the board, board member, investor, shareholder, owner, etc.). Directors sit at the top of a work hierarchy and have "business" as a work goal.

The business workflow datastore 104 and other datastores described in this paper can have a corresponding engine to create, read, update, or delete (CRUD) data structures.

While not shown in FIG. 1, these engines may be described in association with other figures to illustrate relevant functionality.

The project workflow datastore 106 is intended to represent data structures of projects. In a specific implementation, the projects include assets associated with senior management, which in the aggregate define project workflows (of a business workflow). While the titles associated with human agents operating at this level vary from company to company and country, they are referred to in this document as "officers," with the understanding they could be referred to in some other manner (e.g., CEO or some other Chief-level officer, executive management, upper management, president, vice president, general manager, etc.). Officers sit in the middle of a work hierarchy and have "projects" as a work goal. It is possible to have both a director and an officer role in a company, but the director-level and officer-level work done by such an individual can generally be distinguished by role within a workflow. A project can be subdivided into tasks, either explicitly at the outset, or as need compels the creation of tasks to support a project. Tasks are activities that are to be accomplished within a defined period of time or by a deadline; they are a small essential piece of a job that serves as a means to differentiate various components of a project. Tasks can be linked together to create dependencies. Task completion, particularly for linked tasks, benefits from coordination, including integrating assets to meet a project goal.

The task workflow datastore 108 is intended to represent data structures of tasks. In a specific implementation, the tasks include assets associated with middle management, which in the aggregate define task workflows (within project workflows). While the titles associated with human agents operating at this level vary from company to company and country, they are referred to in this document as "supervisors," with the understanding they could be referred to in some other manner (e.g., vice president, general manager, manager, section head, team leader, foreman, etc.). Because officers and supervisors at different companies can have the same title (e.g., vice president or general manager), a distinction by workflow and not by title is assumed in this document. Supervisors sit in the middle of a work hierarchy, below officers, and have "tasks" as a work goal. It is possible to have both an officer role (or a director and officer role) and a supervisor role in a company, but the officer-level (or director- and officer-level) and supervisor-level work done by such an individual can generally be distinguished by role within a workflow. Projects and tasks have some similarities, and are often associated with managers, but are broken into separate categories due to both business procedures that recognize a distinction between senior management and middle management, as well as variations in workflow that are worthy of distinction in this paper.

Task management has five or more conceptual breakdowns including creative (pertaining to task creation, such as planning, brainstorming, creation, elaboration, clarification, organization, reduction, targeting, and preliminary prioritization), functional (allowing for planning, recurrence, dependency, reporting, tracking, prioritizing, configuring, delegating, testing, and managing of tasks), project (allowing for project task breakdown, task allocation, inventory across projects, and concurrent access to task datastores), performance (allowing for tracking by time, cost control, stakeholder, priority, or the like; charts, exportable reports, status updates, deadline adjustments, and activity logging), and service (allowing for file attachment and links to tasks, document management, access rights management, inventory of client and employee records, orders and calls management, and annotating tasks) activities. Task status can include ready, terminated, expired, delegated, forwarded, finished, and failed; the workflow is generally from ready to terminated, expired, or delegated and from delegated to ready (if the delegation is rejected), forwarded, finished, or failed. Task status may or may not also include inactive and/or completed; the workflow can be from inactive to ready or completed and from terminated, expired, forwarded, finished, or failed to complete. (Other approaches, such as continuous delivery or continuous deployment, may call for alternative task status designations.) Tasks are also differentiated by complexity, from low to high. A task can be broken down into assignments which typically have a defined start and end date or a deadline for completion. One or more assignments on a task puts the task under execution. Completion of all assignments on a specific task normally renders the task completed (which can be characterized as an explicit status or as one of a group of statuses, such as terminated, expired, forwarded, finished, and failed). In most projects, tasks may suffer one of two major drawbacks: Task dependency and unclear understanding of the term complete. An understanding of workflow dependencies, agents, and resources, along with tools to utilize and synchronize assets (as described with reference to FIG. 1) can ameliorate these drawbacks.

The assignment workflow datastore 110 is intended to represent data structures of assignments. In a specific implementation, the assignment data structures include assets associated with staff, which in the aggregate define assignment workflows (within task workflows). Staff sit at the bottom of a work hierarchy and have "assignments" as a work goal and typically do not have a managerial title (though they may still have a title that carries some weight, such as senior engineer, or the like). It is possible to have both a staff-level and higher-level role in a company, but the work done by such an individual can generally be distinguished by role within a workflow. While assignment workflows are treated as the most granular workflow in this paper, it may be noted assignments can be broken into sub-assignments, if applicable, allowing for even finer resolution, but a detailed discussion is not deemed necessary in this paper because the techniques described herein are readily applicable to sub-assignments.

The persona datastore 112 is intended to represent data structures defining human agents of an enterprise. In a specific implementation, persona data structures include the fields human resource cost, calendar, history, location, and scarcity. In an alternative, some "fields" may have time-varying values that are computed for a given date and time and can be modified in response to dynamic workflow changes. For example, a human can only be in one location at a time, and location may be relevant now, historically (for prediction purposes), or at some future time (ideally as represented in the calendar). Scarcity diminishes as the human associated with the persona is allocated to workflows and increases when work is completed, and can be impacted by the availability of assets that ameliorate location-based limitations (e.g., the ability to access relevant documents and conduct meetings via video conferencing technology from relatively remote locations) or the ability to adjust responsibilities (e.g., by delaying one meeting in favor of another). Thus, for example, some portions of a persona data structure may reside in a traditional database or non-volatile storage as part of a flat file, while other portions may be stored in RAM while human agents associated with personas are considered for incorporation into a workflow during workflow design.

The resource datastore 114 is intended to represent data structures defining non-human assets of an enterprise. "Of an enterprise" is not intended to mean all resources must be owned by an enterprise, just that they are available to the enterprise. For example, local catering, hotel accommodations, available software licenses, and other resources can be considered a part of the resource datastore 114. Resources can include devices, conference rooms, software, remote access, wireless LAN access, rental property, and other resources that can be used in a workflow. Different resources will have different parameters. For example, physical devices may include location (and/or capacity) and scarcity fields. The location can be an area for, e.g., wireless access points and may have an explicit capacity for, e.g., conference rooms. Software can include a license field, which may include some restrictions on use that are equivalent to "capacity" in some cases. The persona datastore 112 and the resource datastore 114 can be referred to in the aggregate as an asset datastore.

The workflow generation engine 116 is intended to represent an engine that populates workflow data structures with assets. In a specific implementation, a human or artificial agent can change workflow parameters, such as asset availability, to predict when a workflow will be completed, determine the impact of changing a workflow on other workflows, or the like. In a specific implementation, the workflow generation engine 116 provides a prediction regarding the probability a workflow will go as planned. For example, if an asset is unreliable, reliance on the asset will result in an increased probability of disruption in the workflow. The workflow generation engine 116 can populate a workflow with asset synthesis instantiations using selected workflow parameters (and using, e.g., the asset synthesis instantiation engine 124).

The persona-to-persona connectivity engine 118 is intended to represent an engine that synchronizes personas for interaction. Meeting enablers are available, such as Google Hangouts Meet, Skype for Business, and Go to Meeting, but such products only facilitate fixing a schedule for a meeting between humans, not personas representing agents of a workflow. By maintaining a virtual network of personas, rather than humans, personas can more readily be integrated into an asset synthesis instantiation.

The SPI facilitation engine 120 is intended to represent an engine that reduces real-world barriers to efficient incorporation of personas into asset synthesis instantiations. Meeting schedulers are available, such as Meetingbird, but such products fail to include workflow- and persona-specific parameters in an automated workflow advancement engine (plus workflow-integrated recommendation engine for agents with decision-making authority). By incorporating workflow parameters with a virtual network of personas, rather than humans with calendars, personas can more readily be integrated into an optimized workflow. (It may be noted that optimization can be for a variety of parameters, such as cost, completion time, throughput, etc.)

The asset synthesis instantiation engine 122 is intended to represent an engine that brings together virtual assets and personas in a manner that optimally utilizes the assets and personas for a configurable time span in a configurable one or more locations as part of a workflow. For simplicity, it will generally be assumed "optimized" refers to a balance of minimizing cost across workflows while meeting deadlines (usually imposed at a higher hierarchical level). Depending upon implementation-specific, configuration-specific, or other considerations, optimization can be for cost optimization for a span of time, switched to speed optimization for some reason, such as when a deadline looms, or some other optimization, such as throughput, or a hybrid.

The SPI outcome generation engine 124 is intended to represent an engine that facilitates workflow progress responsive to synchronized persona interaction. Meeting management products are available, such as Meetingsift and Meetingking, but such products only facilitate group processes in in-room and remote meetings with task creations, not outcome generation for synchronized personas. By using asset synthesis instantiations that include personas and assets, rather than human participants in meetings, characteristics of the various virtual components, as well as results of any interaction, can more readily be integrated into a workflow.

The workflow analytics engine 126 is intended to represent an engine that analyzes the historical effectiveness of assets, including the effectiveness of assets considered in the aggregate, e.g., for a given workflow or across workflows. Workflow analytics enables, e.g., management to make qualitative (and quantitative) decisions regarding such things as compensation, maintenance schedules, trying alternative products, or the like.

The qualified resources 128 are intended to represent network devices, end user devices, and other devices coupled to the computer-readable medium 102, as well as conference rooms, furniture, and other compositions of matter that are known to an enterprise. Qualified, as used here, is intended to mean detected via a network device, having at least one characteristic detected via a sensor, available via a network, or explicitly qualified as an available resource by an agent. The qualified resources 128 are represented in the resource datastore 114. The engines associated with generating new data for the datastores 104-114 are considered part of the qualified resources 128. For example, a networked device may include a computer through which an administrator provides values for parameters of a persona data structure in the persona datastore 112, a camera and image analysis engine that creates a persona data structure for an unknown human detected by the camera (and perhaps later the data structure of the unknown human is merged with another persona data structure if it turns out the unknown human and a human associated with an extant data structure are one in the same), or an RFID sensor for detecting an RFID tag affixed to an article of clothing (data associated with the article of clothing can be stored in the resource datastore 114 in association with the RFID tag in this example), to name a few. Thus, the qualified resources 128 have associated data structures in the resource datastore 114, but data structures for people and objects that can be detected by at least one networked device (if not entered into the system in some other manner) are also "networked" in the sense they are known to the network, but would not normally be considered "networked devices" per se. At least some of the qualified resources 128 could alternatively be referred to as things (as in "Internet of things").

In a specific implementation, the resource datastore 114 can be augmented dynamically when new physical resources are discovered, such as in accordance with a bring your own device (BYOD) policy when employees bring their personal devices to work. In such an implementation, if the employee is represented in the persona datastore 112, the persona data structure can be linked to the resource data structure in the resource datastore 114 associated with the relevant personal device. In a specific implementation, the persona datastore 112 can be augmented dynamically when a new person is discovered, such as via security camera. In such an implementation, the resource used to detect the person can be linked to the persona data structure in the persona datastore 112.

The workflow-to-reality integration engine 130 is intended to represent an engine that integrates workflows with the real world. Advantageously, knowledge of workflow, persona, and resource data structures allows for meaningful historical analysis of real-world assets, rating or rewarding resources or personas, allocation of real-world assets to real-world problems, and prediction of real-world consequences for the allocation or for generating and completing workflows.

An example of operation, using FIG. 1 as an example, involves the workflow generation engine 116 creating a business workflow data structure in the business workflow datastore 104. The workflow generation engine 116 may receive input from a human agent represented with a persona data structure in the persona datastore 112. The human agent may utilize assets, such as a computer, office space, software, etc. with resource data structures in the resource datastore 114 to create the business workflow data structure. For conceptual purposes, the business workflow can be thought of as a framework onto which projects can be affixed. However, business workflows can be treated in a manner similar to projects (as described later), but for director-level work.

The persona-to-persona connectivity engine 118 facilitates connecting directors (or officers, supervisors, or staff) with one another or outside personas. The persona-to-persona connectivity engine 118 consults the persona datastore 112 to find potential connections (e.g., via a contacts list) and potential connection timing (e.g., via a calendar). If a potential connection is not represented in the persona datastore 112, the persona data structure is created by providing at least some information associated with the potential connection, which will typically include contact information. Depending upon implementation-specific, preference, or other considerations, the potential connection may be requested to RSVP if the persona-to-persona connectivity engine 118 cannot authoritatively modify the potential connection's calendar (e.g., due to a lack of access to the relevant calendar, permission, or the like).

The SPI facilitation engine 120 synchronizes personas virtually. The synchronization can be characterized as corresponding to, e.g., what would be referred to as a meeting in the physical world. The more information available in the persona datastore 112, the greater the likelihood of the virtual synchronization matching the actual meeting. For example, if the persona datastore 112 indicates a director will be available at the time of a potential meeting and that the director has nothing else on his or her calendar, then the SPI facilitation engine 120 can synchronize the persona of the director with other potential attendees with a reasonable likelihood of the director being able to attend. Backups can be built in. For example, a director who is believed to be on location may turn out to be remote, but remote access technology may be available to address the problem.

The asset synthesis instantiation engine 122 matches resources to personas and integrates the synthesis into a workflow. Resources, such as conference rooms or remote access technology, represented with resource data structures in the resource datastore 114, can be allocated as applicable (if not already pre-allocated) to facilitate connections in the physical world. Asset synthesis instances are the footprint of past (historical), present (ongoing), or future (planned) events in the real world that include at least one persona or resource at a set of coordinates in virtual space-time.

The SPI outcome generation engine 124 updates asset synthesis instances with data associated with the corresponding event in the real world. Advantageously, the SPI outcome generation engine 124 can update workflows in real time using sensors (such as cameras and microphones) or explicit input from humans at the event and, during or after the event is over, generate reports regarding the event. Because the instance is part of a workflow, outcomes become part of the workflow, as well.

The workflow analytics engine 126 generates information about personas and resources useful to assess performance, predicts progress across one or more workflows, and generates information useful in modeling future workflows.

The qualified resources 128 are used to instantiate the asset synthesis instances in the real world. The qualified resources 128 act as facilitators, such as a camera, network, and display used to establish local presence for a person when physical attendance is not possible; a wireless access point (WAP) used to establish network connectivity for end-user devices; or a suitable conference room that acts as a location in which attendees can gather, to name several.

The workflow-to-reality integration engine 130 provides an interface to human agents regarding the effectiveness of asset synthesis instances in the real world.

Figure 2:
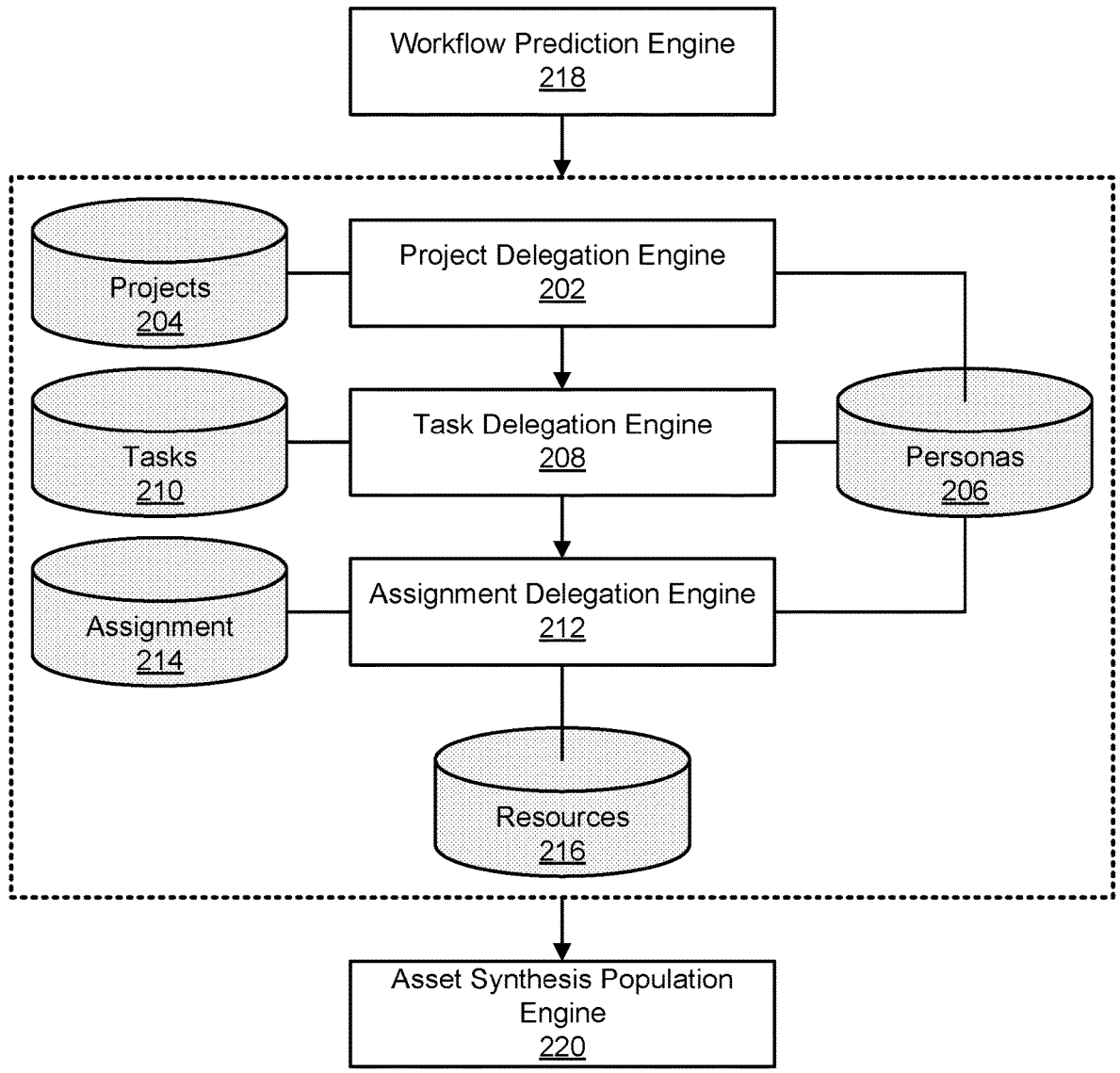
FIG. 2 depicts a diagram of an example of a workflow generation engine.

FIG. 2 depicts a diagram 200 of an example of a workflow generation engine. The diagram 200 includes a project delegation engine 202, a projects datastore 204 coupled to the project delegation engine 202, a personas datastore 206 coupled to the project delegation engine 202, a task delegation engine 208 coupled to the project delegation engine 202 and the personas datastore 206, a tasks datastore 210 coupled to the task delegation engine 208, an assignment delegation engine 212 coupled to the task delegation engine 208 and the personas datastore 206, an assignments datastore 214 coupled to the assignment delegation engine 212, and a resources datastore 216 coupled to the assignment delegation engine 212. The diagram 200 also includes a workflow prediction engine 218 and an asset synthesis population engine 220 coupled to the above components.

The project delegation engine 202 is intended to represent an engine that assigns projects in the projects datastore 204 to personas in the personas datastore 206. Assignment to a project can be by a human or artificial agent. In a specific implementation, newly created projects include a set of tasks, each of which has task attributes, though the project may initially not include all tasks and the tasks may or may not include all task attributes. Advantageously, as described below, personas can be updated over time based upon performance and the project delegation engine 202 can assign those personas that are most suited to a project based upon credentials and past performance.

The task delegation engine 208 is intended to represent an engine that assigns tasks in the tasks datastore 210 to personas in the personas datastore 206. Assignment to a task can be by a human or artificial agent. In a specific implementation, a task attribute change request for a new task that is added to an intentionally or unintentionally incomplete project is approved by an officer and may trigger the task delegation engine 208 to assign a task to a new supervisor; officers may or may not be responsible for approving some or all task attribute change requests, any of which can trigger the task delegation engine 208 to re-assign a task. Advantageously, as described below, personas can be updated over time based upon performance and the task delegation engine 208 can assign those personas that are most suited to a task based upon credentials and past performance.

The assignment delegation engine 212 is intended to represent an engine that associates assignments in the assignments datastore 214 with personas in the personas datastore 206 and resources in the resources datastore 216 to the assignment. Assignment can be by a human or artificial agent. Advantageously, as described below, personas can be updated over time based upon performance and the assignment delegation engine 212 can assign those personas that are most suited to an assignment based upon credentials and past performance. Although the example of FIG. 2 depicts the resources datastore 216 as coupled to the assignment delegation engine 212, depending upon implementation-specific, preference-specific, or other considerations, resources could instead or in addition be assigned to tasks or projects.

The workflow prediction engine 218 is intended to represent an engine that provides an interface to a human agent to facilitate workflow completion times, costs, odds of success, and/or other parameters. In a specific implementation, the human agent can modify workflow parameters to obtain different predicted results for a particular allocation of assets. In a specific implementation, the workflow prediction engine 218 receives workflow analytics, described later, which improve prediction accuracy.

The asset synthesis population engine 220 is intended to represent an engine that populates a workflow with placeholders for asset synthesis instances generated by an asset synthesis instantiation engine. In a specific implementation, the placeholder population is set by a human or artificial agent. In an alternative, the asset synthesis instantiation engine generates asset synthesis instances in lieu of placeholders, either at the time a workflow is generated or later.

An example of operation, using FIG. 2 as an example, involves the project delegation engine 202 assigning to a project in the projects datastore 204 a persona in the persona datastore 206. In a specific implementation, the projects are generated over the course of a business workflow by directors and the personas represent officers of a real world enterprise.

The task delegation engine 208 assigns a task in the tasks datastore 210 to a persona in the persona datastore 206. In a specific implementation, the tasks are generated over the course of a business workflow by directors as an explicit part of a project, by an officer assigned the project, or in some other applicable manner, and the personas represent supervisors of a real world enterprise.

The assignment delegation engine 212 associates an assignment in the assignments datastore 214 to a persona in the persona datastore 206 and resources in the resources datastore 216. In a specific implementation, the assignments are generated over the course of a business workflow by directors as an explicit part of a project and a task of the project, by an officer as an explicit part of a project and a task of the project, by a supervisor as part of a task, or in some other applicable manner, and the personas represent staff of a real world enterprise.

The workflow prediction engine 218 provides predictions for selected parameters as requested. The asset synthesis population engine 220 inserts placeholders within a workflow for subsequent asset synthesis instantiation.

Figure 3:
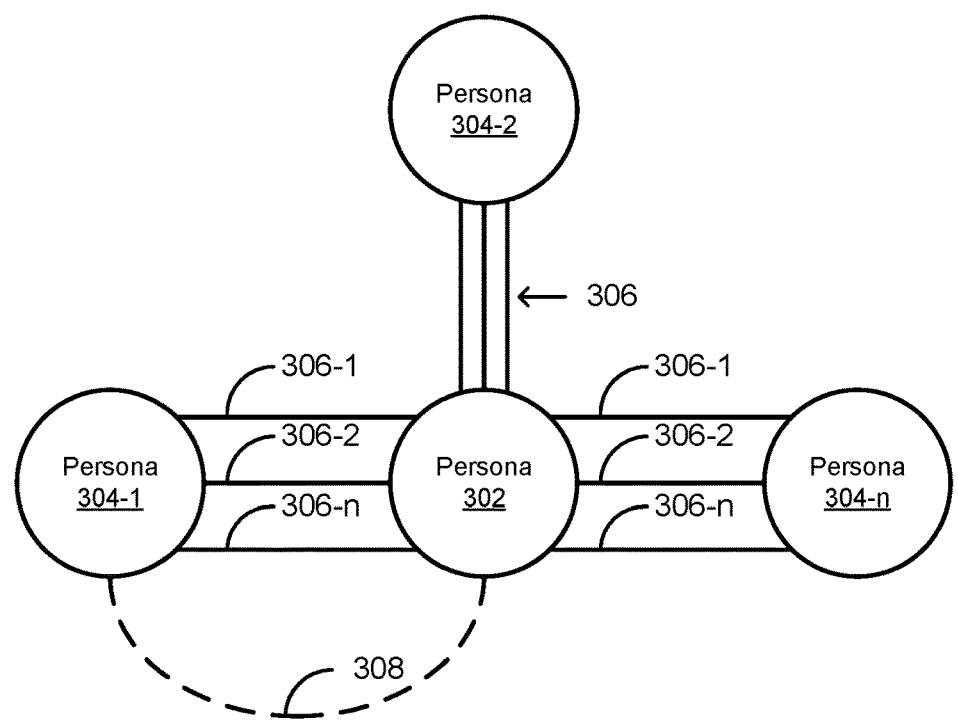
FIG. 3 depicts a diagram of an example of a persona-to-persona connectivity graph.

FIG. 3 depicts a diagram 300 of an example of a persona-to-persona connectivity graph. It may be noted the "n's" in the diagram 300 are not intended to represent the same number; two different n's may have two different values. The diagram 300 includes a persona node 302 and a persona node 304-1 to a persona node 304-n (the persona nodes 304). The persona node 302 is coupled to the persona nodes 304 via a resource edge 306-1 to a resource edge 306-n (the resource edges 306). The persona node 302 is coupled to the persona node 304-1 via a workflow relationship edge 308. Each persona node 302, 304 can be coupled to other persona nodes via a workflow relationship edge (not shown), though the workflow relationship edge can represent "no relationship."

The persona node 302 is intended to represent an entry of a persona datastore that corresponds to a human agent. For illustrative purposes, it is assumed the human agent has a workflow assignment. The persona nodes 304 are intended to represent other entries in the persona datastore that correspond to other humans.

The workflow resource edges 306 correspond to real-world resources that are shared between the persona node 302 and the persona nodes 304. The set of workflow resource edges between the persona node 302 and, e.g., the persona node 304-1 can include a telephone number through which the human agent corresponding to the persona node 302 can contact the human associated with the persona node 304-1 (who may also have the telephone number of the human agent corresponding to the persona node 302), a dial-in number and associated teleconference-supporting engines, an email address, a shared drive, a conference room, a restaurant reservation, or some other device or location through which individuals can communicate either directly or indirectly that is known to an applicable persona-to-persona connectivity engine.

The workflow relationship edge 308 corresponds to a workflow data structure in a workflow datastore (e.g., a business, project, task, or assignment datastore). By maintaining a workflow relationship, an SPI facilitation engine can more readily contribute to ease of managing workflows. For example, by maintaining data on both connectivity, via a workflow resource, and workflow relationship, it becomes significantly easier to evaluate work done by a human agent within the workflow and effectiveness of a resource within the workflow, particularly as impacted by an asset synthesis instance. In a specific implementation, a human agent can have an effectiveness rating associated with converting business development lunches into business (including time, cost, position, credentials, and other metrics), workflow advancement meetings with other workflow stakeholders (including time and cost metrics, as well as influence of respective stakeholders on the human agent), software utilization, or some other asset synthesis instance that links a human agent with a resource or other human.

Figure 4:
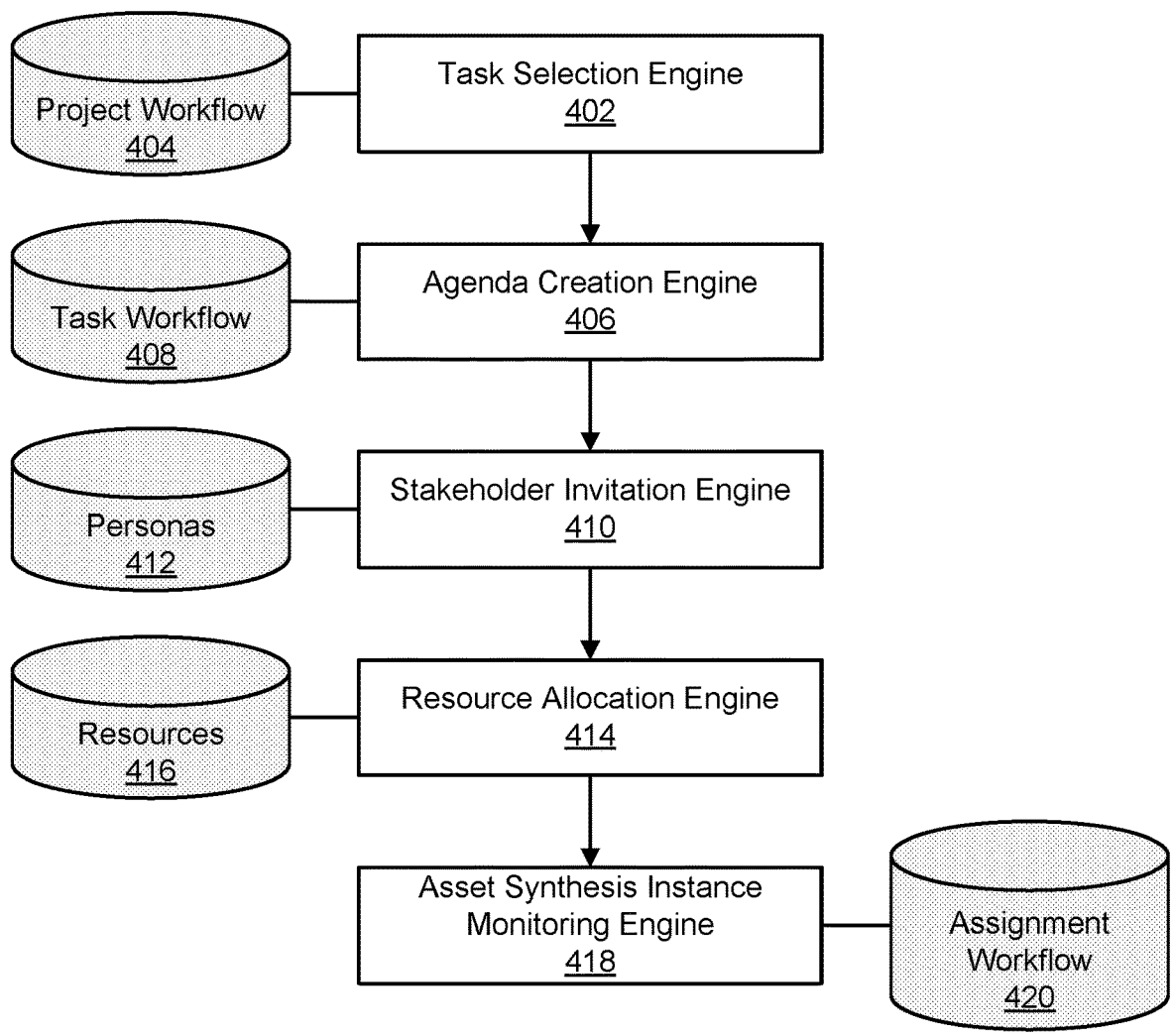
FIG. 4 depicts a diagram of an example of an asset synthesis engine.

FIG. 4 depicts a diagram 400 of an example of an asset synthesis engine. The diagram 400 includes a task selection engine 402, a project workflow datastore 404 coupled to the task selection engine 402, an agenda creation engine 406 coupled to the task selection engine 402, a task workflow datastore 408 coupled to the agenda creation engine 406, a stakeholder invitation engine 410 coupled to the agenda creation engine 406, a personas datastore 412 coupled to the stakeholder invitation engine 410, a resource allocation engine 414 coupled to the stakeholder invitation engine 410, a resources datastore 416 coupled to the resource allocation engine 414, an asset synthesis instance monitoring engine 418 coupled to the resource allocation engine 414, and an assignment workflow datastore 420 coupled to the asset synthesis instance monitoring engine 418.

The task selection engine 402 is intended to represent an engine that selects a task from a project data structure in the project workflow datastore 404. In a specific implementation, the task can be selected by either a human agent or an artificial agent, depending upon the project and/or task parameters. In this example, task selection is from a project data structure, but other datastores (e.g., a task workflow, business workflow, assignment workflow, persona, or other datastore) could be used to assist in the selection. For example, if a persona parameter indicates a human agent corresponding to the persona data structure functions better with more frequent supervision, tasks to which the persona is assigned can be selected more frequently than typical. As another example, if a resource parameter indicates maintenance of a resource should be scheduled with a certain frequency, tasks to which the resource is allocated can be selected in accordance with the recommended schedule. As a third example, if a supervisor has a preference, tasks to which the supervisor is assigned can be scheduled in accordance with the supervisor's preference.

The agenda creation engine 406 is intended to represent an engine that forms from a template an asset synthesis instance that includes an agenda designed to advance a task represented by a task workflow data structure in the task workflow datastore 408. In a specific implementation, when a task engine 208 assigns tasks to personas, workflow prediction engine 218 is triggered and a timeline to complete a task is determined at assignment workflow datastore 110 or by Asset synthesis Instantiation engine (112) during a meeting. Based on the timeline, Asset Synthesis instantiation engine (112) is triggered, which creates a meeting along with the agenda. In a specific implementation, a meeting is generated/created automatically when a timeline (deadline) is reached. In a specific implementation, asset synthesis instances build upon one another over time. For example, the agenda creation engine 406 may have access to meeting minutes, persona ratings, resource contribution ratings, transcripts, file histories, or the like of a first asset synthesis instance for a task when creating an agenda for a second asset synthesis instance for the task. In a meeting-specific example, there is a link between previous meeting discussions (in form of minutes) on a particular task. Hence the host can pick the agenda from previous discussion minutes on the same task. By utilizing meeting minutes or other relevant data, redundancy and other inefficiency can be ameliorated in subsequent agendas. In a specific implementation, Project delegation engine (202), task delegation engine (206), and assignment delegation engine (212) are fetched to populate the agenda (in Agenda Creation Engine (406)) when an asset synthesis is instantiated. In a specific implementation, when a meeting is generated, personas involved in the task are automatically populated in the agenda for the meeting; the link between the task and persona are used and later updated in the SPI facilitation engine 122 so the corresponding calendars of the personas are blocked out. The agenda creation engine 406 can assign a sub-assignment (e.g., responsibility for providing a status update in a meeting) to an appropriate persona so key personas are automatically populated for a selected agenda.

The stakeholder invitation engine 410 is intended to represent an engine that contacts human agents represented by persona data structures in the personas datastore 412. Relevant personas are matched to the asset synthesis instance by name, by role, or by some other parameter. In a specific implementation, each relevant persona data structure includes contact information sufficient to invite respective human agents to participate in the asset synthesis instance. As teams grow, calendars become so busy that manual scheduling becomes highly inefficient and distracts from critical work. In a specific implementation, the stakeholder invitation engine 410 considers calendar settings of personas and availability of resources to suggest a good time to meet. Depending upon implementation-specific, preference-specific, or other considerations, supervisors can limit an asset synthesis instance to a given time span (causing the stakeholder invitation engine 410 to settle on a time within the time span), require explicit RSVPs, make some participants optional, or constrain the stakeholder invitation engine 410 in some other manner.

The resource allocation engine 414 is intended to represent an engine that allocates qualified resources represented by resource data structures in the resource datastore 416 to the asset synthesis instance by identification, by type, or by some other parameter. In a specific implementation, each relevant resource data structure includes identifying information sufficient to inventory respective qualified resources used in the asset synthesis instance.

The asset synthesis instance monitoring engine 418 is intended to represent an engine that monitors an asset synthesis instance in real time. In a specific implementation, presence and participation are parameterized in an assignment workflow data structure in the assignment workflow datastore 420. The asset synthesis instance can be treated as an assignment with, if applicable, multiple associated personas. Thus, asset synthesis instances can be characterized as a type of assignment with a start time and an end time (plus, potentially start and end times for preparation and follow-up thereto). Due to the hierarchical nature of workflows, the assignment workflow data structure is part of the assignment workflow datastore 420, but also part of the task workflow datastore 408 and the project workflow datastore 404. Also, the assignment workflow data structure includes a link (or reference) to personas and resources in the personas datastore 412 and the resources datastore 416, making aspects of the assignment workflow data structure part of each.

As was previously mentioned, sub-assignments can be associated with personas of an asset synthesis instance, the resolution of which can be converted into minutes, log files, or some other memorialization of the sub-assignment that can be made part of the assignment workflow datastore 420. Sub-assignment resolutions can be shared with attendees, used to improve an agenda in the next meeting, used to rate a persona assigned to the sub-assignment, or the like.

Figure 5:
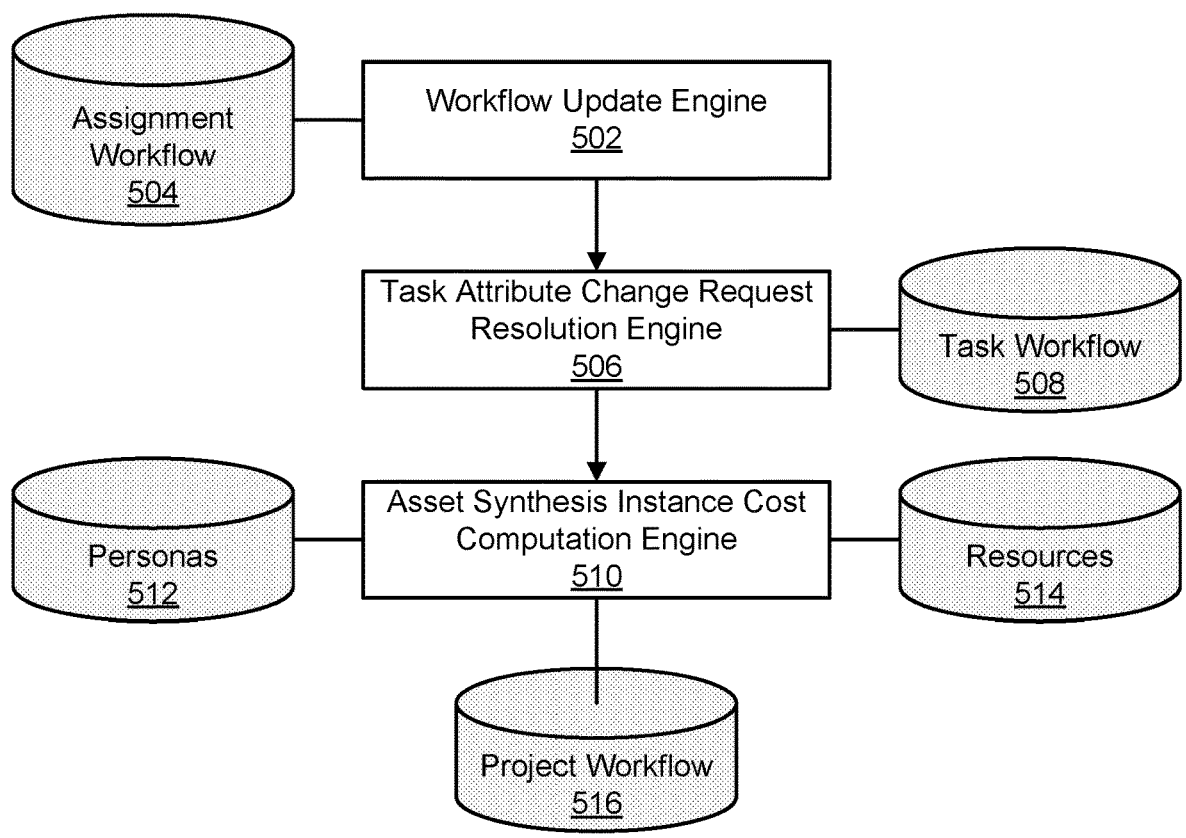
FIG. 5 depicts a diagram of an example of a synchronized persona interaction outcome generation engine.

FIG. 5 depicts a diagram 500 of an example of a synchronized persona interaction outcome generation engine. The diagram 500 includes a workflow update engine 502, an assignment workflow datastore 504 coupled to the workflow update engine 502, a task attribute change request resolution engine 506 coupled to the workflow update engine 502, a task workflow datastore 508 coupled to the task attribute change request resolution engine 506, an asset synthesis instance cost computation engine 510 coupled to task attribute change request resolution engine 506, a personas datastore 512 coupled to the asset synthesis instance cost computation engine 510, a resources datastore 514 coupled to the asset synthesis instance cost computation engine 510, and a project workflow datastore 516 coupled to the asset synthesis instance cost computation engine 510.

The workflow update engine 502 is intended to represent an engine that updates an assignment data structure in the assignment workflow datastore 504. In a specific implementation, the supervisor assigned to a task that includes the assignment workflow has the authority to delegate a persona to an assignment responsive to results of an asset synthesis instance. The workflow update engine 502 can also create a new assignment data structure for a new assignment and delegate a persona to it, or delete an assignment data structure if the corresponding assignment is moot. A delegee will typically be given access to at least a portion of the asset synthesis instance memorialization (e.g., meeting minutes).

The task attribute change request resolution engine 506 is intended to represent an engine that generates a request to change task attributes because a supervisor is not authorized to make the change directly and updates the task workflow datastore 508 if the request is approved. In a specific implementation, the task attribute change request is provided to an officer for approval; if not approved, the task workflow datastore 508 may or may not still be updated to keep a historical record of the denied task attribute change request, which may be noteworthy in analytics. In a specific implementation Task delegation Engine (208) and Task attribute change request engine (506) have options for change management. When the replacement is done, and updated in the persona datastore (512), the corresponding changes are done in all the instances, say in task delegation engine (208) and also in meeting agenda. Task Delegation Engine (208) can be triggered to change the persona for the related asset synthesis instantiation. In a specific implementation, when a meeting is instantiated with a persona who is involved in a task mentioned in the agenda due to emergency if the persona is not available, a request can be triggered for a replacement.

The asset synthesis instance cost computation engine 510 is intended to represent an engine that computes multiple cost parameters (e.g., opportunity cost, wages, risk, etc.) of a persona data structure in the personas datastore 512 and of a resource data structure in the resources datastore 514, and updates the project workflow datastore 516 to include the cost parameters. In a specific implementation, the cost parameters impact not only a project that includes a relevant asset synthesis instance, but also projects that are impacted by opportunity costs.

Figure 6:
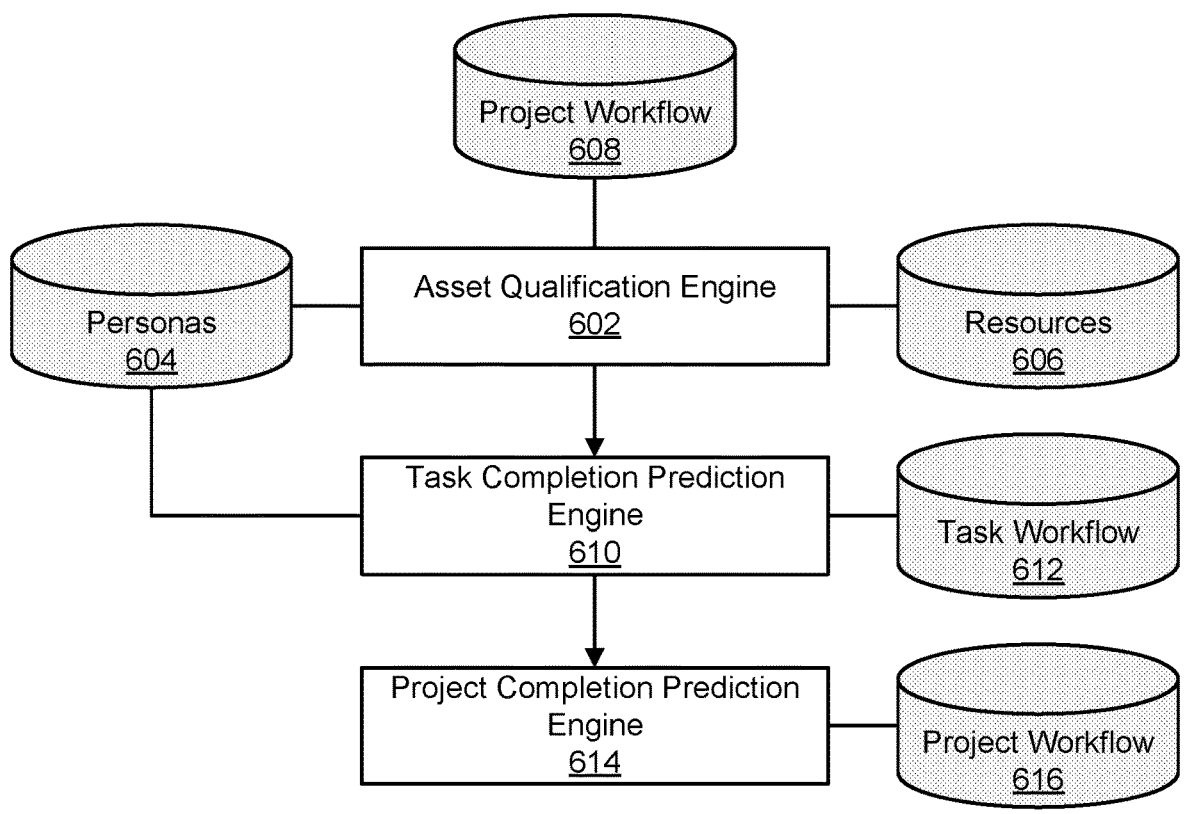
FIG. 6 depicts a diagram of an example of a workflow analytics engine.

FIG. 6 depicts a diagram 600 of an example of a workflow analytics engine. The diagram 600 includes an asset qualification engine 602, a personas datastore 604 coupled to the asset qualification engine 602, a resources datastore 606 coupled to the asset qualification engine 602, a project workflow datastore 608 coupled to the asset qualification engine 602, a task completion prediction engine 610 coupled to the asset qualification engine 602, a task workflow datastore 612 coupled to the task completion prediction engine 610, a project completion prediction engine 614 coupled to the task completion prediction engine 610, and a project workflow datastore 616 coupled to the project completion prediction engine 614.

The asset qualification engine 602 is intended to represent an engine that rates persona data structures in the personas datastore 604 and resource data structures in the resources datastore 606 using project workflow data structure parameters in the project workflow datastore 608. In a specific implementation, human agents provide a rating for resources assigned to an asset synthesis instance, such as the impact of the resource on task completion, which is stored in association with the resource. Alternatively or in addition, asset (persona and resource) costs are combined to obtain overhead for an asset synthesis instance and compared to an overhead threshold such as an organization meeting cost target, a control threshold (actually or theoretically computed to determine cost for projects in which asset synthesis instances are omitted), or an ideal threshold (typically theoretically or predictively computed to determine cost for projects in which a workflow is strategically populated with asset synthesis instances), to name a few.

In a specific implementation, the asset qualification engine 602 includes a strike rate computation engine (not shown). Strike rate is defined as tasks completed per unit time of asset synthesis instances in which a human agent represented as a persona data structure in the personas datastore 604 is a participant. A 100 minute unit time has been found to be a convenient value in a hypothetical business workflow, but preferences may vary. Because it is easy to manipulate numbers to remove fractions, it makes little difference whether the strike rate is 1 minute unit time or 100 hours unit time because the strike rate can be multiplied by a value when presenting to a human agent (for readability), but 100 minutes has been found to require no manipulation to aid readability in at least one white collar business context. It may be desirable to use a logarithmic scale if strike rates vary a great deal between human agents, though it seems unlikely strike rate values will be so disparate as to require a logarithmic scale unless comparing dramatically different individuals.

The task completion prediction engine 610 is intended to represent an engine that uses a mean strike rate parameter of a persona data structure in the personas datastore 604 and a complexity parameter of a task data structure in the task workflow datastore 612 to predict time to complete a target task. Instead or in addition, the persona data structure includes a behavior pattern for completing a task reckoned to be similar to the target task, which the task completion prediction engine 610 uses to predict time to complete the target task. Extrapolating a persona's behavior pattern in completing a task that is reckoned to be similar to a target task to predict time to complete the target task by comparing similar characteristic data after large amount of data is accumulated in a business workflow datastore may improve prediction accuracy.

The project completion prediction engine 614 is intended to represent an engine that considers each component task of a project data structure in the project workflow datastore 616 to predict a project completion time. Advantageously, the project completion prediction engine 614 can make a relatively straight-forward prediction because the task completion times have already been modified to take into account asset (human and resource) availability to conform to organizational targets, making the project prediction essentially a sum of task completion predictions minus time tasks that can be completed in parallel.

Figure 7:
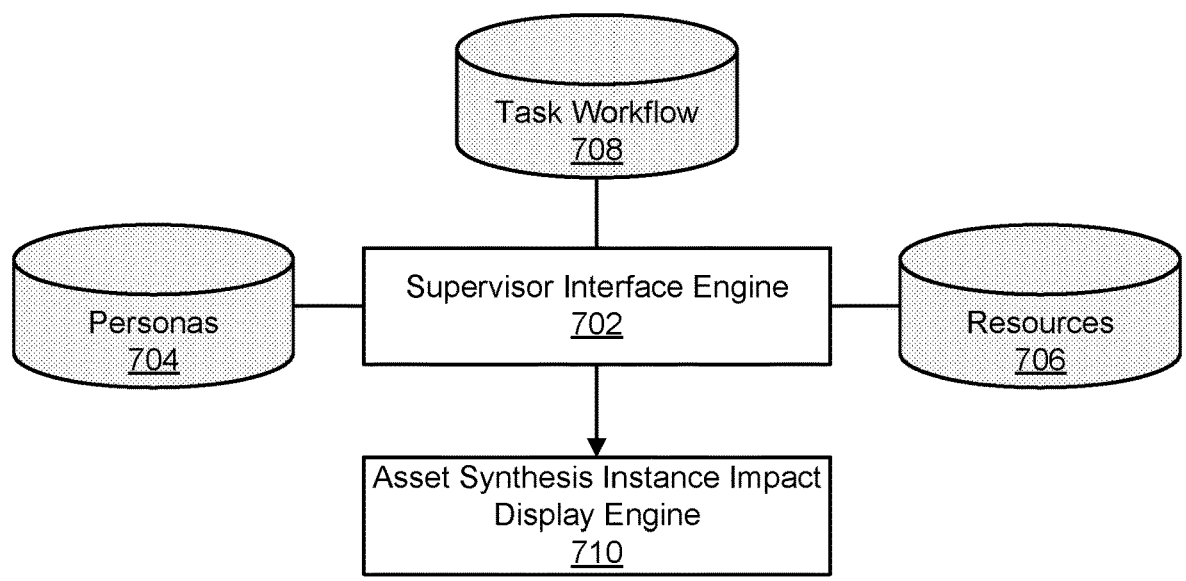
FIG. 7 depicts a diagram of an example of a workflow-to-reality integration engine.

FIG. 7 depicts a diagram 700 of an example of a workflow-to-reality integration engine. A workflow-to-reality integration engine incorporates the principle that at least three variables impact task completion: resource availability, staff proficiency, and supervisor capabilities. Resource availability may mean availability of a resource with a constraint (e.g., a cost constraint). Staff proficiency becomes increasingly relevant as assignments become increasingly specialized. Supervisor capabilities can include maneuverability within a constraint (e.g., a cost constraint). The diagram 700 includes a supervisor interface engine 702, a personas datastore 704 coupled to the supervisor interface engine 702, a resources datastore 706 coupled to the supervisor interface engine 702, a task workflow datastore 708 coupled to the supervisor interface engine 702, and an asset synthesis instance impact display engine 710 coupled to the supervisor interface engine 702.

The supervisor interface engine 702 is intended to represent an engine that enables a supervisor to access meaningful metrics regarding human agents represented as persona data structures in the personas datastore 704, qualified resources represented as resource data structures in the resources datastore 706, and tasks represented as task workflow data structures in the task workflow datastore 708, the combination of which represent a historical record of a real world implementation of the task or a planned or predicted real world implementation of the task.

The asset synthesis instance impact display engine 710 is intended to represent an engine that computes impact for provisioning to a supervisor via the supervisor interface engine 702. In a specific implementation, impact level is computed as a sum of asset synthesis instance times divided by the time taken to complete a task; task complexity is easy, average, or complex (as set by a human agent, such as a supervisor of the task, or an artificial agent), and impact range is categorized as 0-33% (low impact, high index), 33-66% (medium impact, medium index), and 66-100% (high impact, low index). A Complex Task completed with fewer and shorter asset synthesis instances (e.g., meetings and meeting times) is indicative of a good maneuvering capability of a supervisor. In other words, direction given to staff is more likely to be clear, meetings are more likely to have been conducted efficiently, etc. This would generally be considered a valuable quality in a supervisor. On the other hand, an easy task completed with more and longer asset synthesis instances is indicative of poor maneuvering capability of a supervisor.

A matrix used for gamifying the task completion process is as follows:

TABLE 1

Method to find persona ratings based on task completion capability.

|  | Low Impact | Medium Impact | High Impact |
| --- | --- | --- | --- |
| Complex: | Rating A | Rating D | Rating G |
| Average Complexity: | Rating B | Rating E | Rating H |
| Easy: | Rating C | Rating F | Rating I |

When number of tasks is less, the averaged out zone can be treated as a rating of a persona. With more numbers, clusters are grouped and a rating can be based on the average. In the 3×3 matrix of this example, there are 9 zones where a task completion rating of a persona could fall. With sparse task completion data, data points are treated individually; the placement of an averaged data point falling in a zone is treated as the rating of a persona. With denser task completion data, data points falling in close proximity are clustered; the placement of averaged cluster falling in a zone is treated as the rating of a persona. The alphanumeric rating (e.g., Rating A, Rating B, . . . ) is intended, in this example, to be representative of vertical sequencing of zones. In an alternative, the 3×3 matrix can be replaced with an N×N matrix because x-axis (impact scale) and y-axis (complexity scale) can be subdivided depending upon implementation-specific, configuration-specific, preference-specific, or other factors. In another alternative, the zones are horizontally sequenced, which would have the effect of "complex task, high impact meeting" having a better rating than "easy task, low impact meeting."

Figure 8:
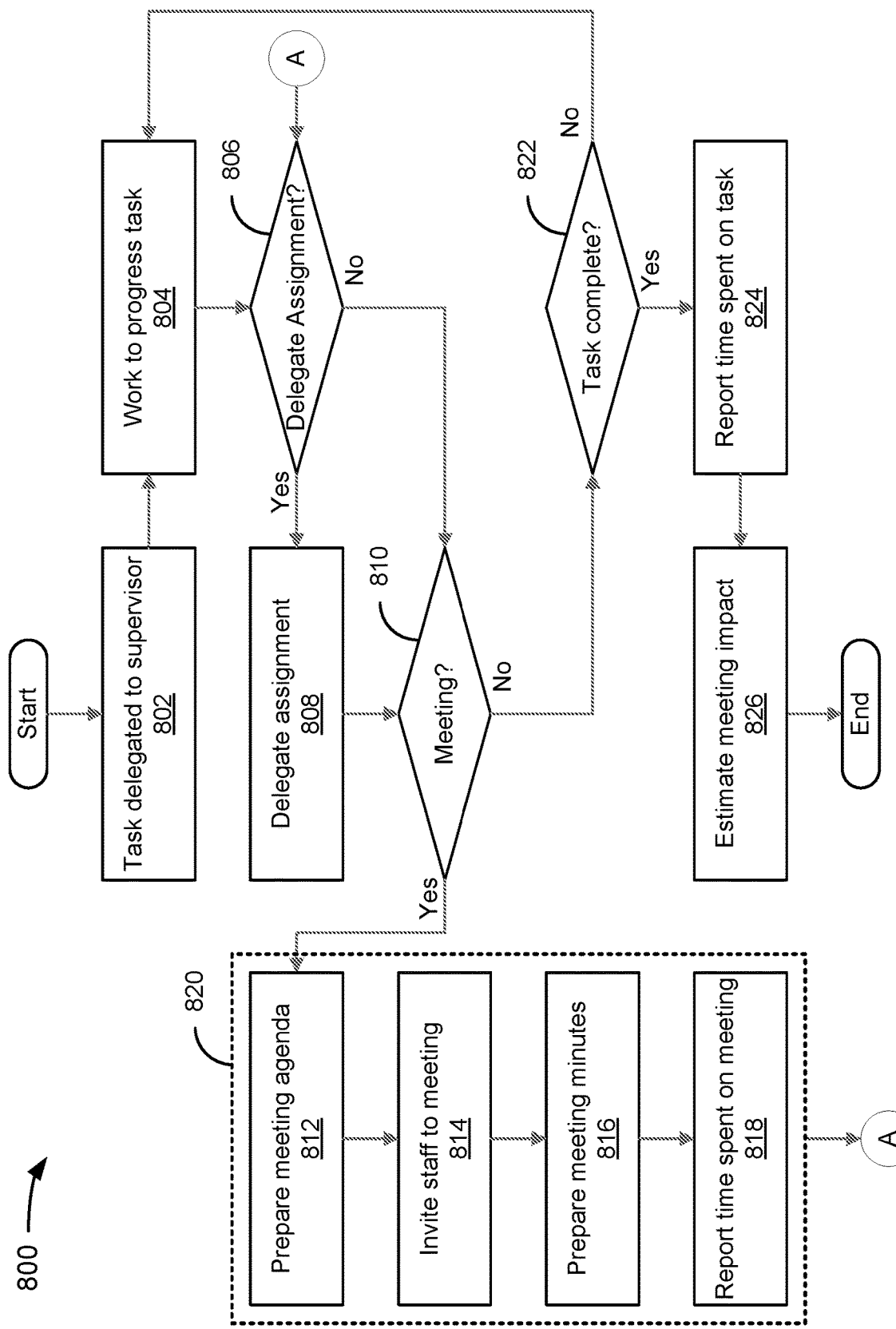
FIG. 8 is a flowchart of an example of task completion.

FIG. 8 is a flowchart 800 of an example of task completion. For illustrative simplicity, asset synthesis instances are limited to meetings and completion of a single task is presented. The flowchart 800 starts at module 802 where a task is delegated to a supervisor. Task delegation can be accomplished via a workflow generation engine, such as the workflow generation engine 116 (FIG. 1), or the task delegation engine 208 (FIG. 2). An officer or agent acting with officer-level authority can delegate one or more tasks from one or more projects, but for simplicity, the delegation of a single task is illustrated in the example of FIG. 8. Advantageously, an officer can take advantage of knowledge of personas and resources and, in particular, task (or assignment) dependencies, allowing for delegations that optimize metrics (e.g., throughput, cost, or the like, potentially with activity prioritization) across assignments, tasks, and projects. Supervisor availability may be impacted by the delegation of tasks such that delegating the task to the supervisor at module 802 can be impacted by delegation of as-of-yet incomplete tasks or intended delegation to tasks; this can be characterized as choosing an available supervisor for the delegation. The choice of supervisor may also be impacted by a rating, qualification, or other parameter of a persona data structure associated with the supervisor; this can be characterized as choosing an appropriate supervisor for the delegation. For illustrative simplicity, there is no option in the example of FIG. 8 to re-assign a supervisor to the task, but it may be noted re-delegation would likely be possible in most implementations because supervisors can leave or be asked to leave for a number of reasons and tasks must still be completed.

The flowchart 800 continues to module 804 where the supervisor (and later staff to which assignments are delegated, if applicable) works to progress the task. The supervisor (and/or staff) typically have resources available to enable them to accomplish their tasks, such as a computer, telephone, desk, or other office equipment; smartphone, glasses (to the extent perception enhancement is tracked), automobile, or other personal items, whether owned by the company or the individual; and software licenses, certifications, credit cards, or other permissions, qualifications, or access. Resources that are always available (or are available because they are personally owned) may be sufficient to work to progress a task. At times, however, it may become necessary to create an asset synthesis instance to bring together one or more humans and scarce resources.

The flowchart 800 continues to decision point 806 where the supervisor (or an agent acting on authority thereof) determines whether to delegate an assignment. If it is determined assignments are to be delegated (806—Yes), then the flowchart 800 continues to module 808 where the supervisor (or an agent acting on behalf of the supervisor) delegates an assignment to a staff member. The staff members may or may not be pre-associated with the relevant task workflow, e.g., at or before module 802. Available and appropriate staff members can also be associated with a task workflow, e.g., at module 804 (as part of working to progress a task) or module 808 (by virtue of or as part of the delegation of an assignment). Assignment delegation can be accomplished via a workflow generation engine, such as the workflow generation engine 116 (FIG. 1) or the assignment delegation engine 212 (FIG. 2).

If it is determined assignments are not to be delegated (806—No) or after assignments are delegated (808), the flowchart 800 continues to decision point 810 where the supervisor (or an agent acting on authority thereof) determines whether to call a meeting. Determining a task for which asset synthesis instances (including, specifically for this example, meetings) are appropriate can be accomplished via an asset synthesis instantiation engine, such as the asset synthesis instantiation engine 122 (FIG. 1) or the task selection engine 402 (FIG. 4). Advantageously, a supervisor can take advantage of knowledge of personas and resources and, in particular, task (or assignment) dependencies, allowing for delegations that optimize metrics (e.g., throughput, cost, or the like, potentially with activity prioritization) across assignments, tasks, and projects. For illustrative simplicity, asset synthesis instances in the example of FIG. 8 are limited to "meetings," which are a subset of asset synthesis instances, which could also include conferences, appointments, performances, meals, entertainment, or the like. It may be noted asset synthesis instances can be entered retroactively; for example, a chance meeting between stakeholders could be entered after the meeting already occurred.

If it is determined to call a meeting (810—Yes), then the flowchart 800 continues to module 812 where a meeting agenda is prepared. In a specific implementation, a meeting agenda is prepared by the supervisor or an agent operating with the authority of the supervisor and the meeting agenda is made a part of a task workflow. Asset synthesis instances (including, specifically for this example, meetings) can be accomplished via an asset synthesis instantiation engine, such as the asset synthesis instantiation engine 122 (FIG. 1), or the agenda creation engine 406 (FIG. 4).

The flowchart 800 continues to module 814 where staff are invited to the meeting. Population of asset synthesis instances (including, specifically for this example, meetings) can be accomplished via an asset synthesis instantiation engine, such as the asset synthesis instantiation engine 122 (FIG. 1), or the stakeholder invitation engine 410 (FIG. 4).

The flowchart 800 continues to module 816 where the supervisor (or an agent acting on authority thereof) prepares meeting minutes. Memorialization of asset synthesis instances (including, specifically for this example, meetings) can be accomplished via an asset synthesis instantiation engine, such as the asset synthesis instantiation engine 122 (FIG. 1), or the asset synthesis instance monitoring engine 418 (FIG. 4). Memorialization of an asset synthesis instance can also be accomplished after the asset synthesis instance is complete via an SPI outcome generation engine, such as the SPI outcome generation engine 124 (FIG. 1), or the workflow update engine 502 (FIG. 5).

The flowchart 800 continues to module 818 where time spent on the meeting is reported. In a specific implementation, the report is generated by an agent and sent to an analytics engine. Although in a specific implementation the analytics engine has access to a variety of meeting-specific parameters (such as, e.g., cost), the time parameters are used in this example for illustrative simplicity. Providing parameters of an asset synthesis instance can be accomplished via an SPI outcome generation engine, such as the SPI outcome generation engine 124 (FIG. 1), or the workflow update engine 502 (FIG. 5). The analytics engine can be implemented as an SPI outcome generation engine, such as the SPI outcome generation engine 124 (FIG. 1), or the asset synthesis instance cost computation engine 510 (FIG. 5). Alternatively, the analytics engine can be implemented as a workflow analytics engine, such as the workflow analytics engine 126 (FIG. 1).

The flowchart 800 also returns to decision point 806 and continues as described previously. Precisely when the flowchart 800 returns to decision point 806 depends upon configuration-specific, preference-specific, or other considerations. For example, the supervisor may decide to delegate while preparing a meeting agenda (812), while staff are being invited (814), while meeting minutes are being prepared (816), while time spent on the meeting is being reported (818), or before or after any of the modules 812, 814, 816, 818.

It may be noted that delegation of assignment (808) can occur during a meeting, in which case the module 808 could be considered part of a meeting super-module 820 in those instances in which delegation is part of the meeting. As illustrated in the example of FIG. 8, the modules 812, 814, 816, and 818 are also part of the meeting super-module. Other conceptual groupings are the modules 812, 814 as a "meeting creation" super-module or the modules 816, 808 (when applicable) as a "during meeting" super-module. To the extent the module 804 includes a task selection process preceding a meeting, the module 804 (when applicable) could also be considered part of the "meeting creation" super-module.

Returning once again to decision point 810, if it is determined not to call a meeting (810—No), then the flowchart 800 continues to decision point 822, where it is determined whether the task is complete. If it is determined the task is not complete (822—No), then the flowchart 800 returns to module 804 and continues as described previously. If, on the other hand, it is determined the task is complete (822—Yes), then the flowchart 800 continues to module 824 where time spent on the task is reported. Advantageously, reporting the time spent to complete a task (in combination with analytics) enables a more accurate estimate of how long it takes to complete future tasks both at the outset and at any stage, which reduces the common task management problem of determining how much of a task has actually been completed (which can be analyzed on any applicable metric, such as cost, though a time metric is typical). In a specific implementation, the report is generated by an agent and sent to an analytics engine. A supervisor (or an agent acting on the supervisor's behalf) can indicate the task is complete via a workflow-to-reality integration engine, such as the workflow-to-reality integration engine 130, which sends the report.

The flowchart 800 ends at module 826 where the analytics module estimates meeting impact on the task. Advantageously, the contribution of meetings to task completion can be made readily available to project and task management tools of an organization to improve productivity. The analytics engine can be implemented as a workflow analytics engine, such as the workflow analytics engine 126 (FIG. 1), or the asset qualification engine 602 (FIG. 6), The start and end of the flowchart 800 is intended only for conceptual purposes, a task can be initiated before it is assigned to a supervisor (802) and the impact of the task can extend beyond the meeting impact estimate (826). Task workflow datastore (108) connected to Persona datastore (112) where the input is the time spent by a persona on meetings for the task. Asset synthesis Instantiation engine (112) is connected to Task workflow datastore (108), where the input is time spent on meetings for a particular task. Workflow Analytics engine estimates the impact of meetings (asset synthesis instance) in completing a task. In a specific implementation, estimating impact depends on total time spent on the task and time spent on meetings for the assigned task.

Figure 9:
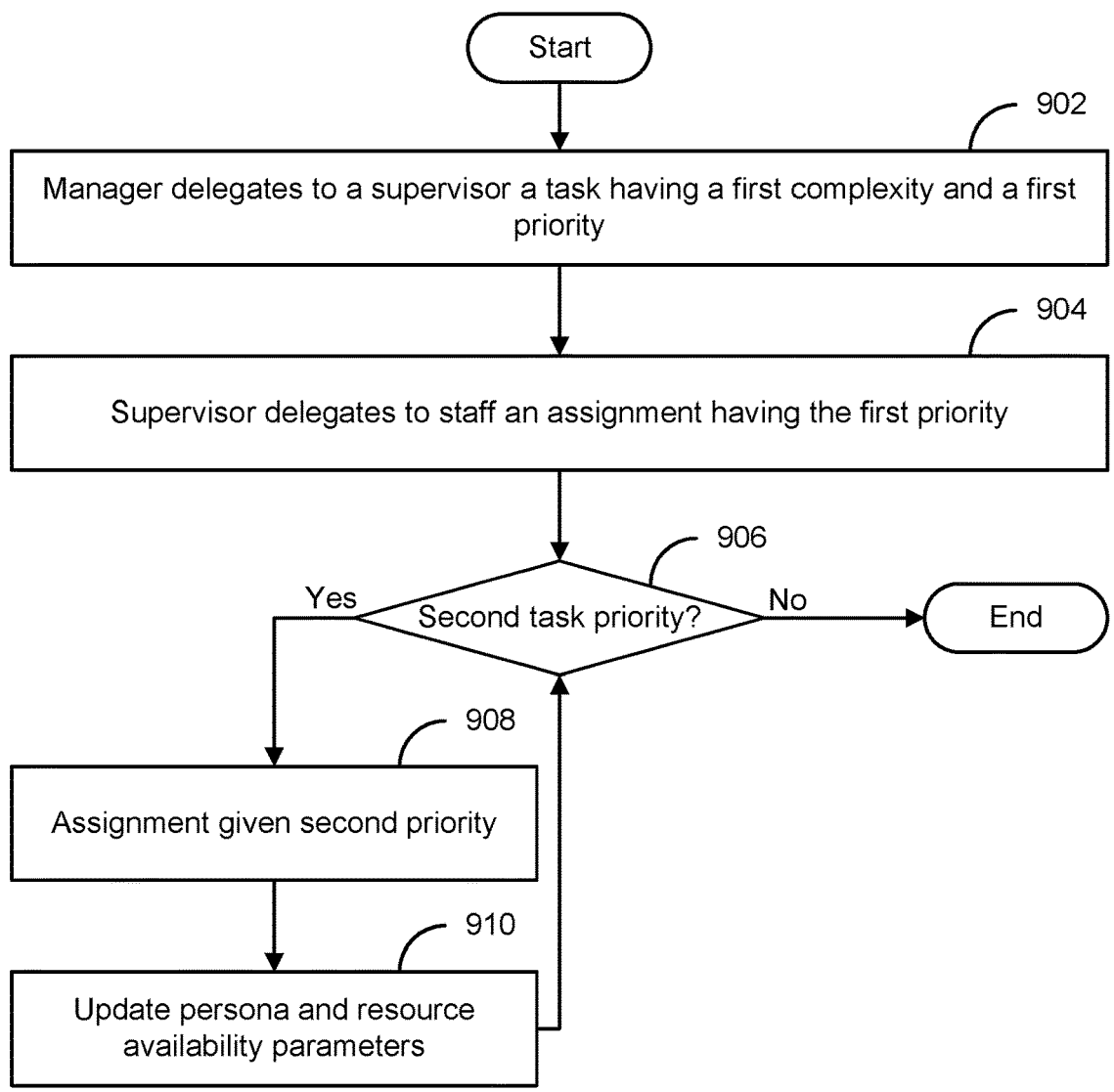
FIG. 9 is a flowchart of an example of changing task priority.

FIG. 9 is a flowchart of an example of changing task priority. The flowchart 900 starts at module 902 where an officer delegates to a supervisor a task having a first complexity and a first priority. The flowchart 900 continues to module 904 where a supervisor delegates to staff an assignment having the first priority. The flowchart 900 continues to decision point 906 where it is determined whether the task is to be given a second priority. If not (906—No), the flowchart 900 ends. If so (906—Yes), the flowchart 900 continues to module 908 where the assignment is given a second priority, to module 910 where persona and resource availability parameters are updated, and then the flowchart 900 continues to decision point 906, as described previously.

The project and its tasks and assignments are all interlinked in the system which is stored in datastore (204, 210, 214, 216 and 206). When module 902 is activated, the system fetches data from datastore (204, 210, 214, 216 and 206) and sets the task and related assignments as the top priority for all the related personas.

Reference is now made to a series of screenshots to illustrate an implementation in use. John is a CEO of a company; John has projects as goals. Francis is a product manager within the company; Francis can be characterized as having projects or tasks as goals. Paul is an associate with experience coordinating with domain experts, such as engineers and marketers; Paul can be characterized as having tasks as goals. John can delegate a project to an officer, such as Francis. Francis can delegate tasks to a supervisor, such as Paul. Paul can delegate assignments to staff.

Figure 10:
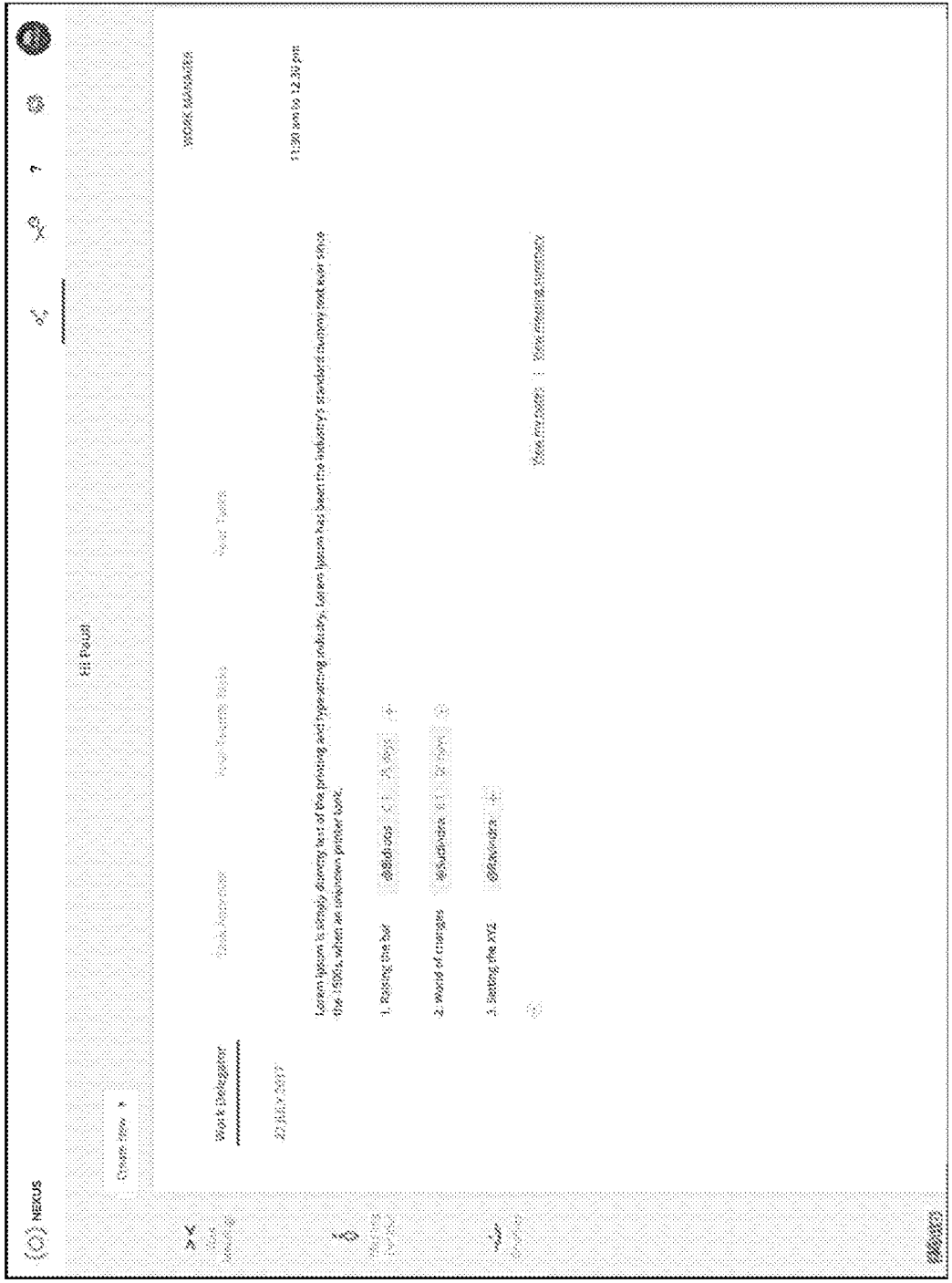

FIG. 10 is a screenshot 1000 of Paul on a Work Delegator tab of a Work Manager page. The screenshot 1000 illustrates three assignments (1. Raising the bar, 2. World of changes, and 3. Setting the XYZ), delegated staff (@Bidroos, @Sudindra, and @Ravindra), complexity (CT and ET), and duration (75 days and 5 days). In this example, the third assignment does not have an associated complexity (neither ET, or Easy Task, MT, or Moderate Task, nor CT, or Complex Task; other complexities are also possible, such as ST, or Simple Task) or duration. In this example, the @ symbol is typed prior to a name to indicate delegation and action points can be added later to previously delegated work as one option when selecting the + symbol next to a designee, though in this example, the + symbol was selected to add complexity and duration.

Figure 11:
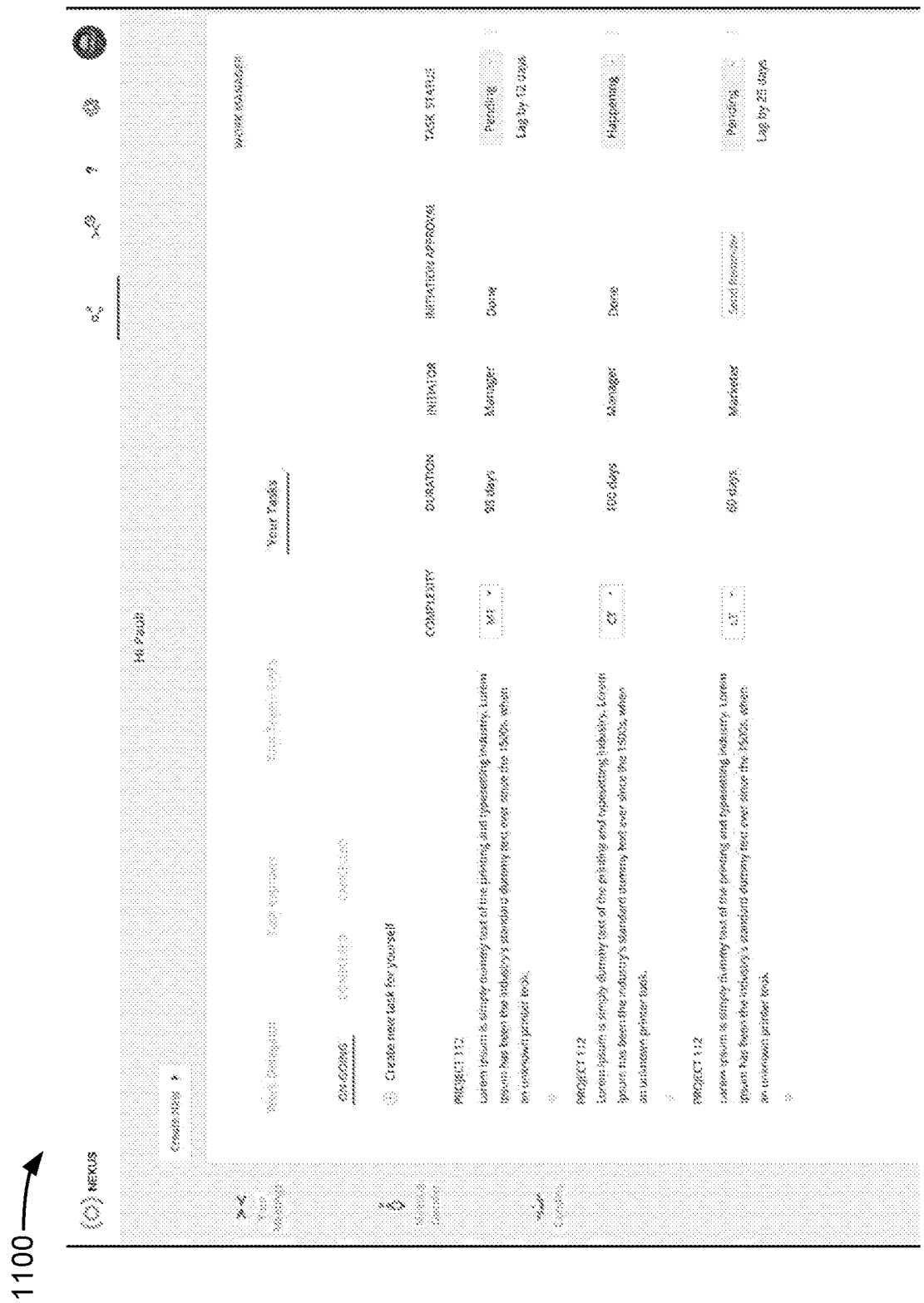
Figure 12:
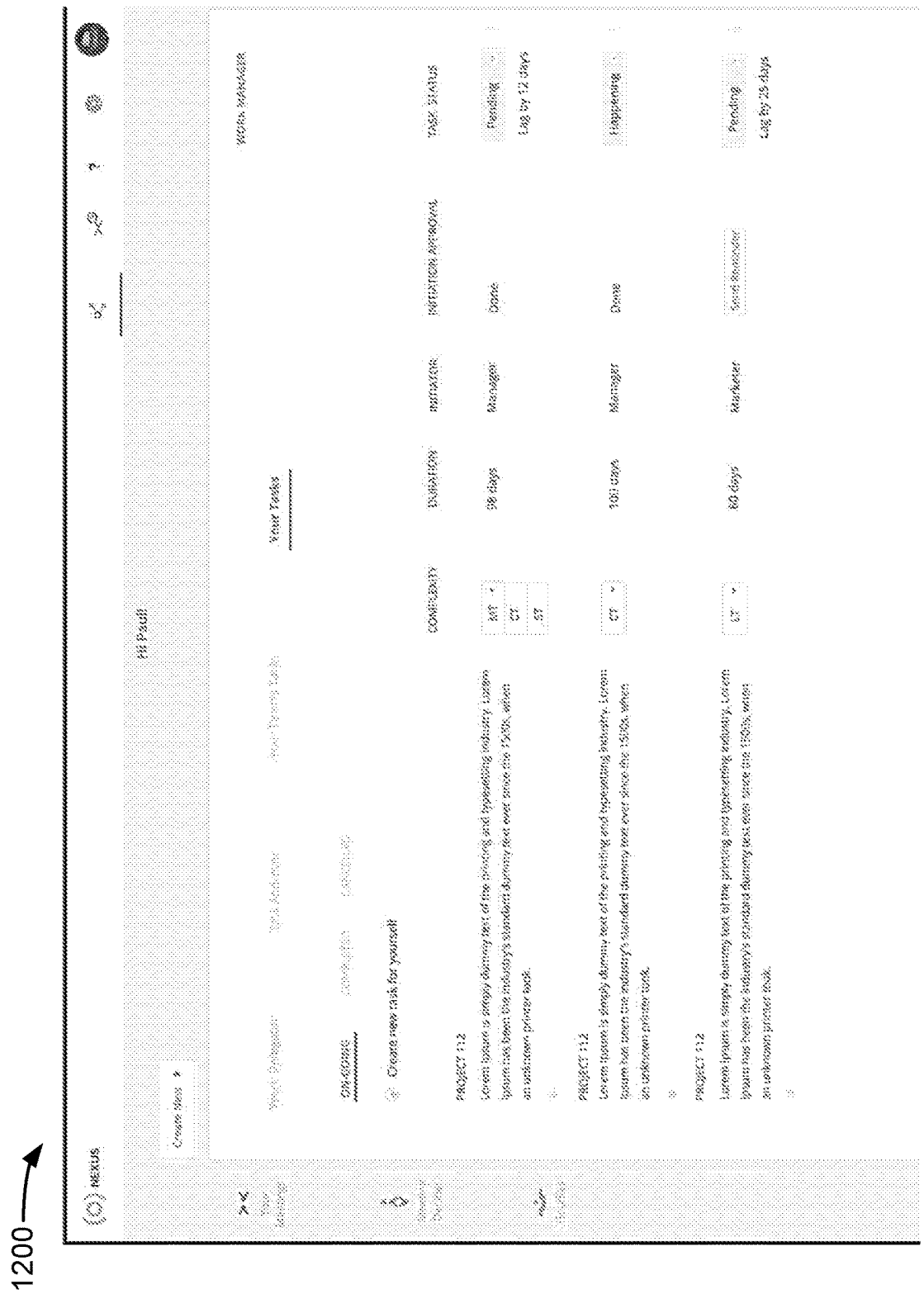
Figure 13:

It is assumed in this example a moderate task has been allotted to a supervisor, Paul, and Paul wants to convert the moderate task to a complex task. FIG. 11 is a screenshot 1100 of Paul on a Your Tasks tab of the Work Manager page. The screenshot 1100 illustrates three tasks (all have the same name) with associated Complexity (MT, CT, LT), Duration (98 days, 100 days, 60 days), Initiator (Manager, Manager, Marketer), Initiation Approval (Done, Done, Send Reminder), and Task Status (Pending, Happening, Pending). Note: The pending tasks statuses also have an indication of lag (Lag by 12 days, Lag by 25 days). FIG. 12 is a screenshot 1200 of Paul on the Your Tasks tab of the Work Manager page. The difference between the screenshot 1100 and the screenshot 1200 is that the complexity drop-down menu has been selected in the screenshot 1200, enabling the selection of MT, CT, or ST. FIG. 13 is a screenshot 1300 of a pop-up window that followed the selection of the CT complexity illustrated in screenshot 1200. It is assumed Paul selects Yes in the answer to the query in the popup window. ("Are you sure that you want to convert this into a Complex Task?")

Figure 14:
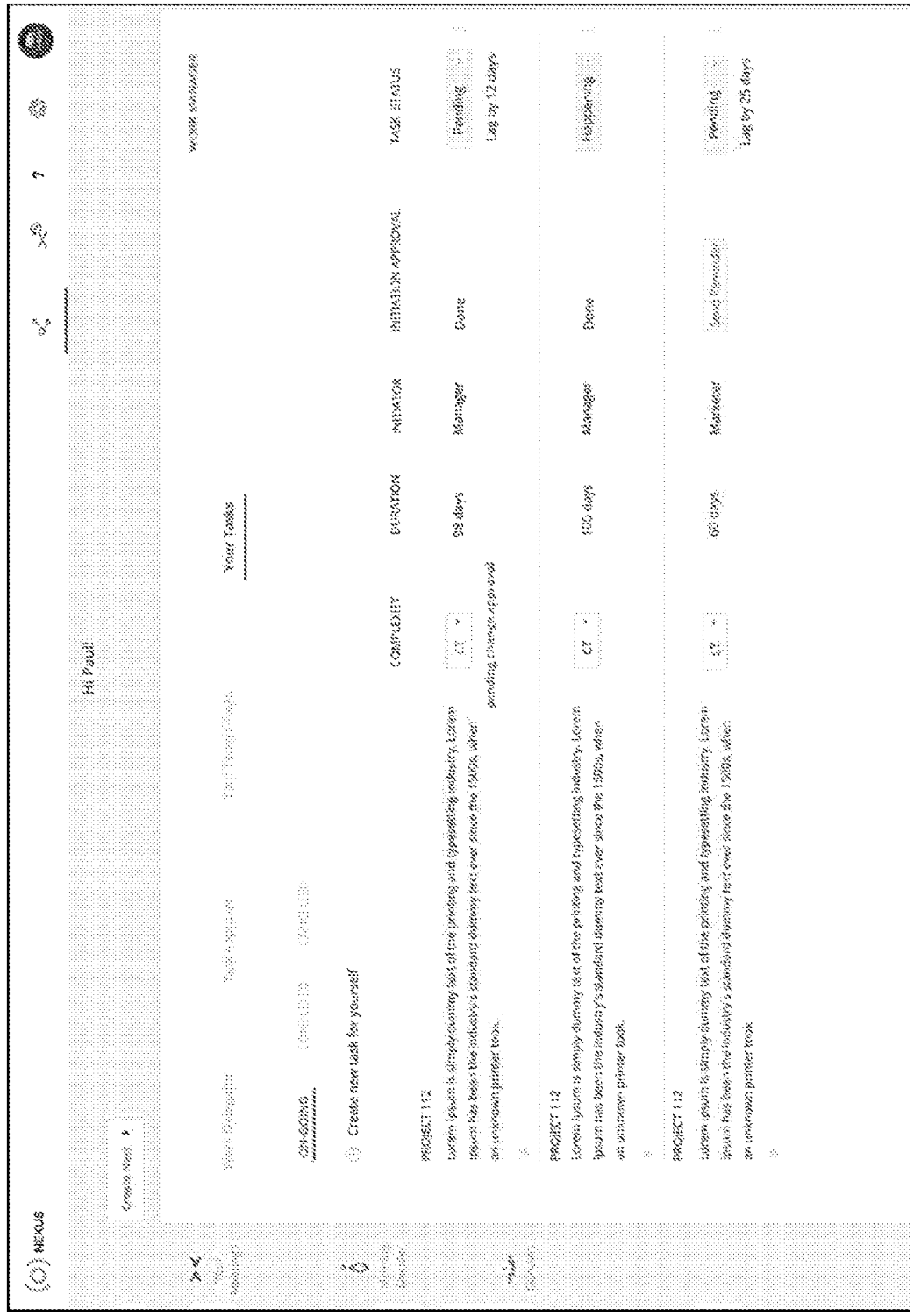

FIG. 14 is a screenshot 1400 of Paul on the Your Tasks tab of the Work Manager page. The screenshot 1400 illustrates three tasks, much like in screenshot 1100, but the complexity of the first project has been changed to CT and underneath the complexity of the first project is the text "pending change approval."

Figure 15:
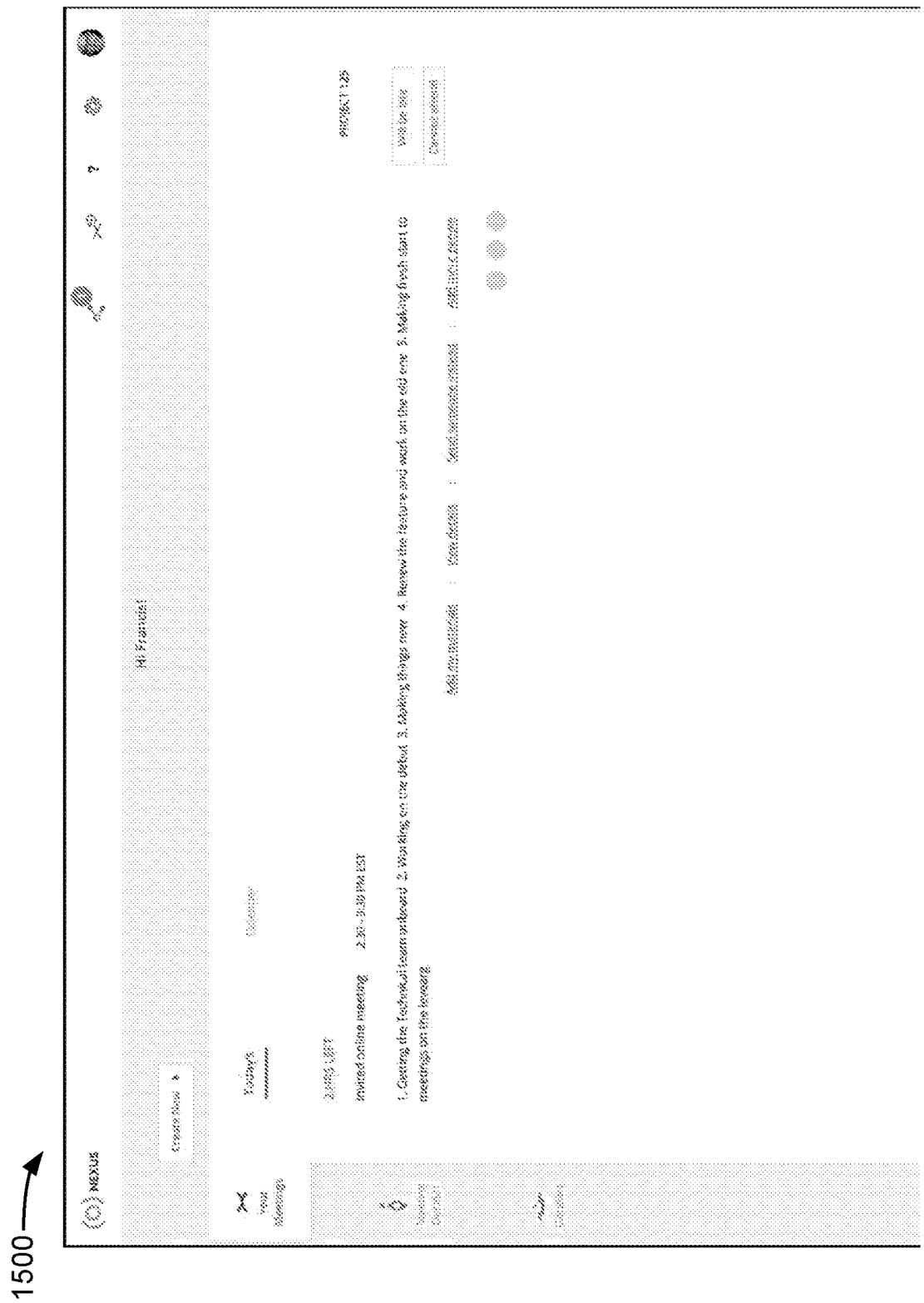
Figure 16:
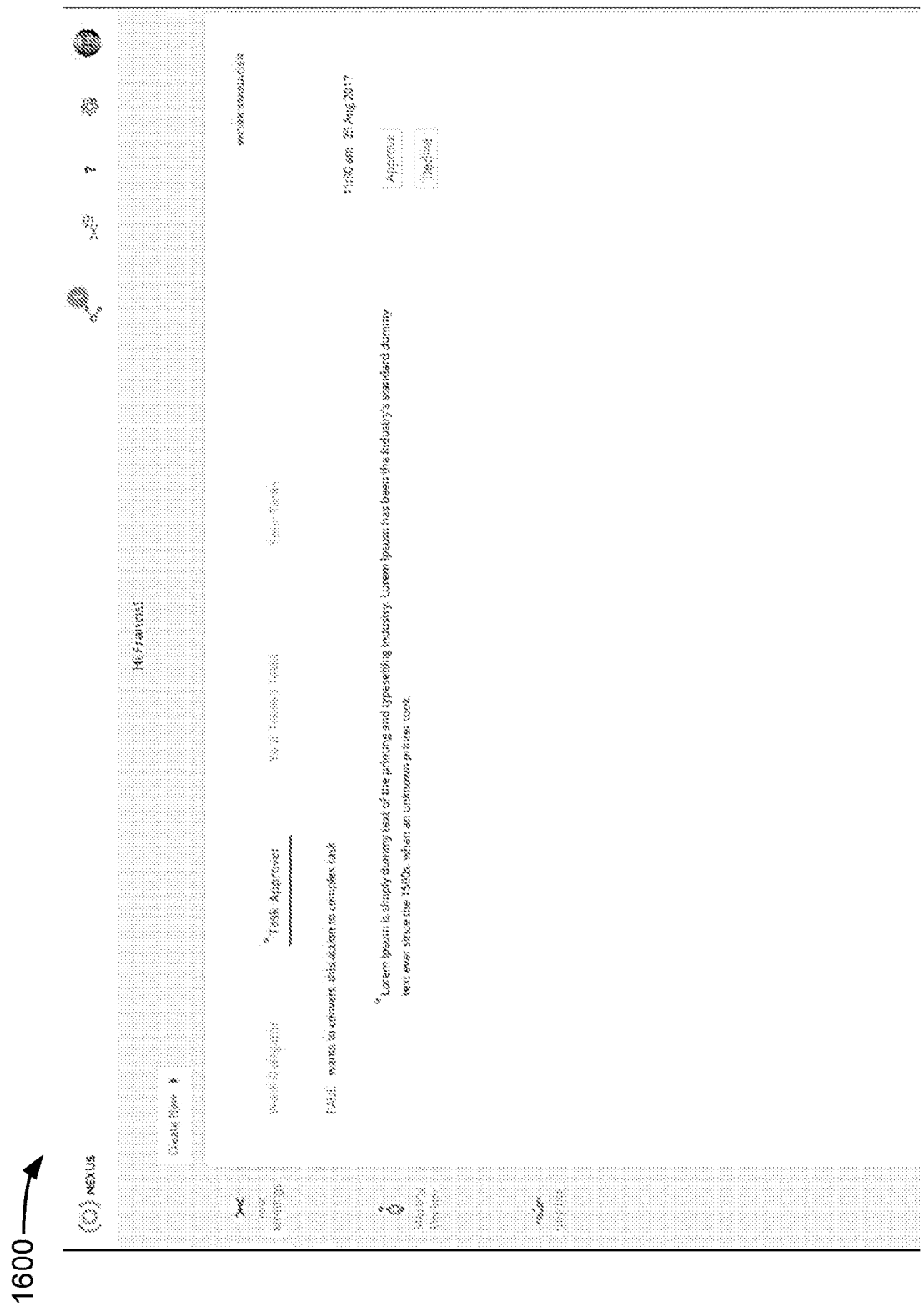
Figure 17:
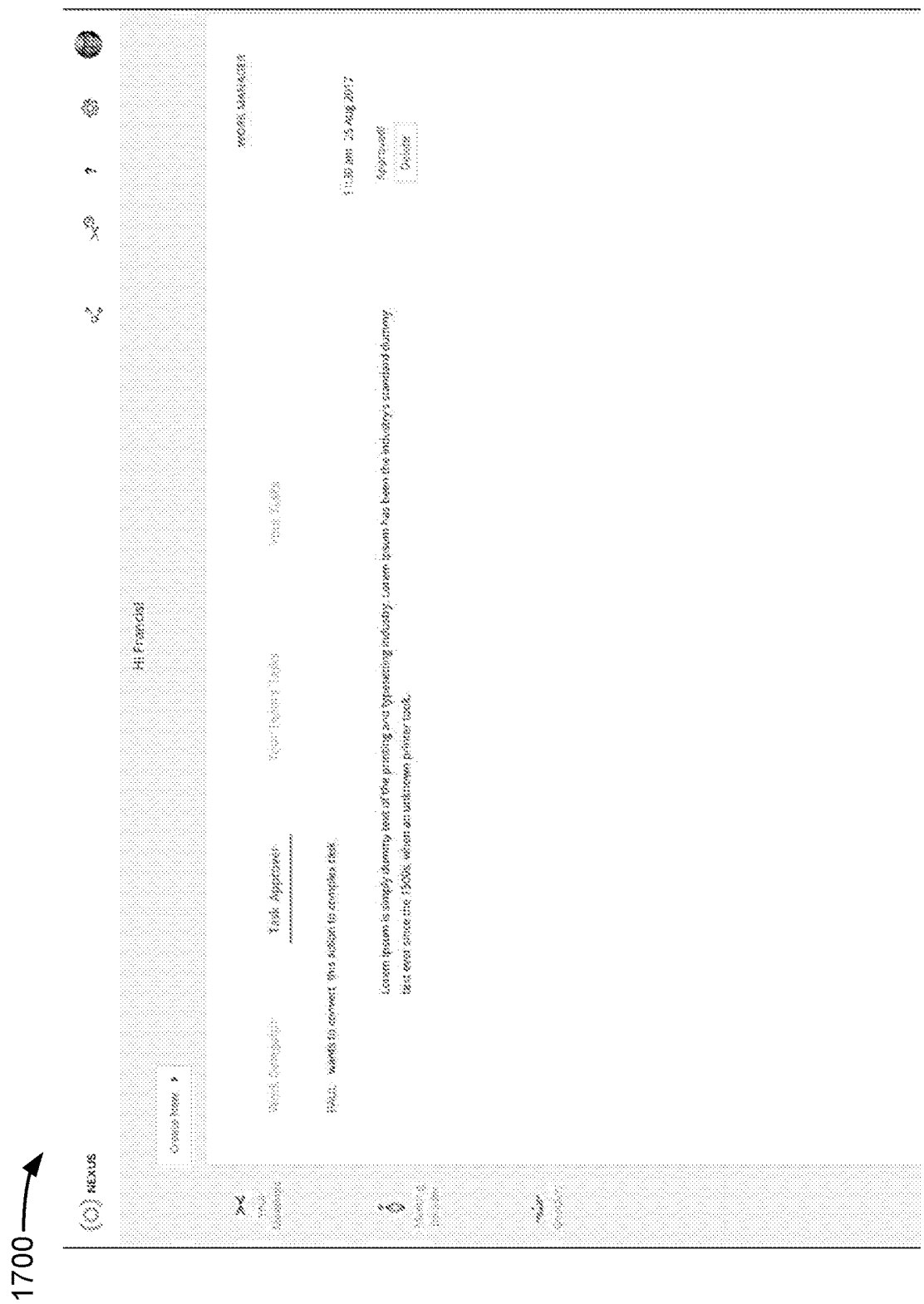

Following the screenshot 1400, it is assumed Paul's manager, Francis, opens his Work Manager application. FIG. 15 is a screenshot 1500 of Francis on the Today's tab of the Your Meetings page. Francis has 2 HRS LEFT to respond with "Will be late" or "Cannot attend." The online meeting is for from 2:30-3:30 PM EST for Project 125. A summary of the meeting agenda is 1. Getting the Technical team onboard 2. Working on the debut 3. Making things new 4. Renew the feature and work on the old one 5. Making fresh start to meetings on the leverage. Francis can select from the hypertext links: Add my materials, View details, Send someone instead, or Add more people. FIG. 16 is a screenshot 1600 of Francis on a Task Approver tab of a Work Manager page. The screenshot 1600 illustrates Paul wants to convert this action (identified below) to complex task and the time and date of the request (11:30 am 25 Aug. 2017). Francis has the option to Approve or Decline. FIG. 17 is a screenshot 1700 of Francis on the Task Approver tab of the Work Manager page. The difference between the screenshot 1600 and the screenshot 1700 is that Francis has approved the change of task complexity as indicated by the "Approved!" text where the Approve button used to be.

Figure 18:
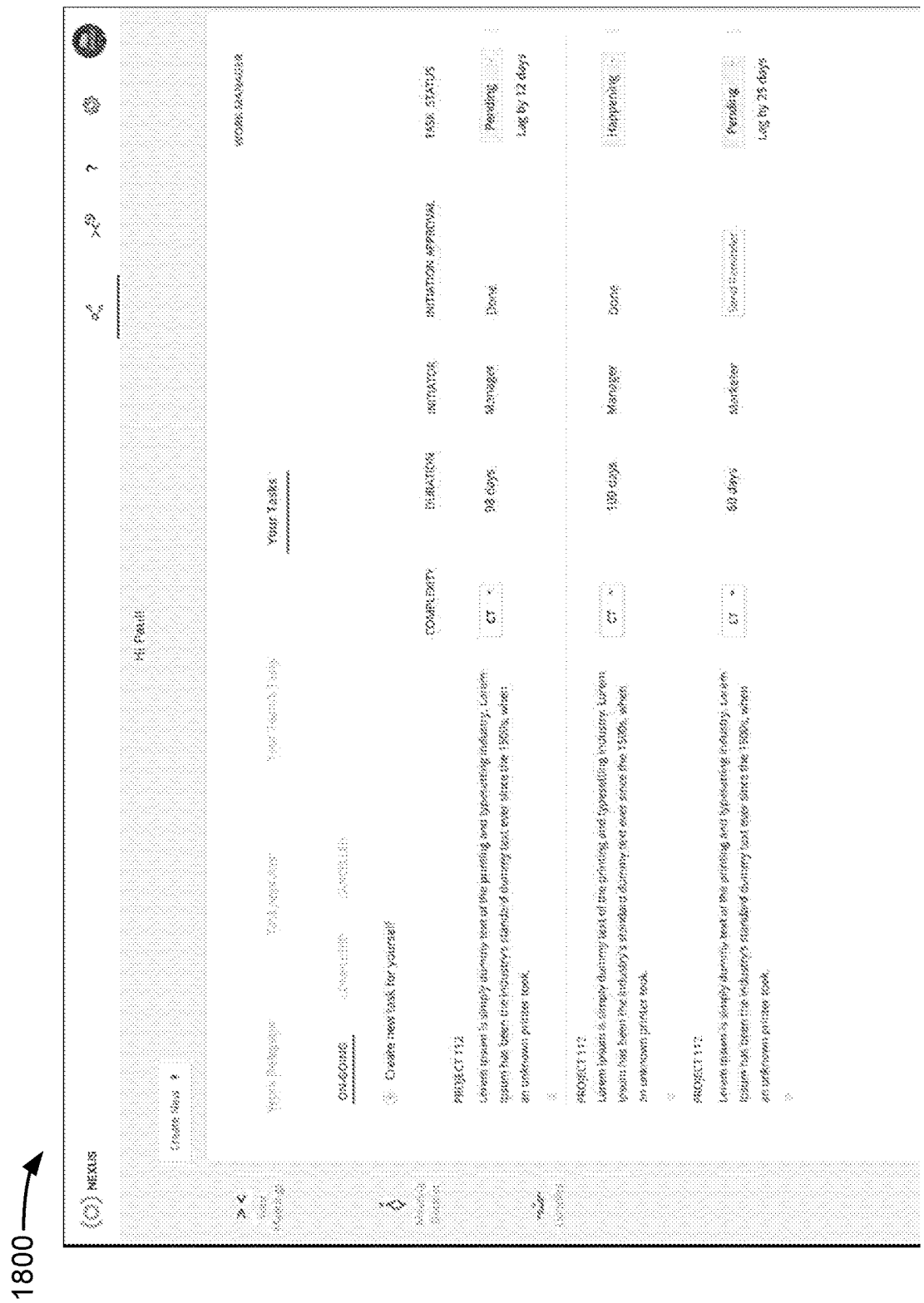

The approval is represented on Paul's Work Manager page, as illustrated in screenshot 1800 of FIG. 18, which is similar to the screenshot 1400 (FIG. 14) except the complexity of the first project is no longer pending change approval.

Figure 19:
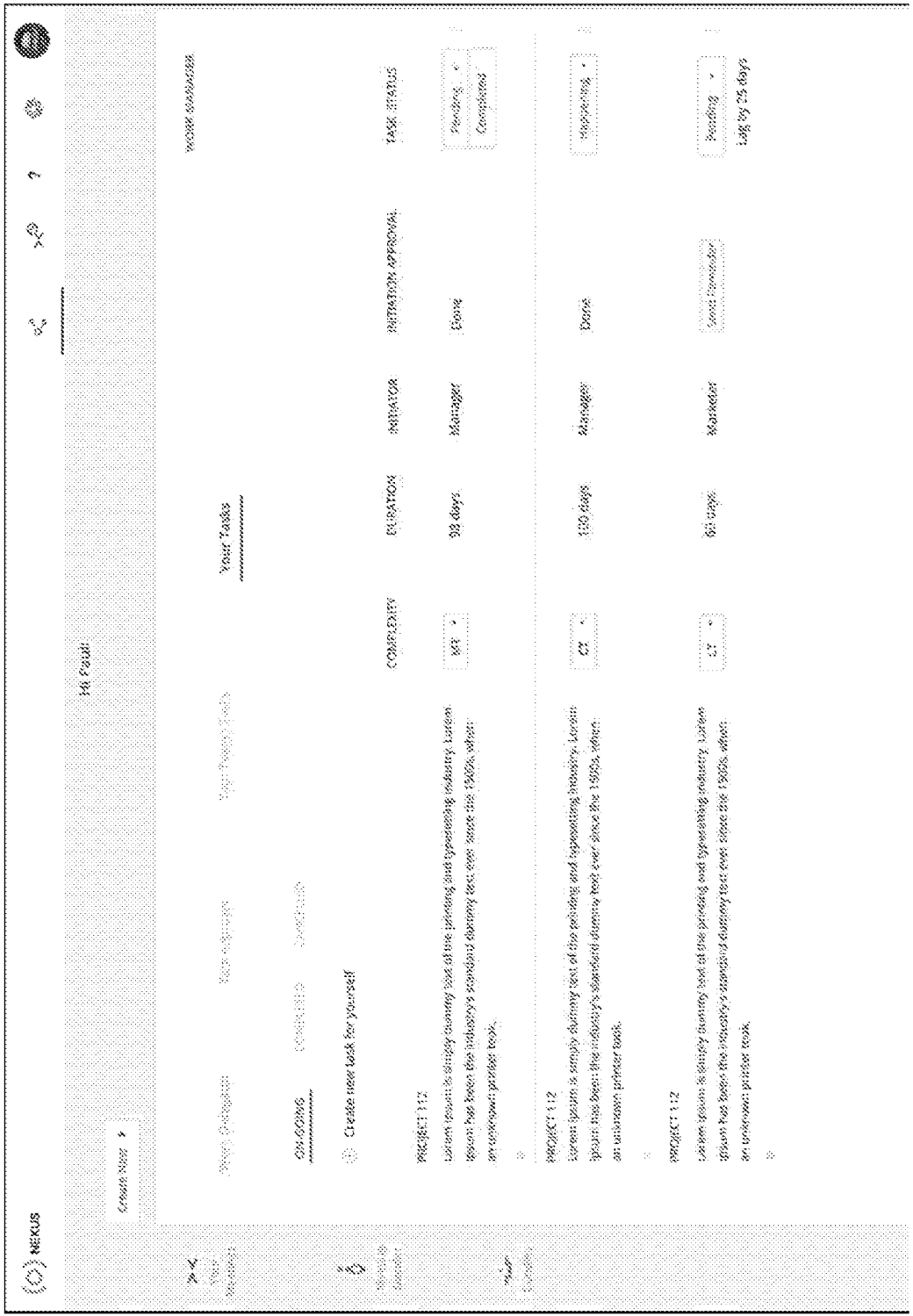
Figure 20:
Figure 21:
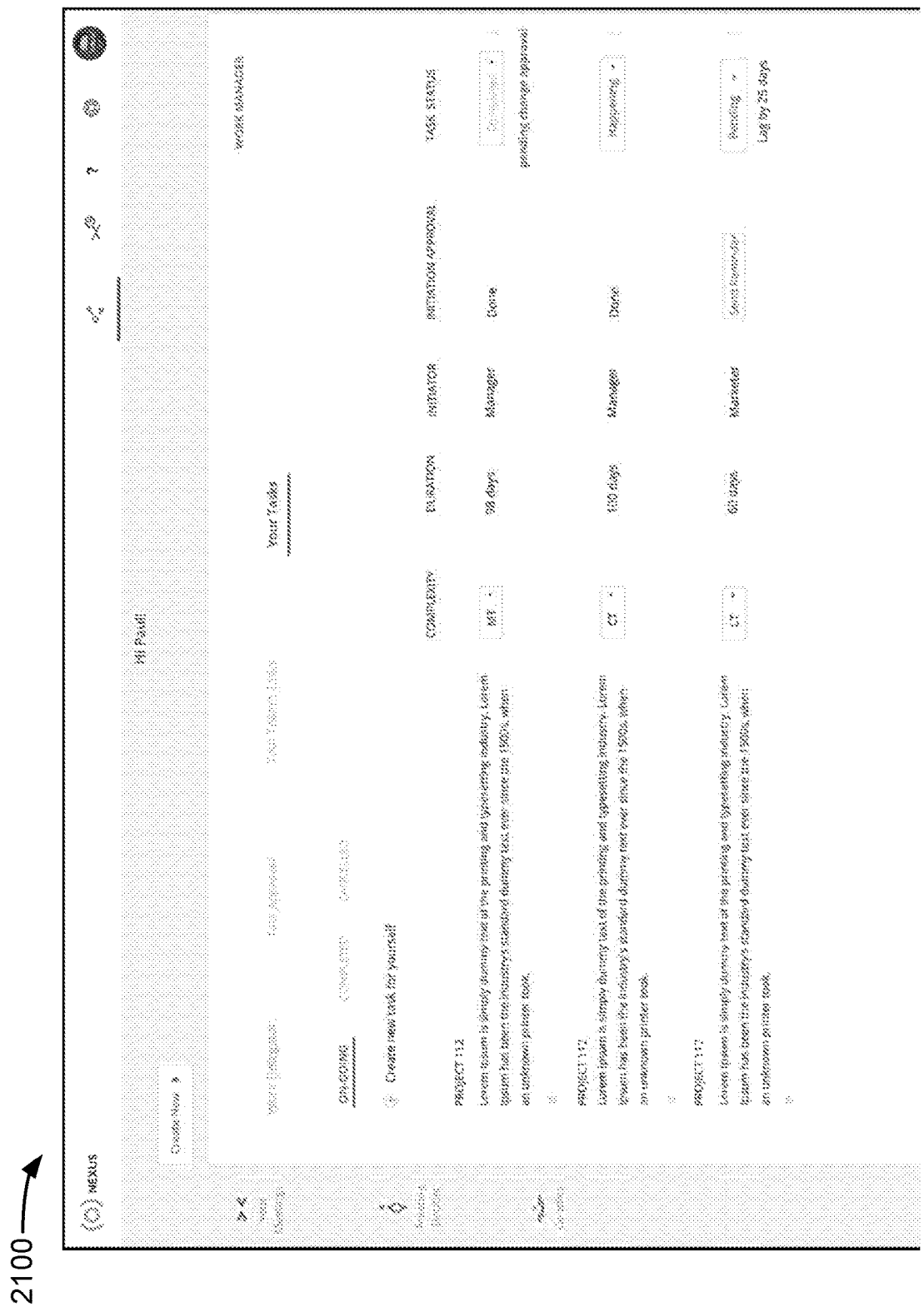

Refer once again to the screenshot 1100 (FIG. 11), but instead of changing complexity, Paul will now change Task Status. FIG. 19 is a screenshot 1900 of Paul on the Your Tasks tab of the Work Manager page. The screenshot 1900 illustrates Paul has selected the task status dropdown menu, which has the options Pending (unchanged) and Completed. FIG. 20 is a screenshot 2000 of a pop-up window that followed the selection of the completed status illustrated in the screenshot 1900. It is assumed Paul selects Yes in the answer to the query in the popup window. ("Are you sure that you have completed this task?") FIG. 21 is a screenshot 2100 of Paul on the Your Tasks tab of the Work Manager page. The screenshot 2100 illustrates three tasks, much like in screenshot 1100, but the status of the first task has been changed to completed and underneath the task status of the first project is the text "pending change approval."

Figure 22:
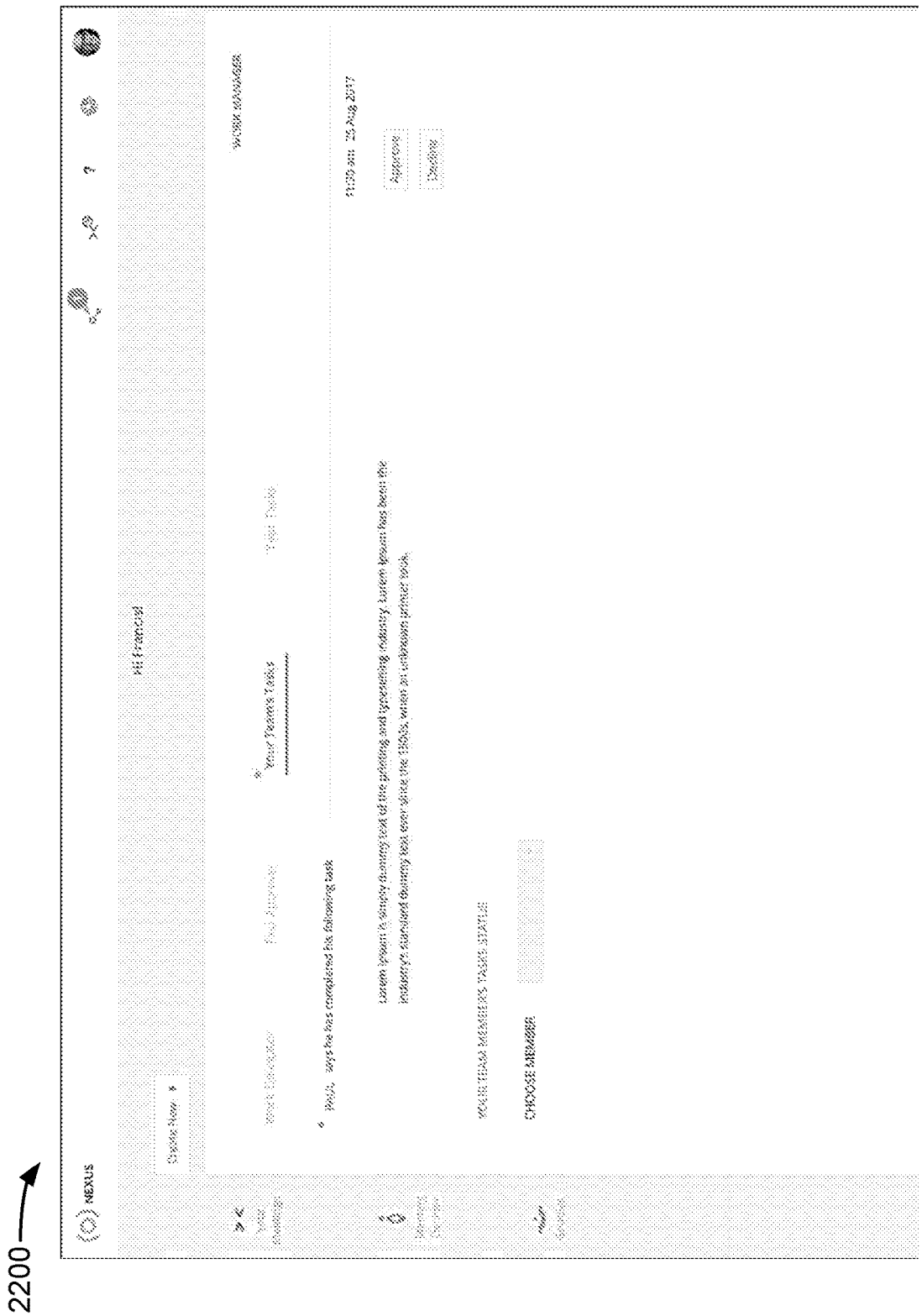
Figure 23:
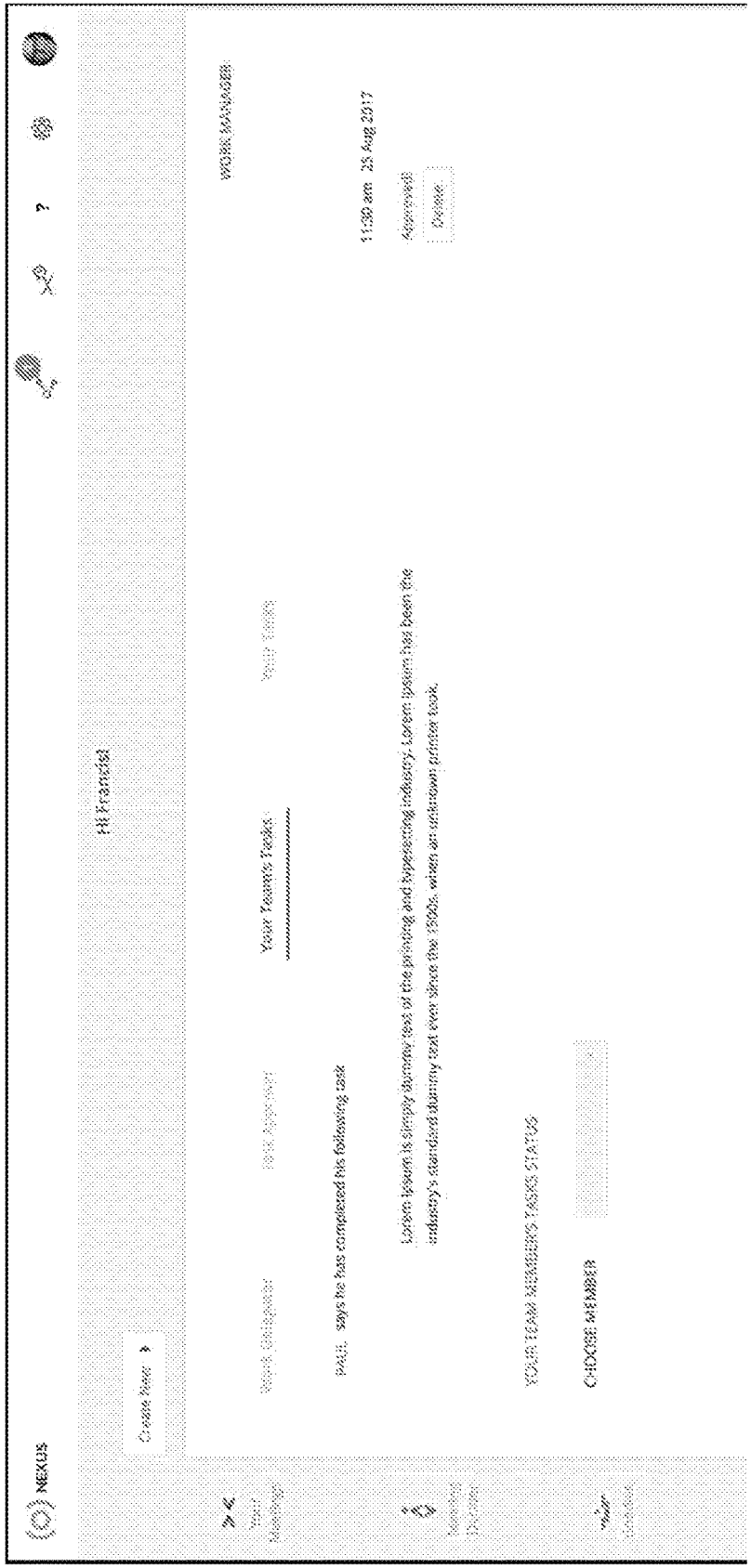

Following the screenshot 2100, it is assumed Paul's manager, Francis, opens his Work Manager application. FIG. 22 is a screenshot 2200 of Francis on a Your Team's Tasks tab of a Work Manager page. The screenshot 2200 illustrates Paul has completed the following task (identified below) and the time and date of the status change (11:30 am 25 Aug. 2017). Francis has the option to Approve or Decline. FIG. 23 is a screenshot 2300 of Francis on the Your Team's Tasks tab of the Work Manager page. The difference between the screenshot 2300 and the screenshot 2200 is that Francis has approved the status change as indicated by the "Approved!" text where the Approve button used to be.

Figure 24:
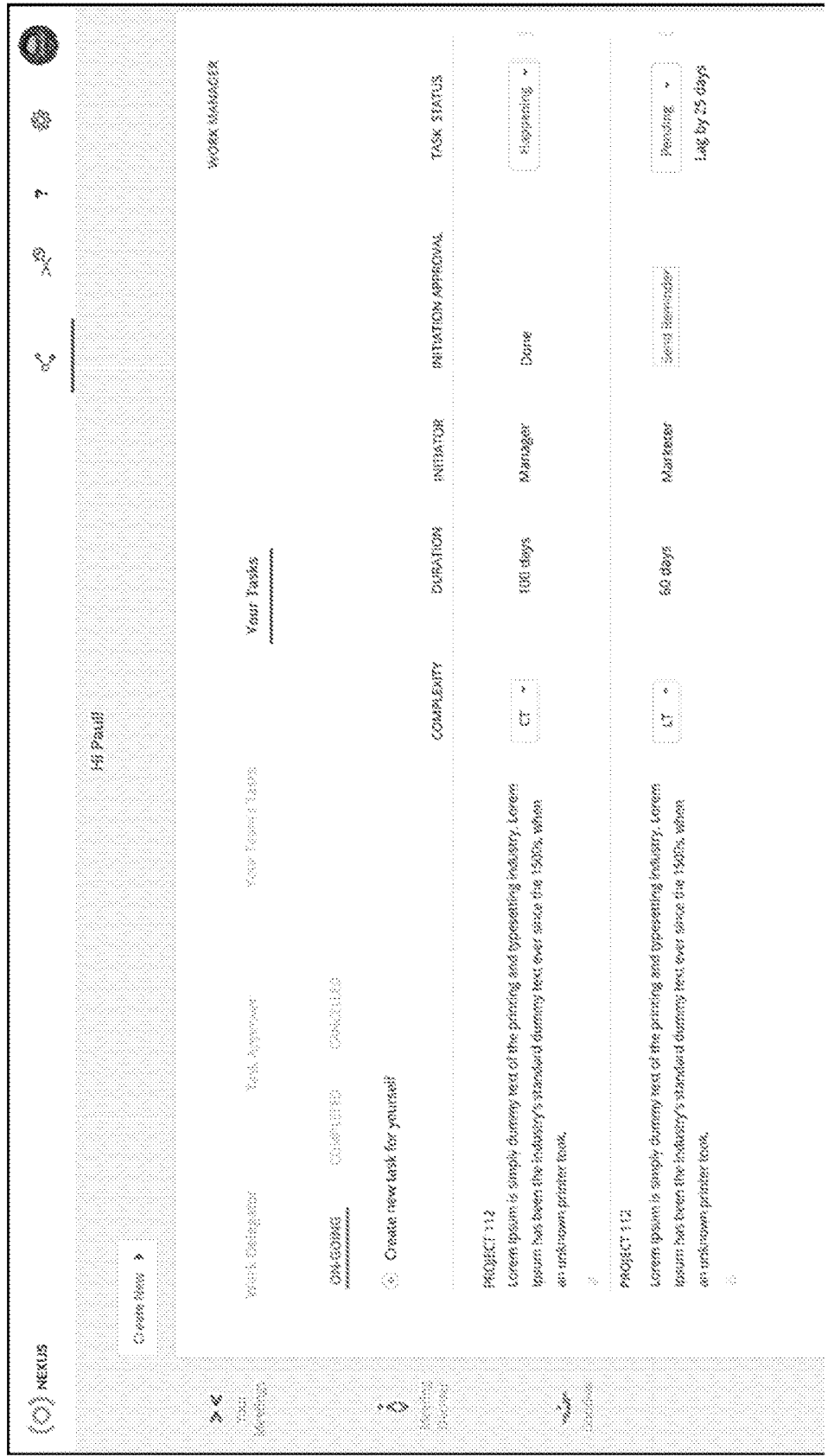
Figure 25:
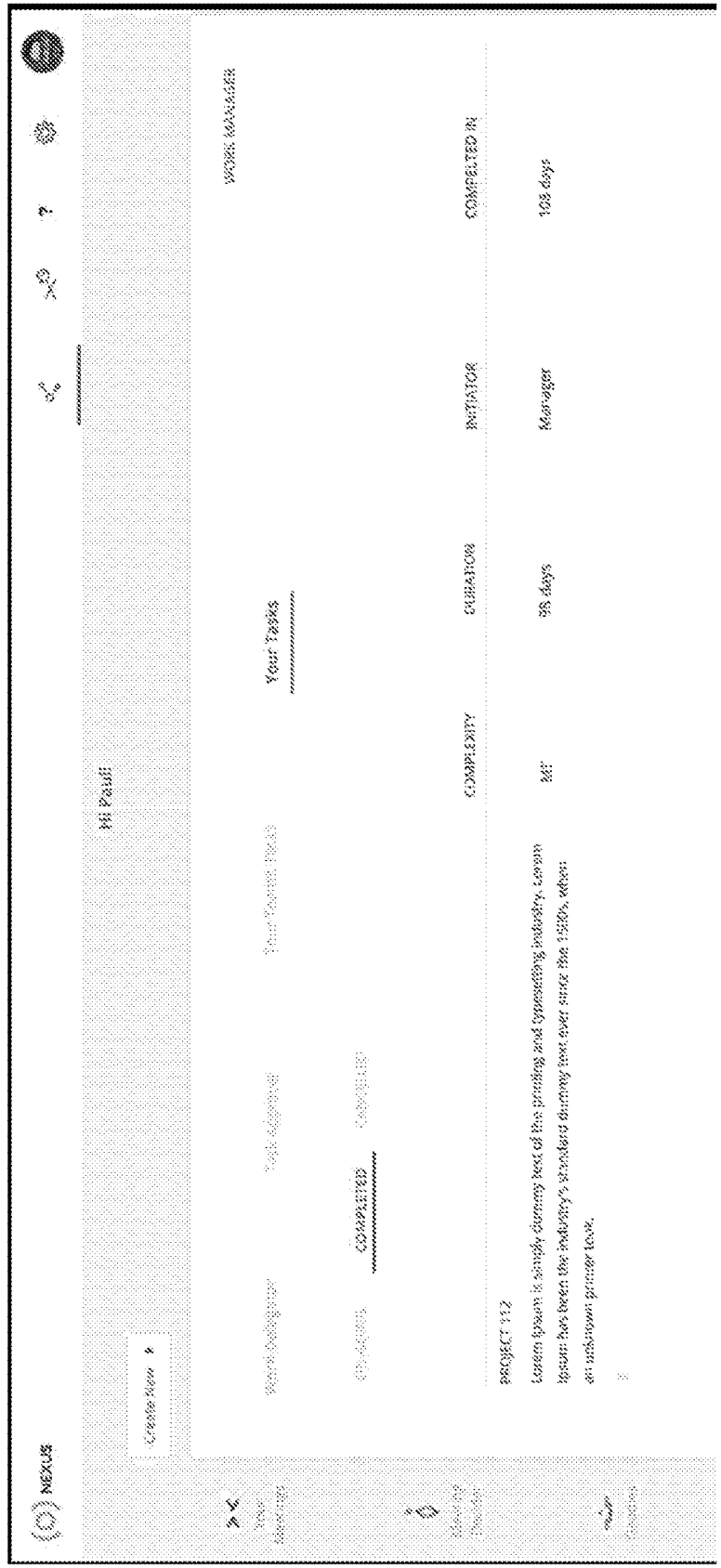

The approval is represented on Paul's Work Manager page, as illustrated in screenshot 2400 of FIG. 24, which is similar to the screenshot 2100 (FIG. 21) except the status of the first project is no longer pending change approval, so the task has been omitted (leaving only two tasks). FIG. 25 is a screenshot 2500 of Paul's Work Manager page illustrating Paul can select the "Completed" subtab under "Your Tasks" to view the now-completed task.

Figure 26:
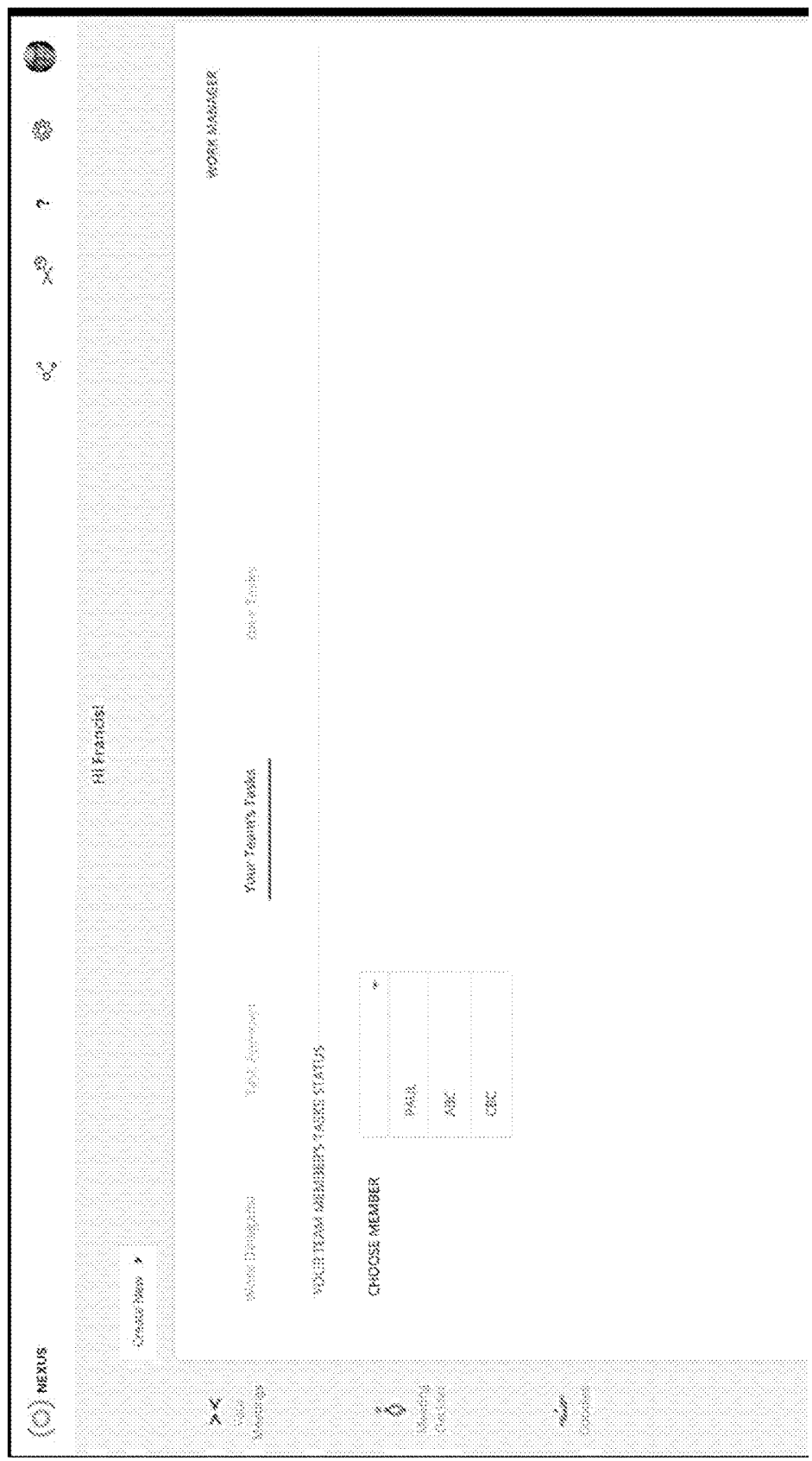
Figure 27:
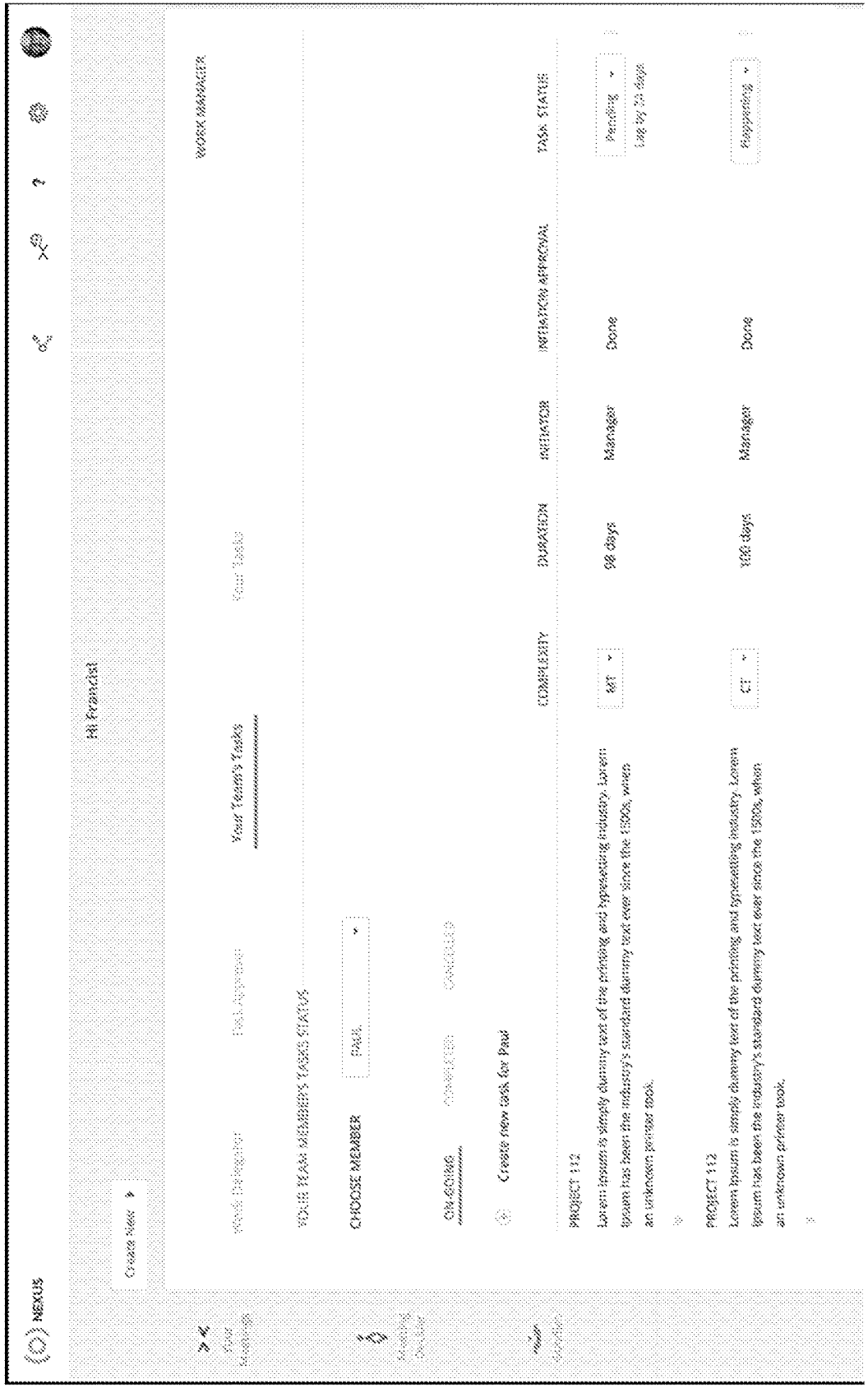
Figure 28:
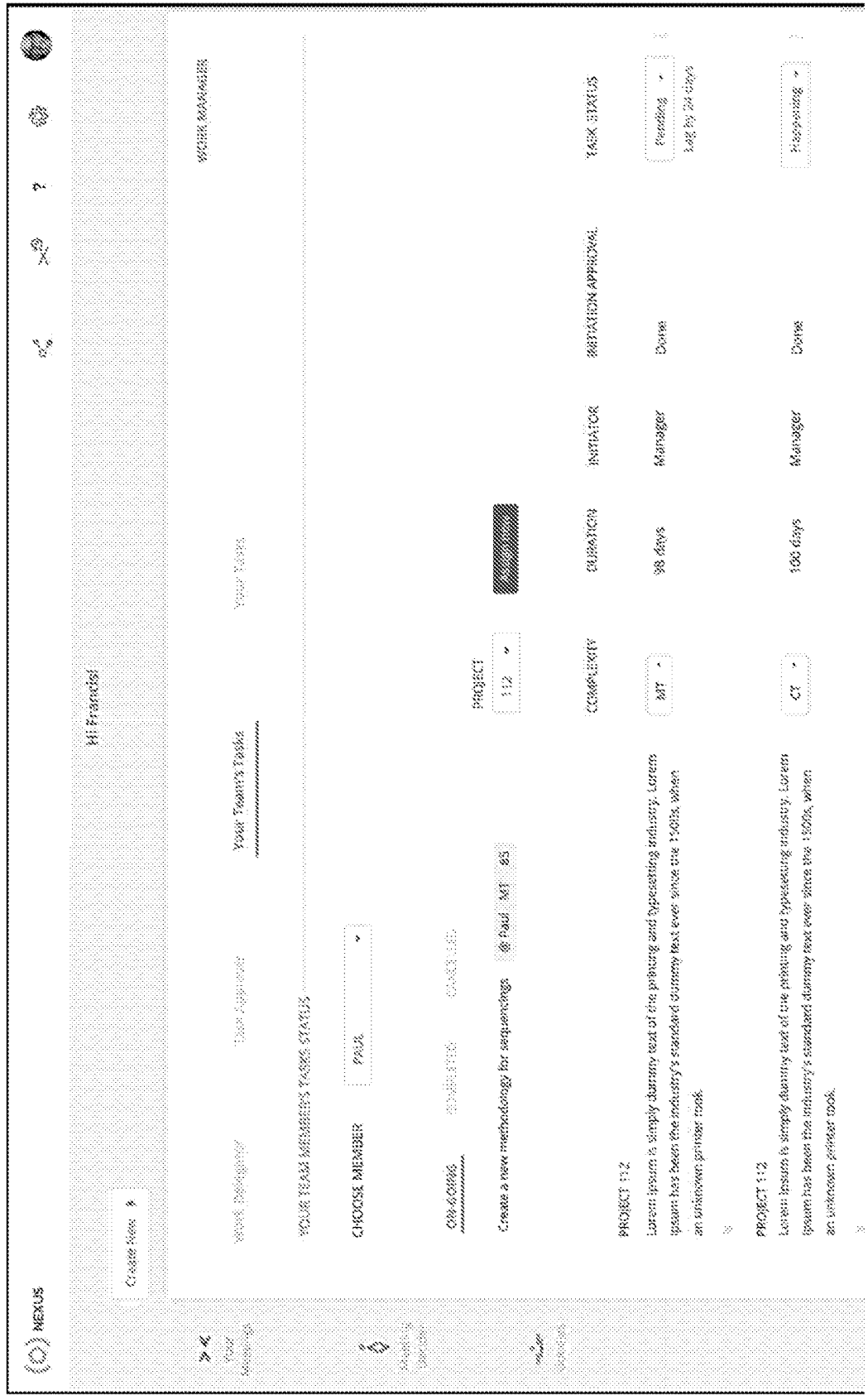

FIG. 26 is a screenshot 2600 of Francis on the Your Team's Tasks tab of a Work Manager page. Francis can choose a member from a drop-down menu, which is currently selected to show the choices of Paul, ABC, and CBC. After selecting Paul, Francis has the option to view ON-GOING, COMPLETED, and CANCELLED tasks delegated to Paul. FIG. 27 is a screenshot 2700 of Francis on the Your Team's Tasks tab of a Work Manager page after choosing Paul, with the ON-GOING member-specific tab chosen, which causes Paul's on-going tasks to be listed much as Paul could view them (see, e.g., FIG. 24). Francis also has the option of choosing a new project for Paul by selecting a "Create new task for Paul" button. FIG. 28 is a screenshot 2800 illustrating what follows, in this example, when a new task is delegated. Specifically, for the project summary "create a new methodology for sequences" Francis can select complexity (MT in the screenshot 2800), duration (85 in the screenshot 2800), project (112 in the screenshot 2800), and an "Assign now" button to delegate the task with the indicated parameters. Advantageously, the delegation can be accomplished without calling for a meeting.

Figure 29:
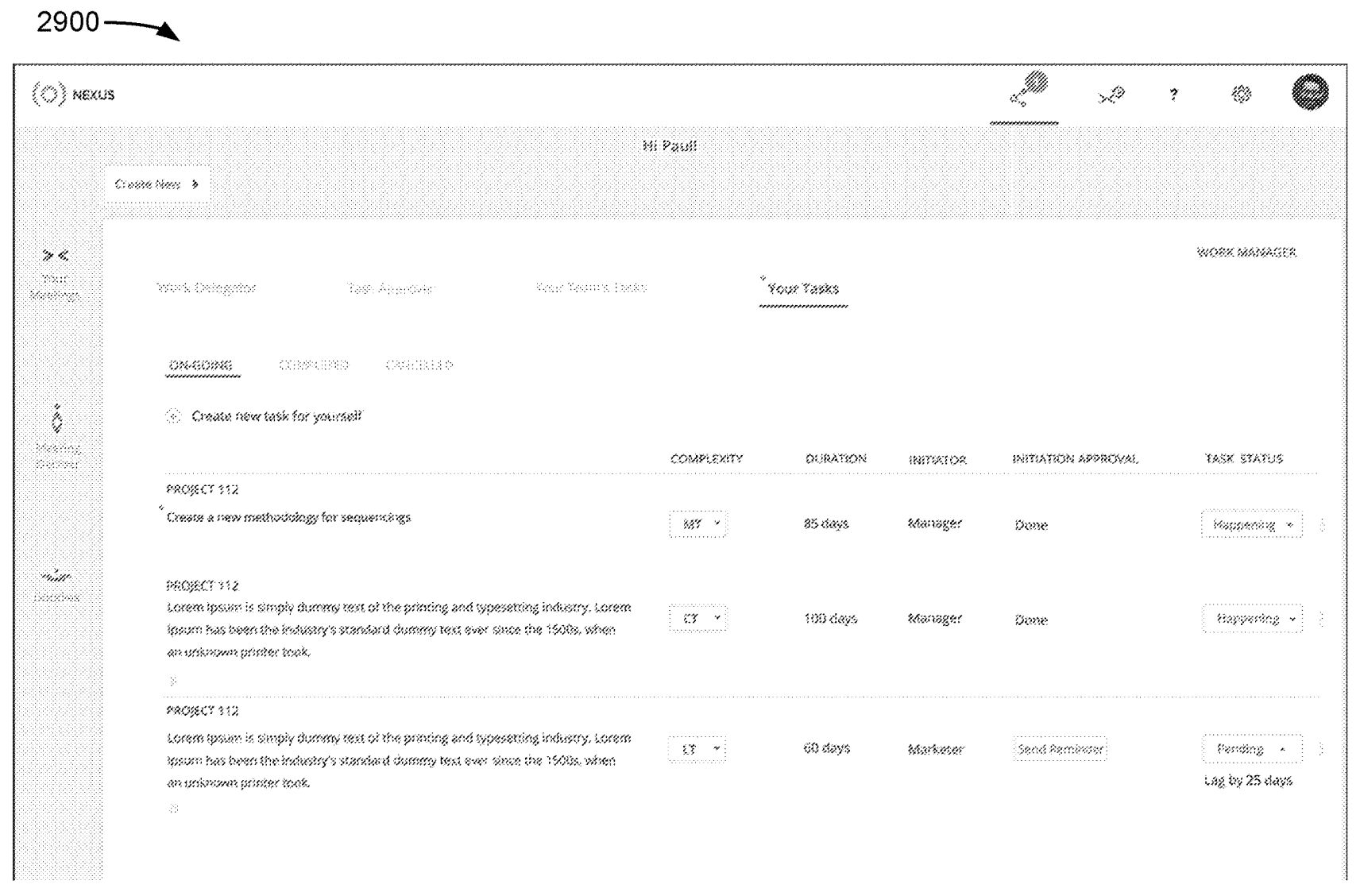

FIG. 29 is a screenshot 2900 of Paul on a Your Tasks tab of a Work Manager page. The screenshot 2900 is similar to the screenshot 2400, but Paul opens his Work Manager and finds the new task assigned with task status "Happening," along with the two tasks illustrated in screenshot 2400.

Figure 30:
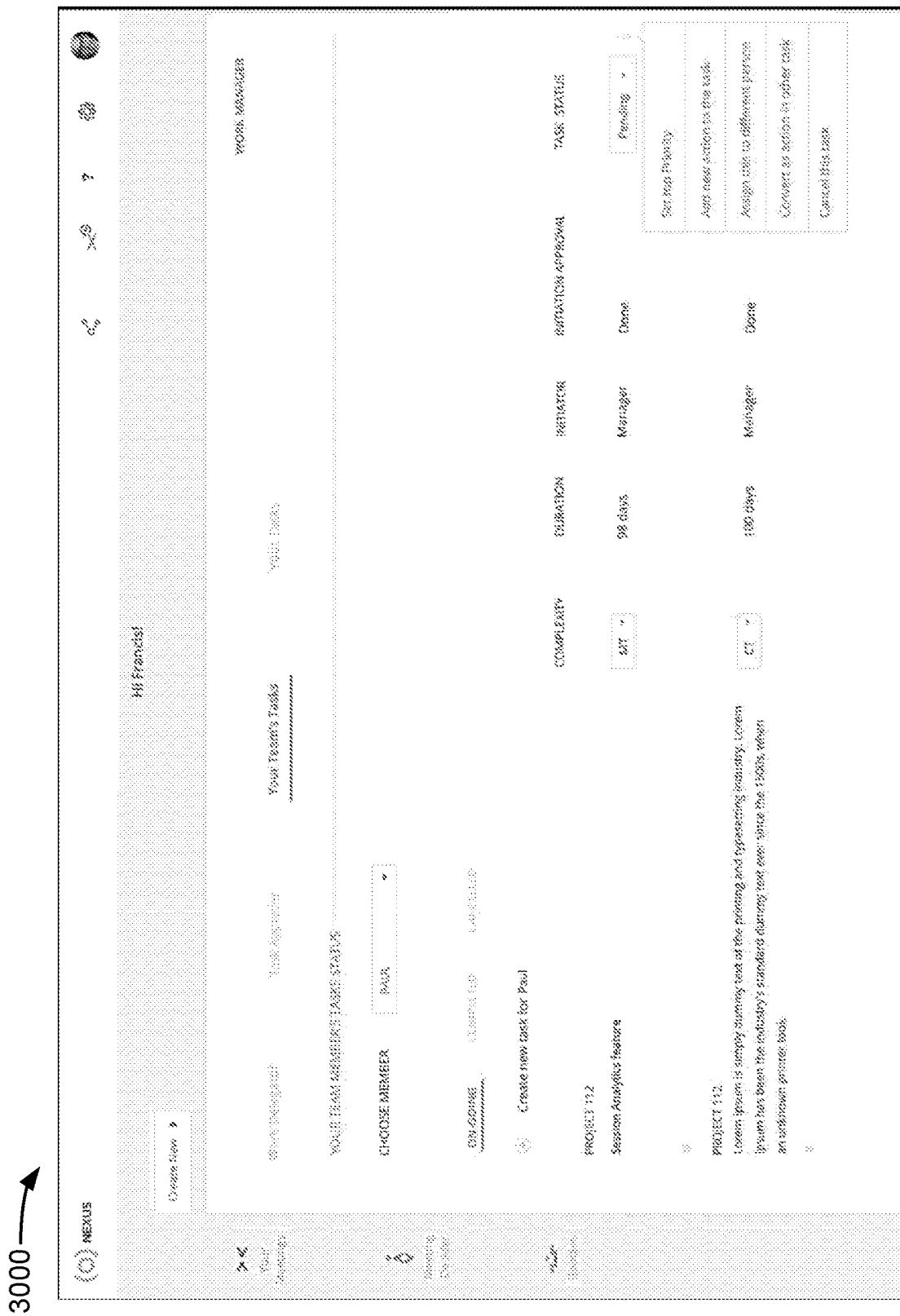
Figure 31:
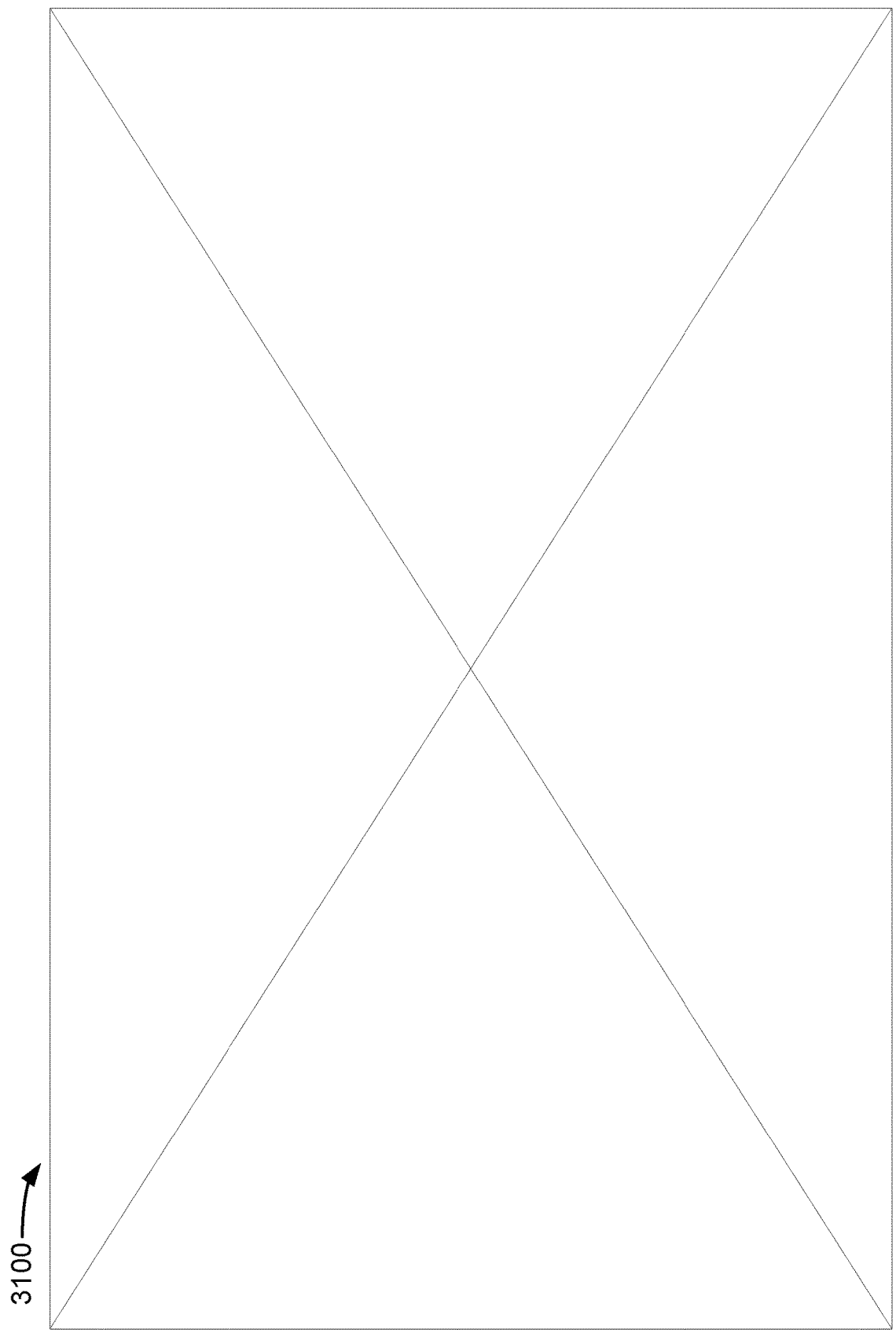

Francis sets the priority to a task of Paul's. All associated tasks of his team members have correspondingly changed priority status, which is reflected on their pages. Refer once again to the screenshots 2600, 2700 (FIGS. 26, 27), but instead of creating a new task for Paul, Francis will change task priority. FIG. 30 is a screenshot 3000 of Francis on a Your Team's Tasks tab of a Work Manager page after selecting Paul's on-going tasks. As illustrated in a pull-down menu, Francis can choose to Set top Priority, Add new action to the task, Assign this to a different person, Convert an action in other task, or Cancel this task. FIG. 31 is a screenshot 3100 similar to the screenshot 2700, but with an icon that is intended to indicate priority has been changed for a task.

Figure 32:
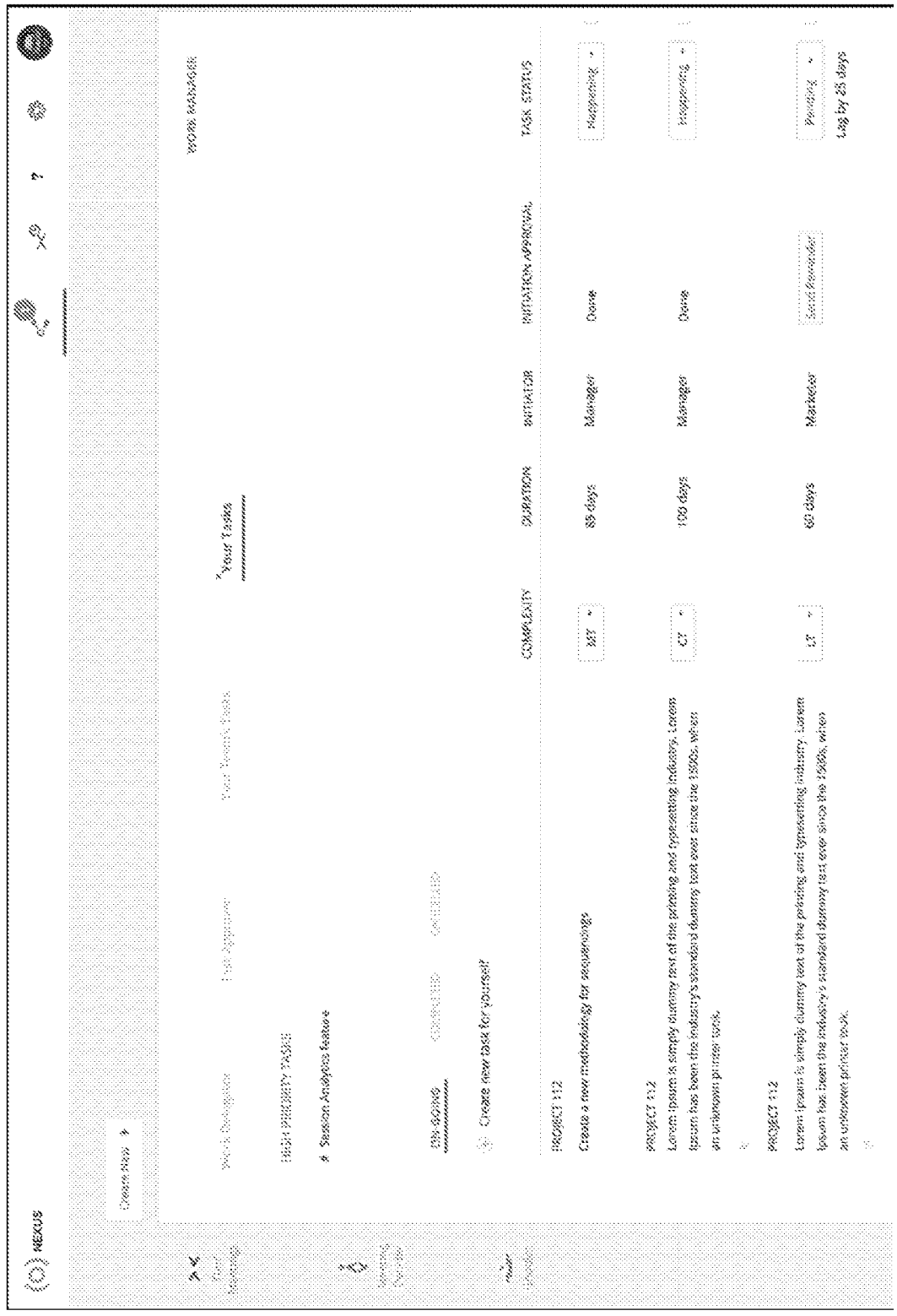

Paul can see the priority task highlighted after selecting a Your Tasks tab on a Work Manager page, as is illustrated in FIG. 32, screenshot 3200, which includes a HIGH PRIORITY TASKS section identifying a high priority task (in this example, "Sessions Analytics feature"). Similarly, for each applicable teammate of Paul, assignments of the applicable task will be shown as corresponding pending high priority assignments for the teammates. It may be noted that the link can be for tasks or assignments, and in practice the terms are sometimes used synonymously, but "assignments" are used for the purpose of this example because they are the components of the larger task. (Of course, tasks can have sub-tasks and even tasks on the same hierarchical level can have associations that put one task "under" another task for practical purposes.) Link establishment is generated by assignments associated with a task obtained through delegation, either explicitly (through a supervisor) or implicitly (through an artificial agent). It may be noted that in some implementations, unlinked tasks will not appear in a priority suggestion list. One solution to this problem is to ensure task creation or delegation occurs during asset synthesis instances.

Figure 33:
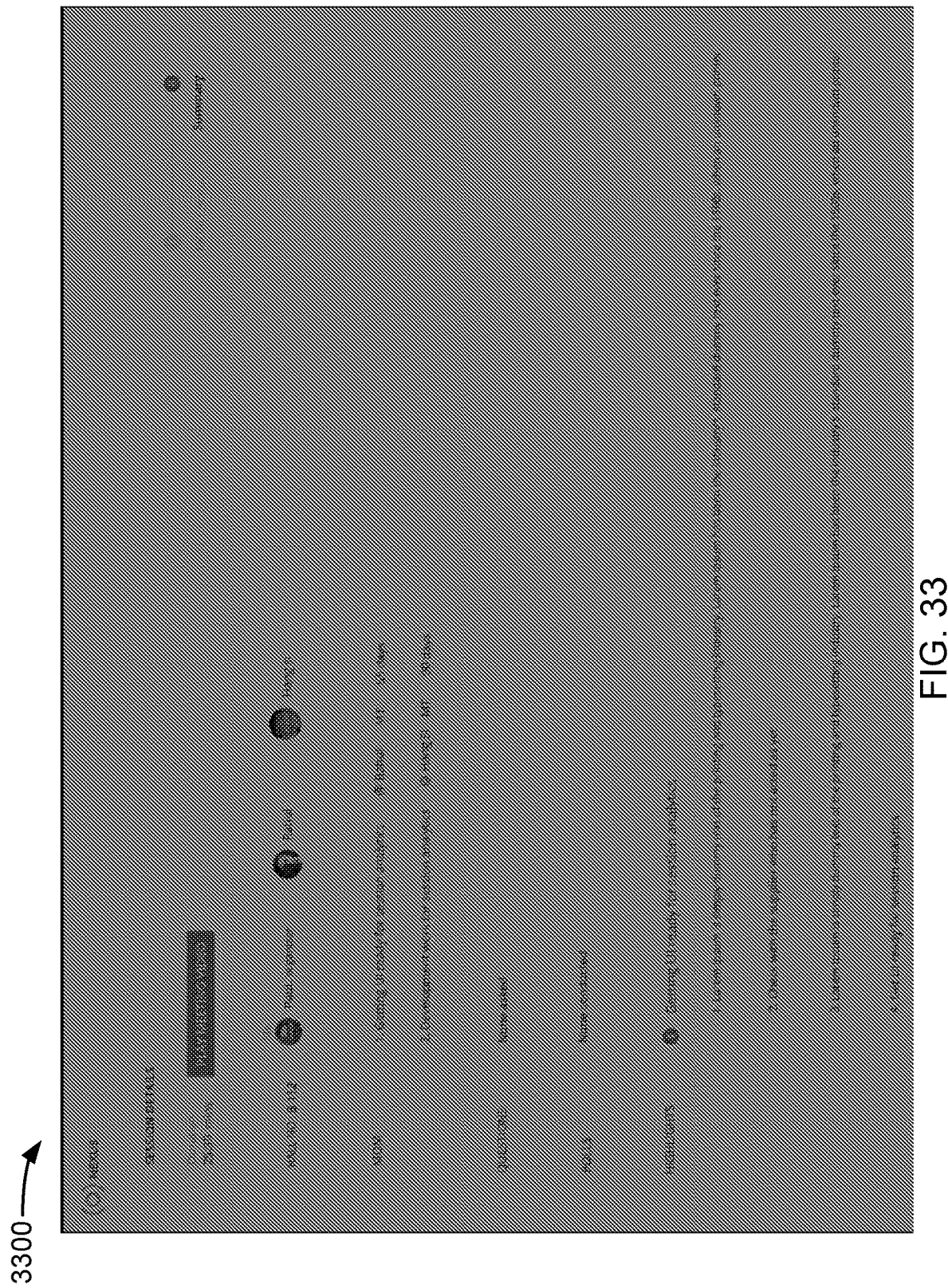

For illustrative purposes, assume Paul completes a meeting during which assignments for the task "Session Analytics Feature" are delegated to Rahul and Hang Si. FIG. 33 is a screenshot 3300 of a session detail summary for an asset synthesis instance (a meeting in this example), which includes a duration, an option to play meeting video, where the meeting took place (Hall No B 112 in this example), the organizer (Paul), attendees (Rahul and Hang Si), assignment delegations ("Getting UI ready for session analytics" delegated to Rahul, MT, 55 days; and "Development work for session analytics" delegated to Hang Si, MT, 90 days), and some other details, such as Questions, Polls, and Highlights.

Figure 34:
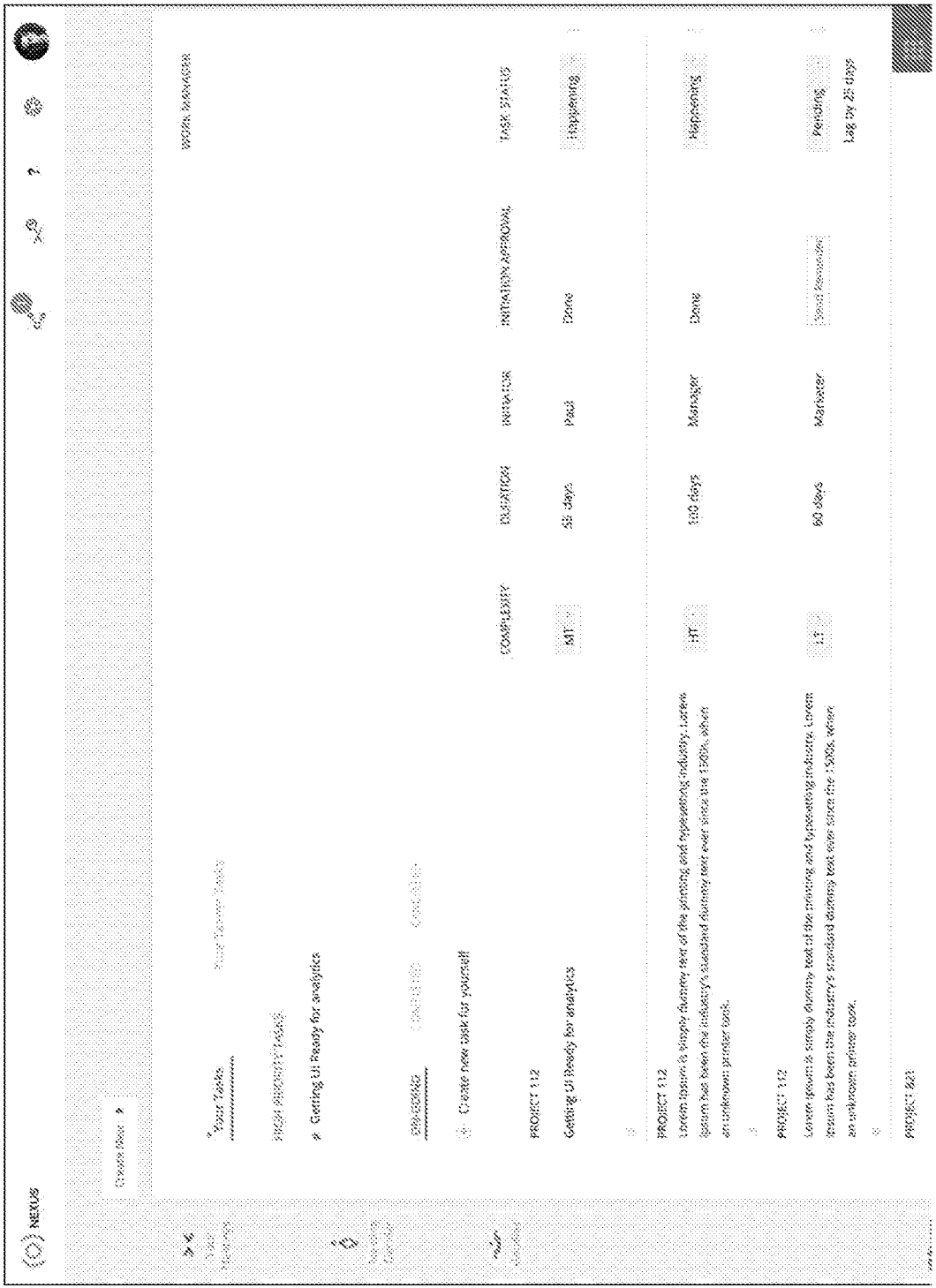

FIG. 34 is a screenshot 3400 of Rahul on a Your Tasks tab of a Work Manager page that includes "Getting UI Ready for session analytics" in a High Priority Tasks section (and, in this example, listed redundantly, but in more detail, in an on-going tasks section). Advantageously, the priority of the assignment is inherited from the priority of the parent task.

Figure 35:
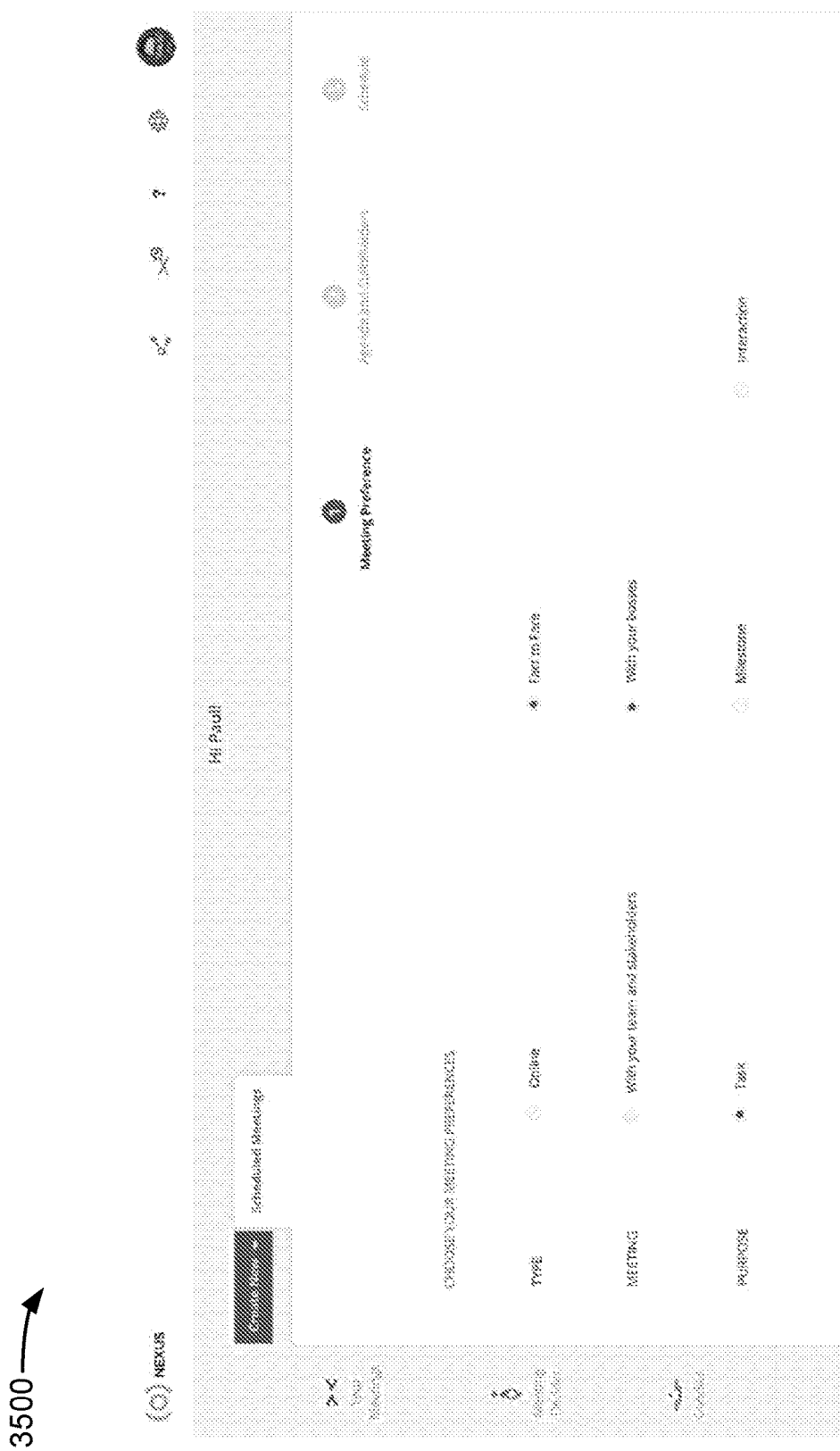
Figure 36:
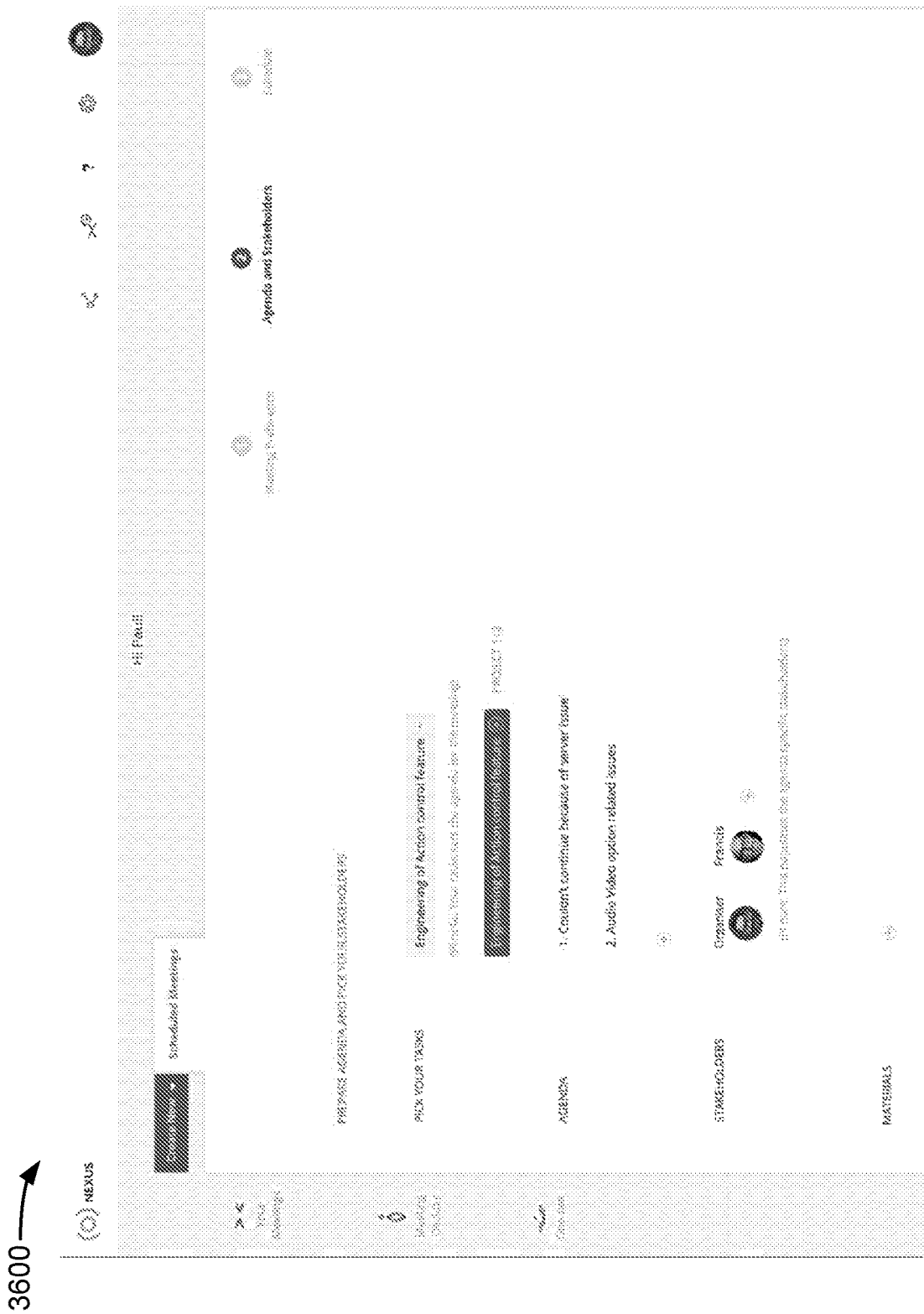
Figure 37:
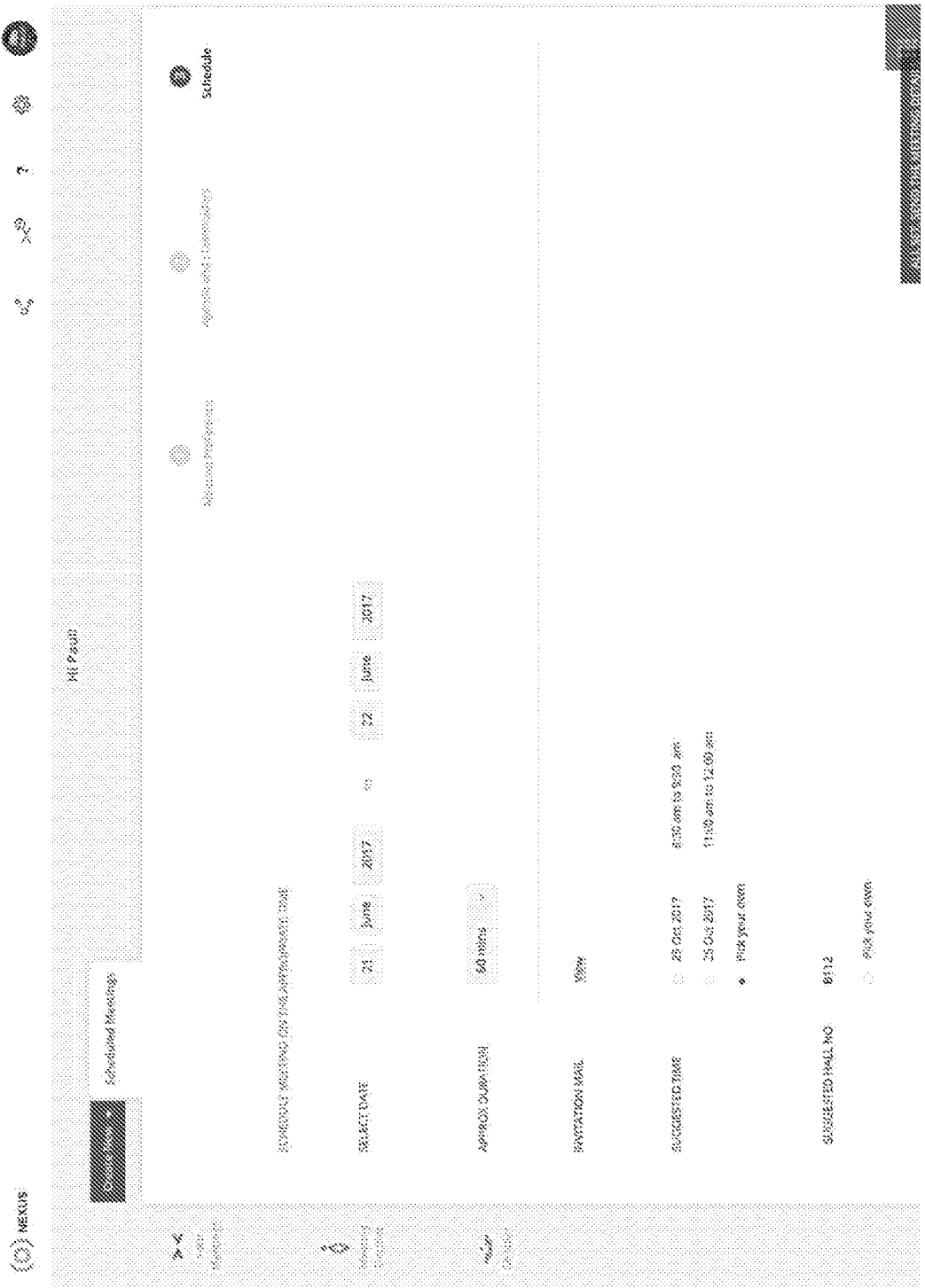

We will now consider a scenario in which work movement is from bottom to top. Assume Paul encountered an obstacle on his journey to complete a task, so he lets Francis know the seriousness of the issue by scheduling a meeting. Francis asks Paul to delegate the task upward to Francis such that, when Francis opens his Work Manager application, he finds the task in his "Your Tasks" section. FIG. 35 is a screenshot 3500 of Paul on a Scheduled Meetings tab on which Paul can choose meeting preferences (e.g., "Face to Face" as opposed to, e.g., "Online"), "With your bosses" (as opposed to, e.g., "With your team and stakeholders"), and "Task" (as opposed to, e.g., "Milestone" or "Interaction"). FIG. 36 is a screenshot 3600 of Paul on the Scheduled Meetings tab on which Paul can prepare an agenda and pick stakeholders (task, e.g., "Engineering of Action control feature;" agenda summary, e.g., "1. Couldn't continue because of server issue; 2. Audio Video option related issues;" stakeholders, e.g., Paul, the organizer, and Francis; and materials). FIG. 37 is a screenshot 3700 of Paul on the Scheduled Meetings tab on which Paul can schedule a meeting at the appropriate time, including date, approximate duration, invitation mail, suggested time (including, e.g., "pick your own"), and suggested location (including, e.g., "pick your own").

Figure 38:
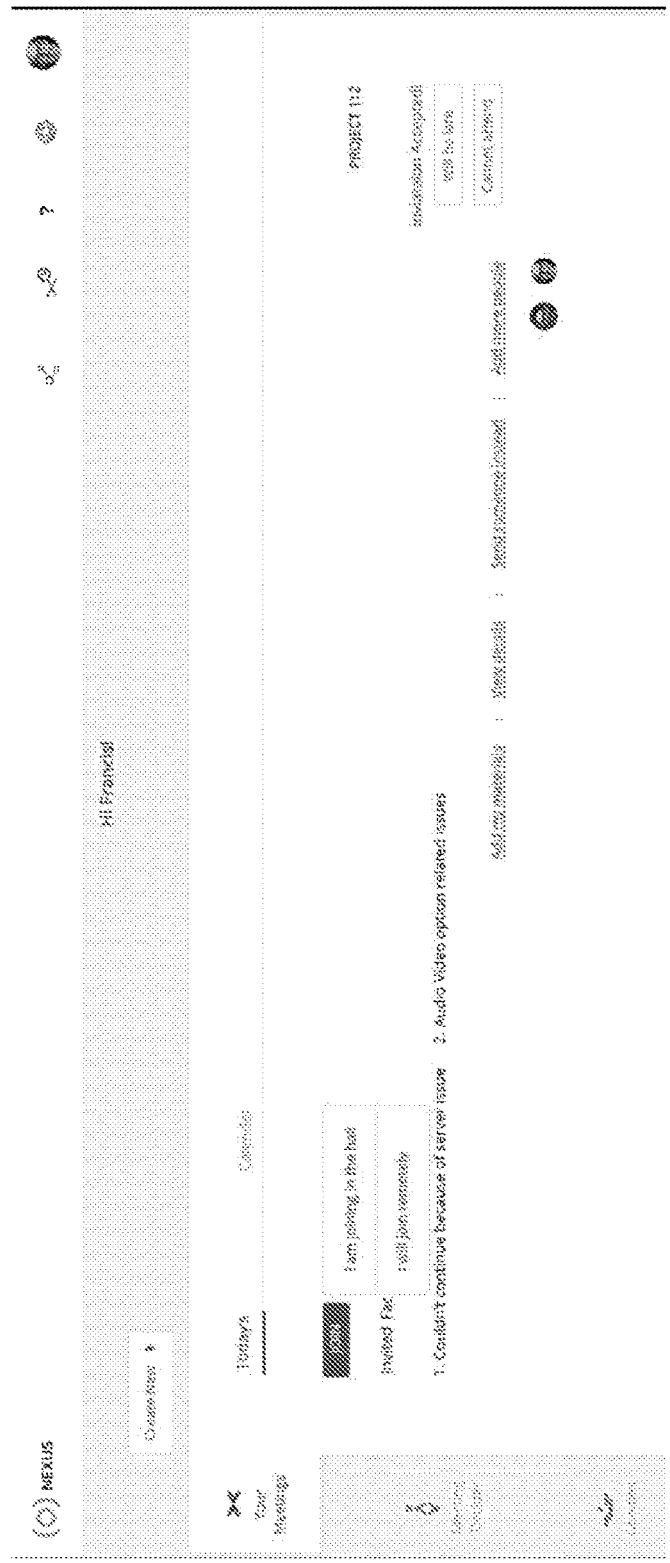
Figure 39:
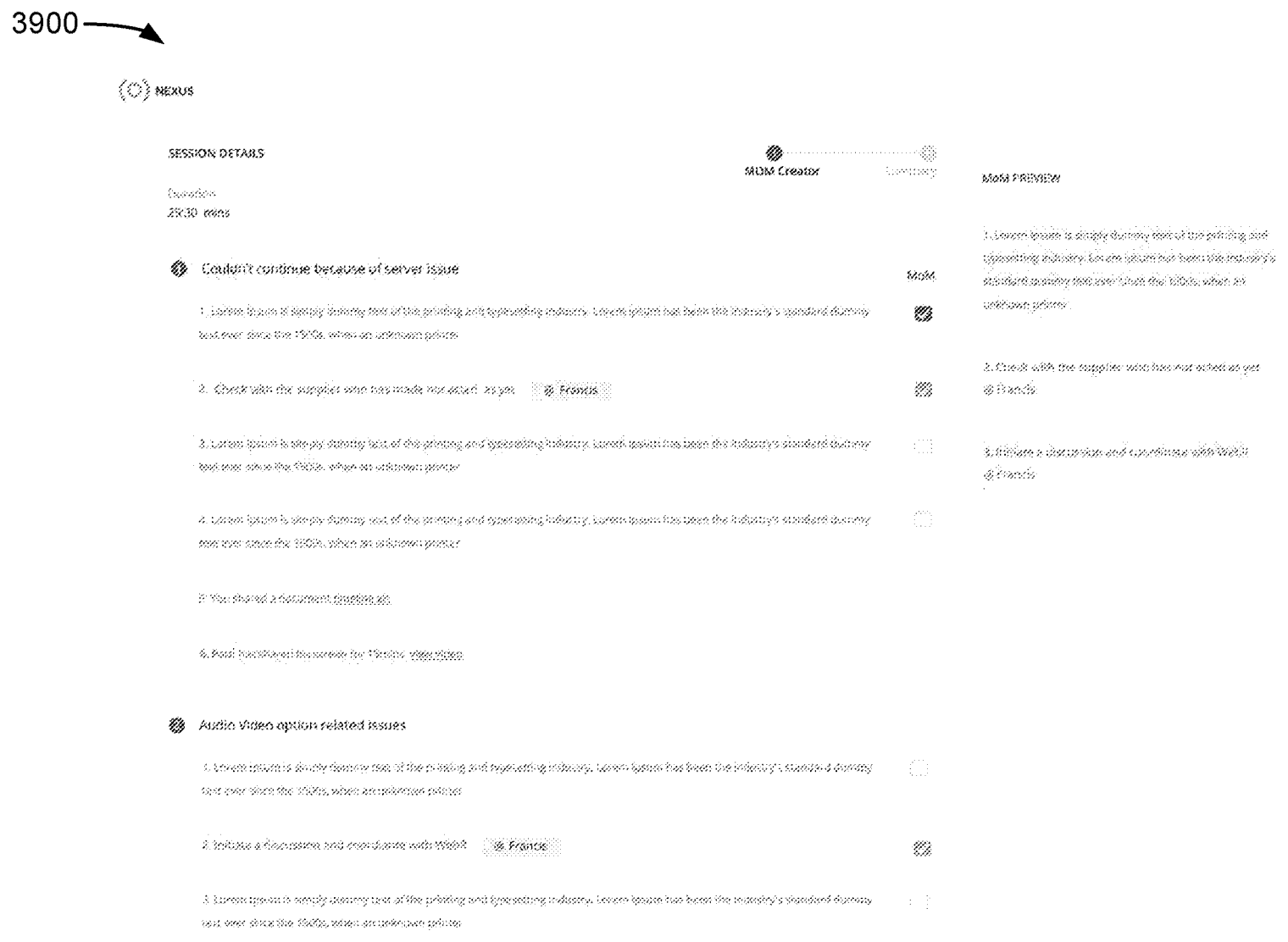
Figure 40:
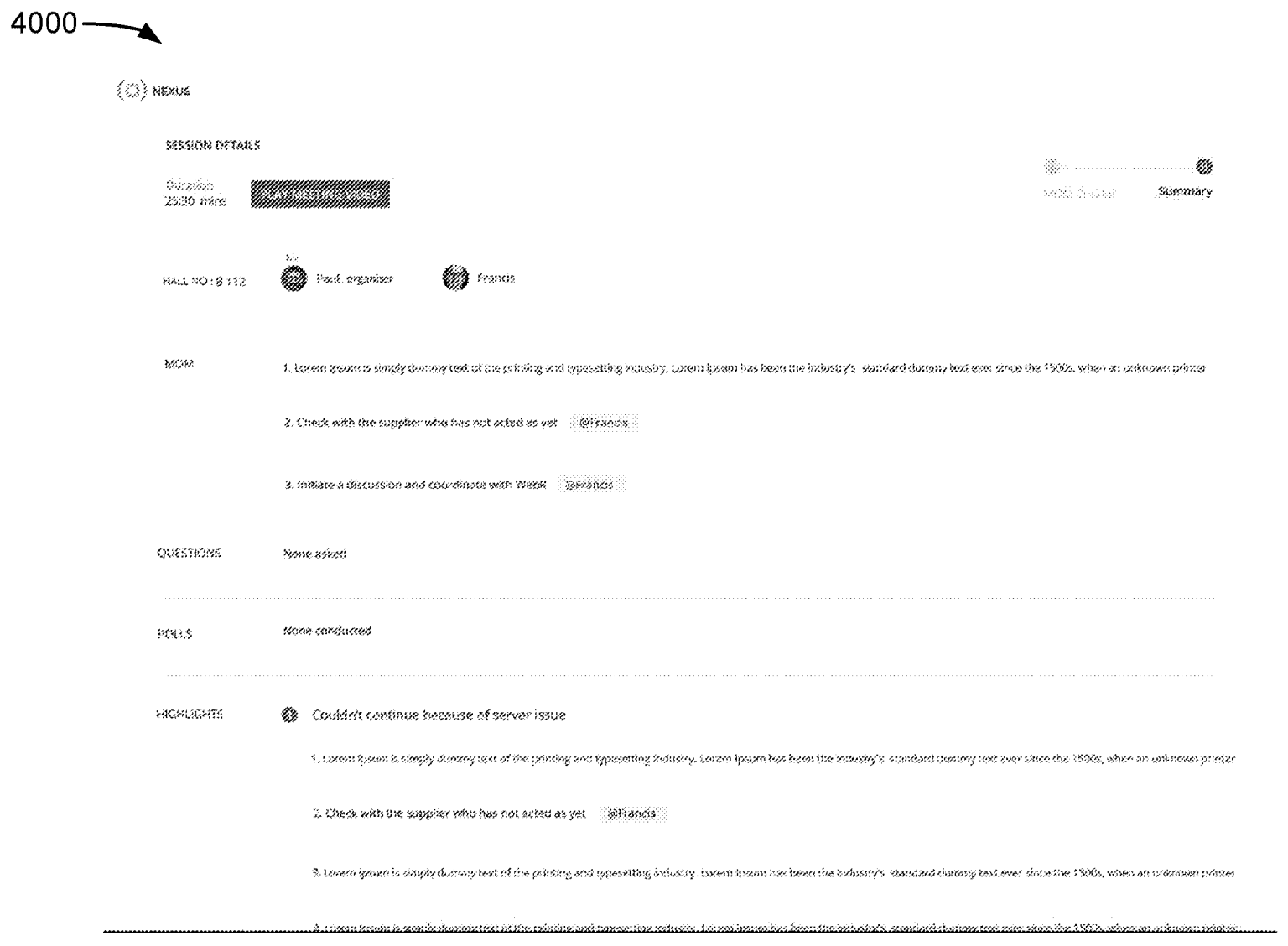
Figure 41:
Figure 42:

FIG. 38 is a screenshot 3800 of Francis in a Your Meetings tab for today's meetings, in which the meeting Paul scheduled is indicated. Francis can choose to join at the indicated location or remotely and can also indicate if he will be late or cannot attend, add materials, view details, send someone else instead, or add more people. (Paul can be assumed to have a similar page for today's meetings.) The agenda can be discussed, with items listed out as illustrated in FIG. 39, which is a screenshot 3900 of a MoM Creator portion of Session Details, including Duration (25:30 mins in this example). In the example, items of the agenda have associated checkboxes and two of the checkboxes are checked to indicate Francis has had work delegated to him. FIG. 40 is a screenshot 4000 of a Summary portion of Session Details, which includes an option to Play Meeting Video, identifies location and attendees, includes the delegated items, and includes a section for questions, polls, and highlights. FIG. 41 is a screenshot 4100 of Francis in a Work Delegator tab of a Work Manager, which includes tasks delegated during (or following) the meeting, which can be added as action points to tasks or ignored. Paul can create a new meeting for the same task, as illustrated in FIG. 42, which is a screenshot of Paul on the Scheduled Meetings tab on which Paul can prepare an agenda and pick stakeholders, much like was illustrated in FIG. 36, but with a suggested agenda and stakeholders, along with the option to dig deeper into the suggested agenda. Of course, any information about tasks of a project or assignments of a task can be provided as suggestions, even if no meeting has been held.

The invention claimed is:
1. A method comprising:
virtually synchronizing, by a synchronized persona interaction (SPI) facilitation engine, a first persona of a plurality of personas in a persona datastore and a second persona of the plurality of personas in the persona datastore, wherein the first persona is associated with a supervisor role and the second persona is associated with a delegee;
matching, by an asset synthesis instantiation engine, a resource of a plurality of resources in a resource datastore to the first persona and the second persona to generate an asset synthesis instance;

obtaining a delegation, by a workflow generation engine, of an asset synthesis instance from the first persona to the second persona during the asset synthesis instance;

instantiating an asset synthesis instance in an event occurring in the physical world that includes the first persona, the second persona, and the resource;

estimating impact of the asset synthesis instance, wherein delegation of the asset synthesis instance from the first persona to the second persona is changed by triggering a request to reassign delegation.

2. The method of claim 1, wherein the asset synthesis instance is generated to optimize one or more of cost, speed, and throughput.

3. The method of claim 1, wherein the resource is selected from a group consisting of a device, a camera, a network, a display, a software license, a wireless access point (WAP), a conference room, furniture, local catering, hotel accommodations, and a combination of these.

4. The method of claim 1, wherein the second persona has designation of a role selected from a group consisting of officer, supervisor, staff, outside persona, and a combination of these.

5. The method of claim 1, comprising:
generating a business workflow;
integrating the asset synthesis instance, including the first persona, the second persona, and the resource, into the business workflow;
updating the business workflow in real time during the event using input from human or artificial agents.

6. The method of claim 1, comprising using a sensor to update the asset synthesis instance in real time during the event occurring in the physical world, wherein the sensor is selected from a group consisting of a radio frequency identification (RFID) sensor, a camera, a microphone, a plurality of these, and a combination of these.

7. The method of claim 1, comprising generating information about the first persona, the second persona, and the resource to assist in performance of a task selected from a group consisting of assess performance, predict progress and results across one or more workflows, generate information for use in modeling future workflows, and a combination of these.

8. The method of claim 1, comprising generating a report regarding the event.

9. The method of claim 1, comprising providing an interface to one or more human agents regarding effectiveness of the asset synthesis instance in the physical world.

10. The method of claim 1, wherein a template for generating the asset synthesis instance is created automatically.

11. The method of claim 1, wherein updates to key personas are automatically populated for the generated asset synthesis instance.

12. The method of claim 1, wherein the obtained delegation of the asset synthesis instance inherits a change in priority with an associated complexity.

13. A system comprising:
a workflow generation engine configured to generate a business workflow using personas in a persona datastore and resources in a resource datastore and to obtain a delegation of an asset synthesis instance from a first persona to a second persona, wherein the first persona is associated with a supervisor role and the second persona is associated with a delegee;

a persona-to-persona connectivity engine configured to connect the first persona of the personas and the second persona of the personas;

a synchronized persona interaction (SPI) facilitation engine configured to synchronize two or more personas virtually;

an asset synthesis instantiation engine configured to match a resource of the resources to the first persona and the second persona to generate an asset synthesis instance;

a workflow-to-reality integration engine configured to integrate the asset synthesis instance into the business workflow;

an asset synthesis instantiation engine configured to instantiate the asset synthesis instance in an event occurring in the physical world;

a synchronized persona interaction outcome generation engine configured to estimate impact of the asset synthesis instance, wherein delegation of the asset synthesis instance from the first persona to the second persona is changed by triggering a request to reassign delegation.

14. The system of claim 13, wherein the asset synthesis instance is generated to optimize one or more of cost, speed and throughput.

15. The system of claim 13, wherein the resource is selected from a group consisting of a device, a camera, a network, a display, a software license, a wireless access point (WAP), a conference room, furniture, local catering, hotel accommodations, and a combination of these.

16. The system of claim 13, wherein the second persona has designation of a role selected from a group consisting of officer, supervisor, staff, outside persona, and a combination of these.

17. The system of claim 13, comprising an SPI outcome generation engine configured to update the business workflow in real time during the event using input from human or artificial agents.

18. The system of claim 13, comprising a sensor to update the business workflow in real time during the event occurring in the physical world, wherein the sensor is selected from a group consisting of a radio frequency identification (RFID) sensor, a camera, a microphone, a plurality of these, and a combination of these.

19. The system of claim 13, comprising a workflow analytics engine configured to generate information about the first persona, the second persona, and the resource to assist in performance of a task selected from the group consisting of assess performance, predict progress and results across one or more workflows, generate information for use in modeling future workflows, and a combination of these.

20. The system of claim 13, comprising an SPI outcome generation engine configured to generate a report regarding the event.

21. The system of claim 13, comprising a workflow-to-reality integration engine configured to provide an interface to one or more human agents regarding effectiveness of the asset synthesis instance in the physical world.

22. The system of claim 13, wherein the workflow generation engine is configured to provide a prediction with a probability that the business workflow will go as planned.

* * * * *